United States Patent [19]
Maxon

[11] Patent Number: 5,927,240
[45] Date of Patent: Jul. 27, 1999

[54] HOUSING SHARED BY VEHICLE COMPONENT AND DISABLING SWITCH AND DECODER

[76] Inventor: Eric A. Maxon, 22855 Nottingham La. #1531, Southfield, Mich. 48034

[21] Appl. No.: 08/418,757

[22] Filed: Apr. 7, 1995

[51] Int. Cl.⁶ .......................... B60R 25/04; F02N 11/08; F16B 23/00
[52] U.S. Cl. .................... 123/179.3; 123/179.25; 307/10.4; 411/403
[58] Field of Search .................. 123/179.3, 179.25, 123/198 B; 307/10.3–10.5; 361/748, 760, 679; 411/402, 403, 910

[56] References Cited

U.S. PATENT DOCUMENTS

| Re. 22,681 | 10/1945 | Bugg | 411/403 |
|---|---|---|---|
| 641,191 | 1/1900 | Champion | 411/402 |
| 4,209,709 | 6/1980 | Betton | 307/10.4 |
| 4,292,541 | 9/1981 | Ambrosius | 307/10.5 |
| 4,315,160 | 2/1982 | Levine | 307/10.3 |
| 4,733,638 | 3/1988 | Anderson | 123/198 B |
| 4,812,670 | 3/1989 | Goulet | 307/10.2 |
| 5,006,843 | 4/1991 | Hauer | 307/10.4 |
| 5,138,986 | 8/1992 | Aguilar | 123/179.3 |
| 5,396,216 | 3/1995 | Morgan | 307/10.3 |
| 5,401,133 | 3/1995 | Kuchler | 411/910 |
| 5,422,632 | 6/1995 | Bucholtz et al. | 307/10.3 |

Primary Examiner—Andrew M. Dolinar

[57] ABSTRACT

An automotive anti-theft system comprising an enclosure of a device or system necessary to operate the vehicle; this enclosure also enclosing an interlock or disabling entity disabling operation of that device or system, and also enclosing a decoder controlling that interlock. The enclosure is substantially resistant to penetration, unauthorized removal and destruction, and is secured to the engine of the vehicle by special fasteners that can be easily removed only by using special custom tools, and or by fasteners having non-polygonic off-center bolt heads and or non-polygonic non-circular bolt heads, these fasteners being surrounded by a spinning collar that is journaled onto the shaft of each bolt. The device includes a manually selectively operable transmitter operable to transmit a complex coded signal to the decoder in order to cause temporary deactuation of the interlock disabling the necessary system, and thus permit the otherwise disabled system to operate normally and permit driving of the vehicle; the transmitter being remote to and at a distance from the enclosure of the decoder, interlock/disabling entity, and the necessary device/system.

52 Claims, 41 Drawing Sheets

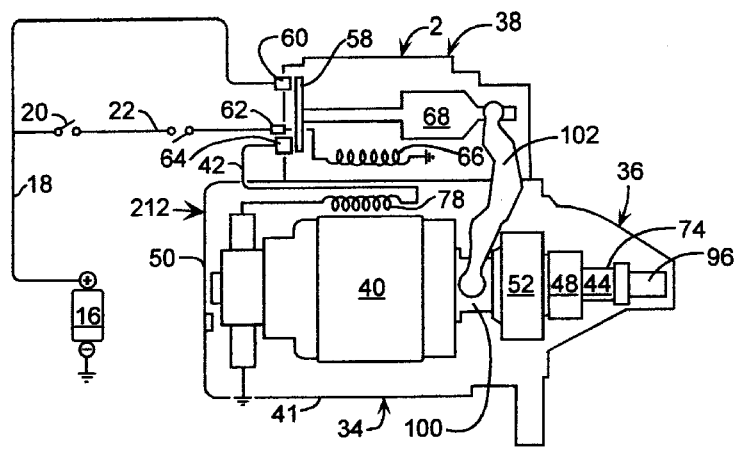
Fig.1 - Prior Art
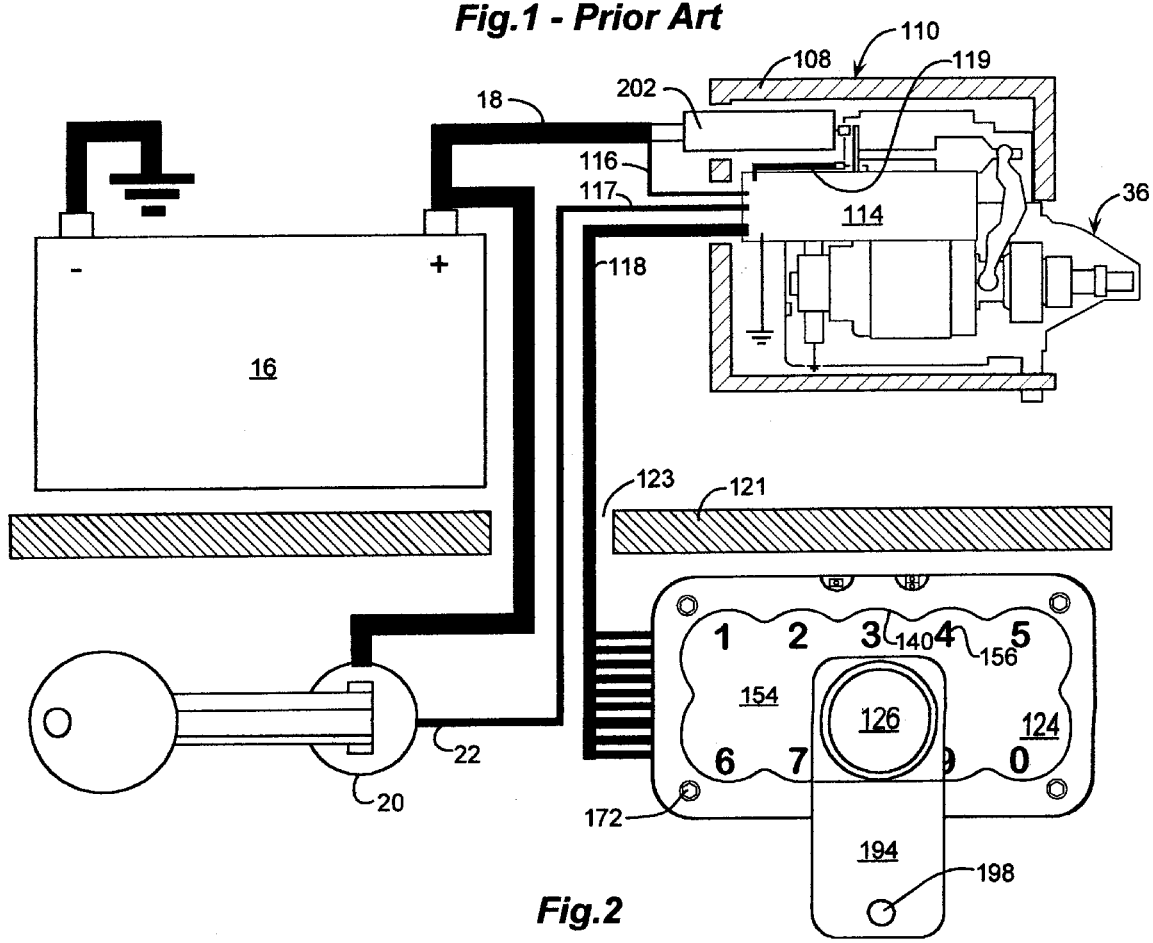
Fig.2

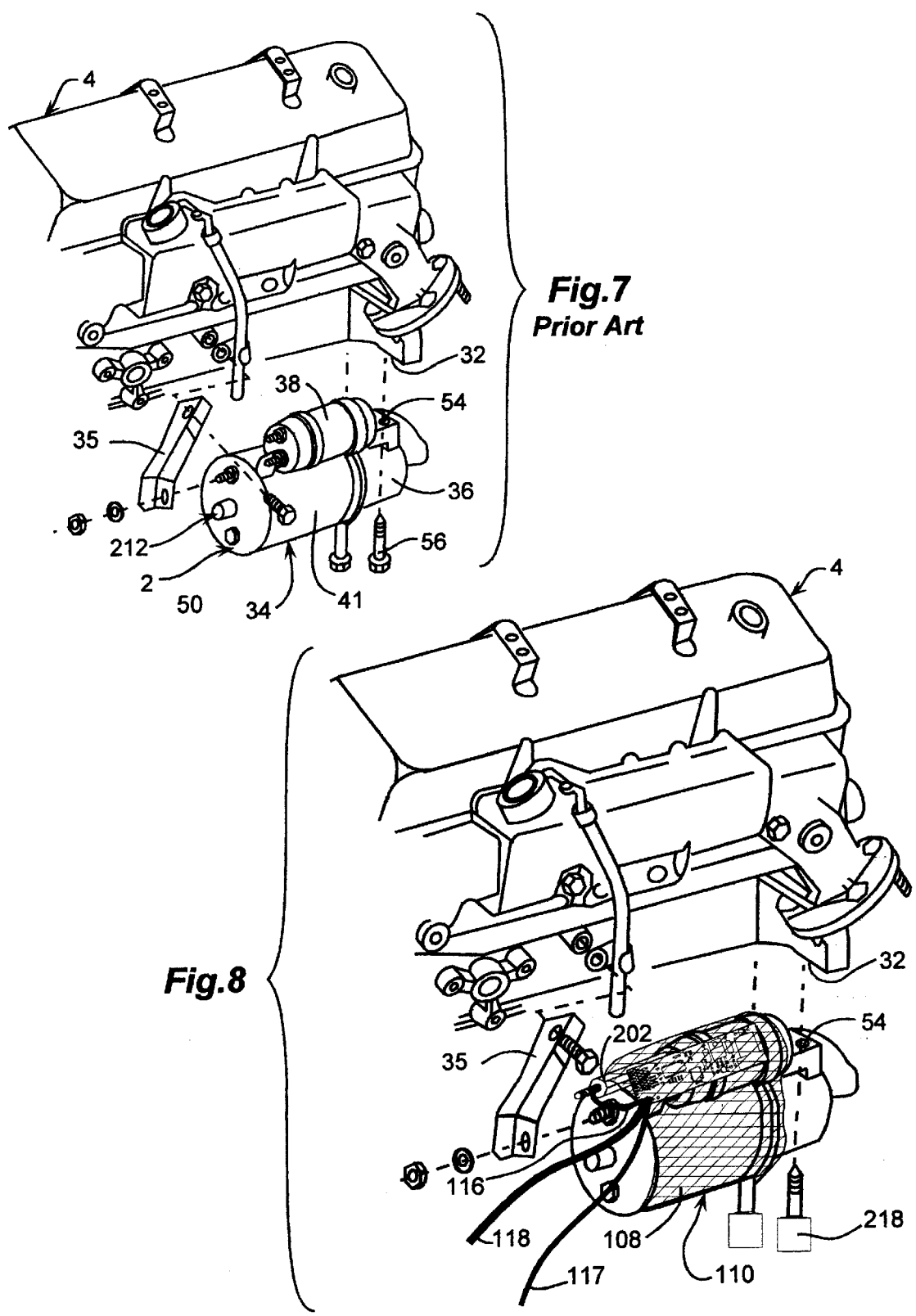

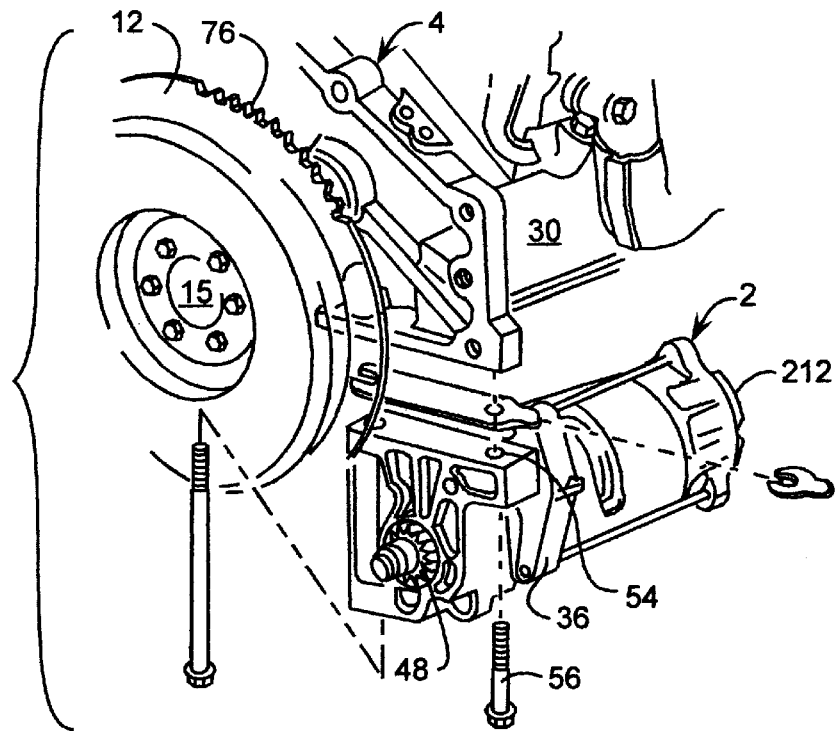
Fig.11 *Prior Art*
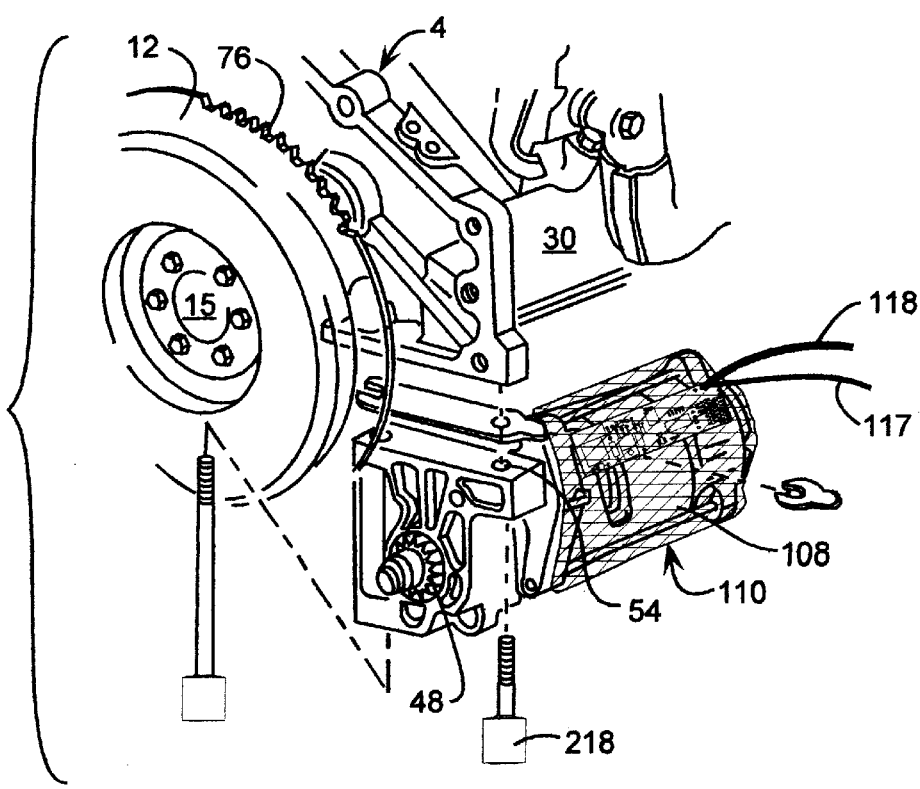
Fig.12

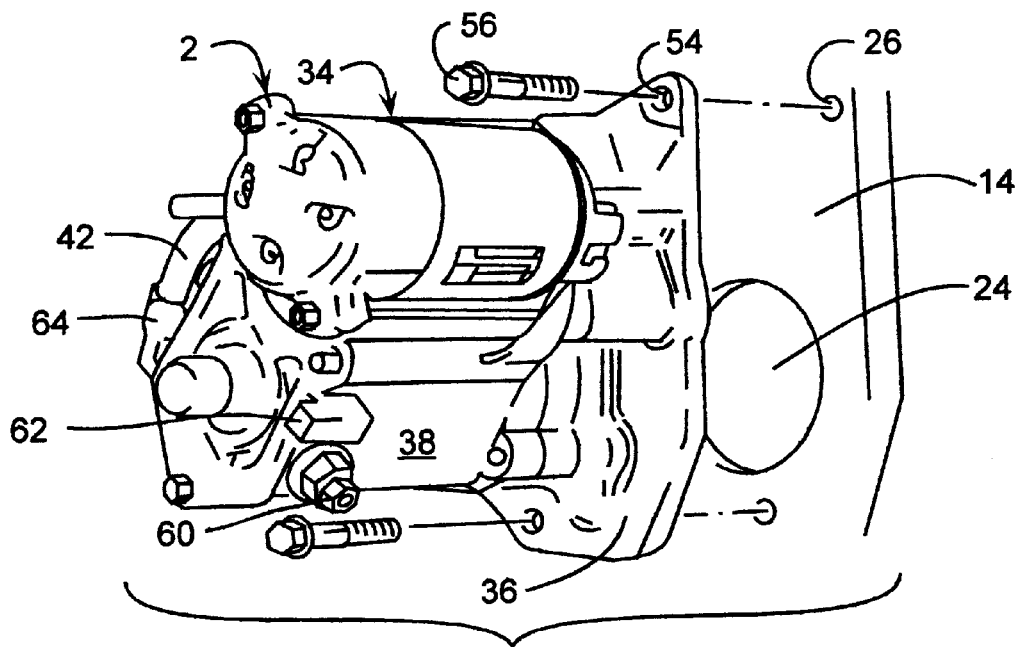
Fig.13 - Prior Art
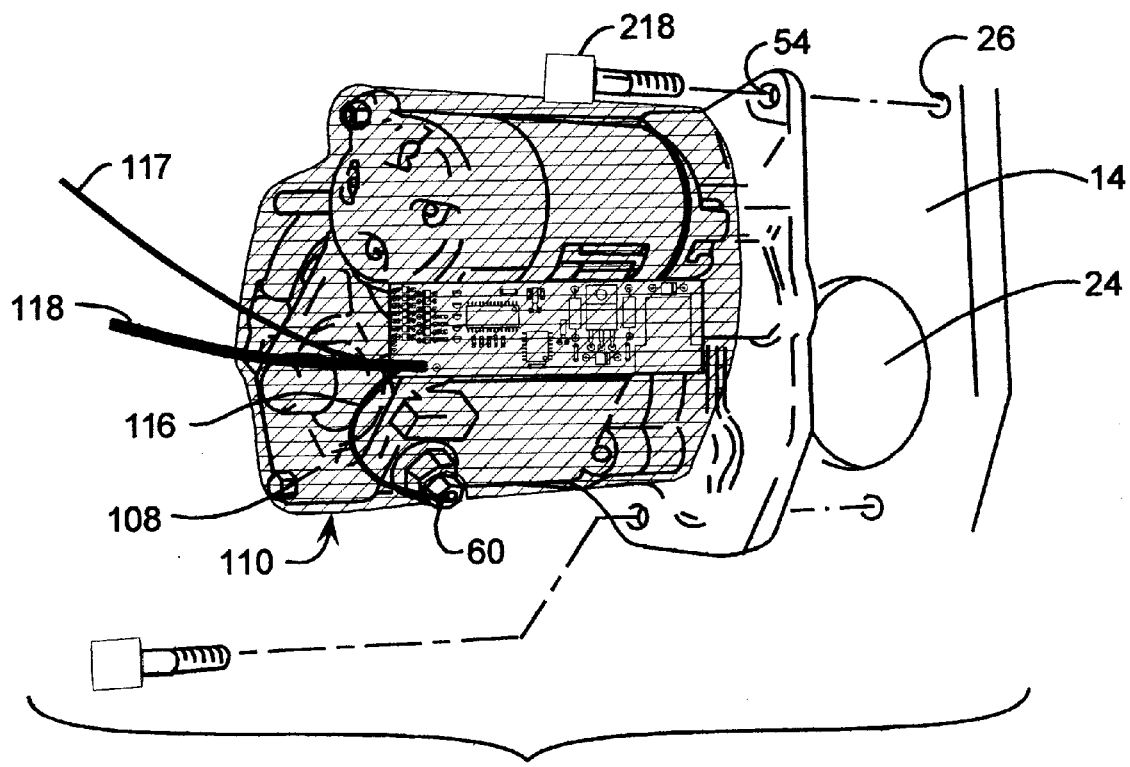
Fig.14

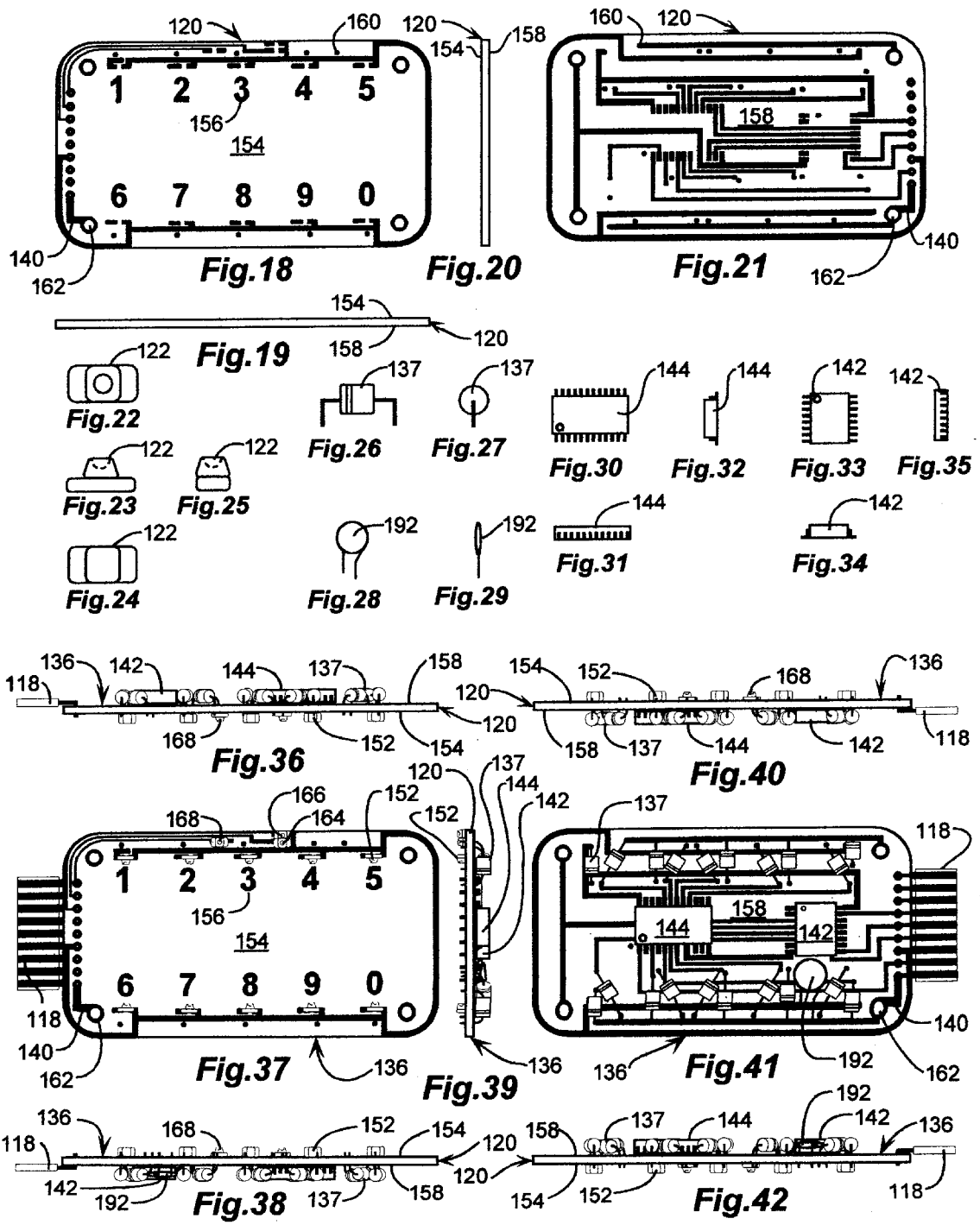

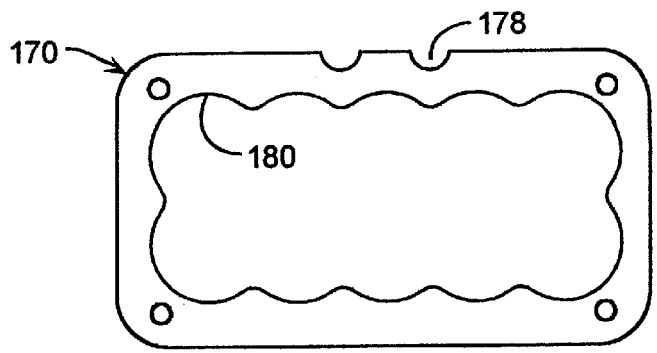
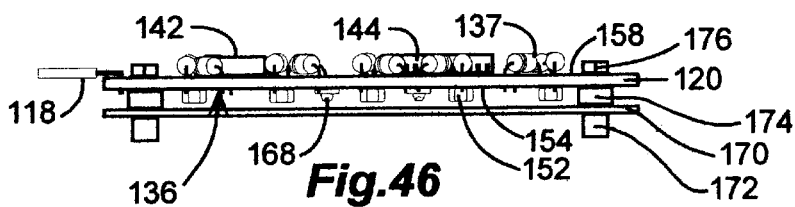
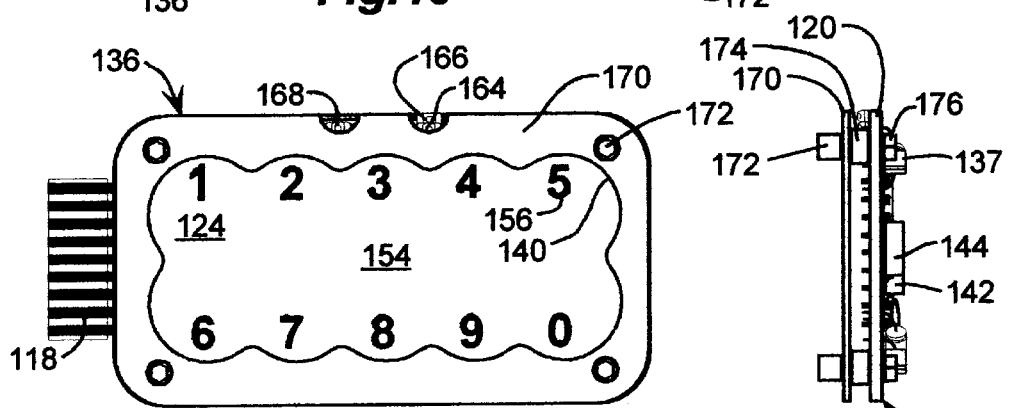
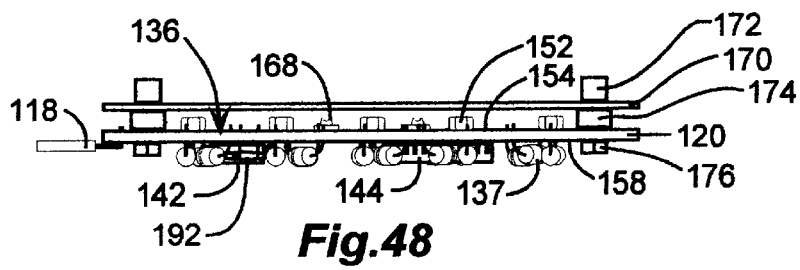

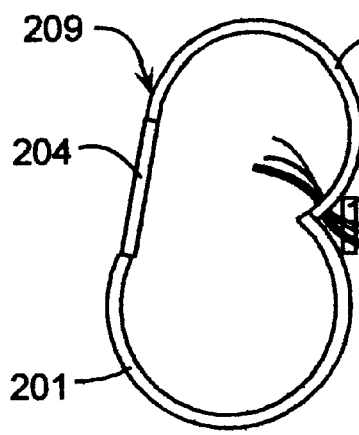
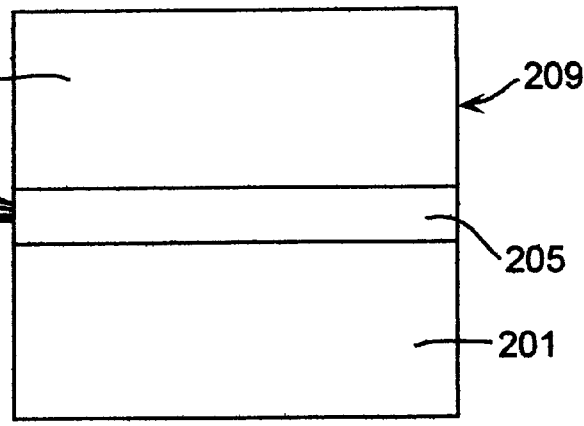
Fig.61  Fig.62
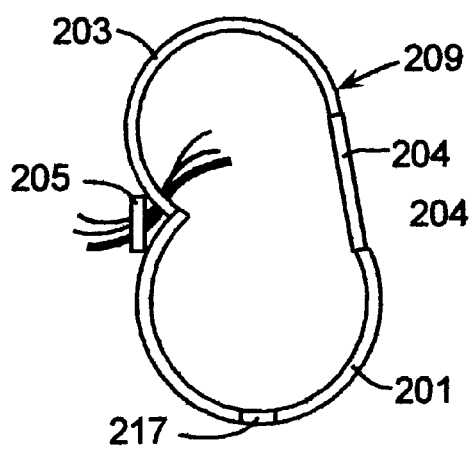
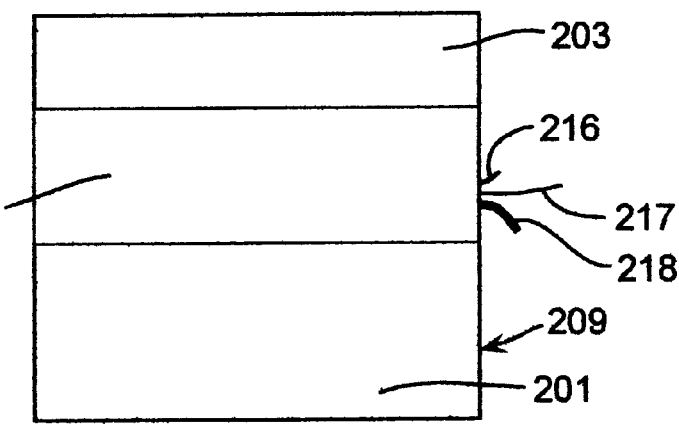
Fig.63  Fig.64
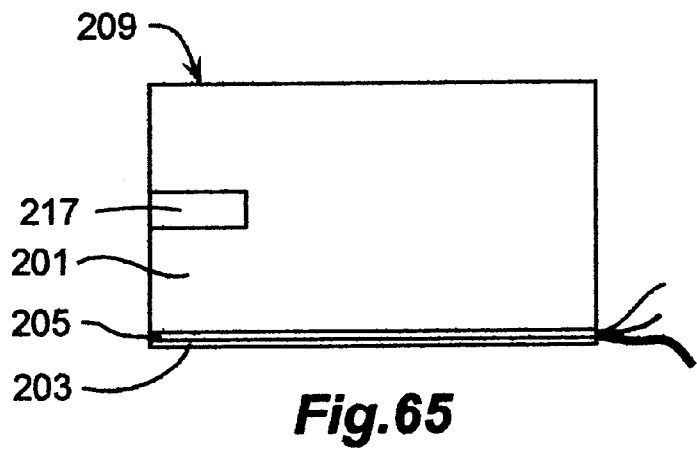
Fig.65

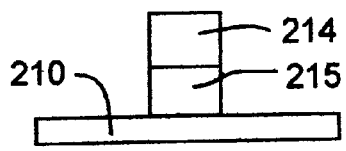
Fig.84
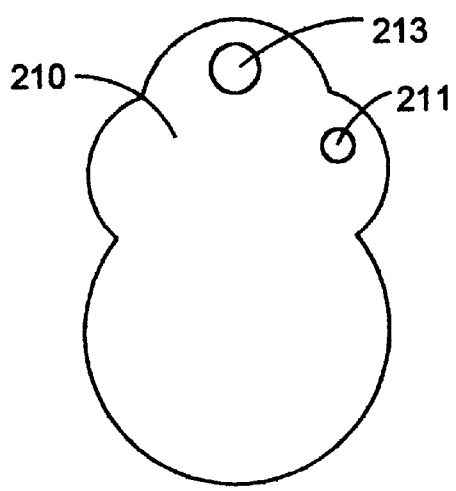
Fig.85
Fig.86
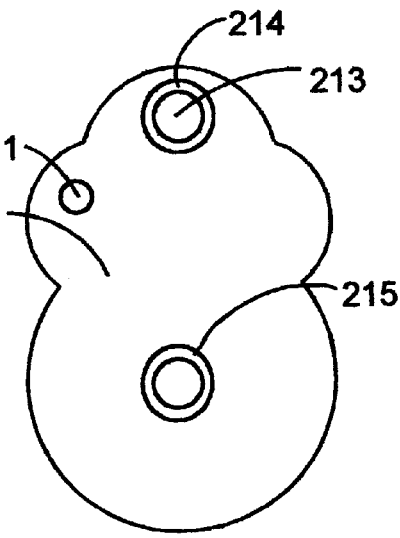
Fig.87
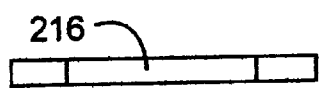
Fig.88
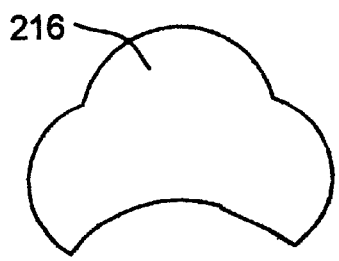
Fig.89
Fig.90

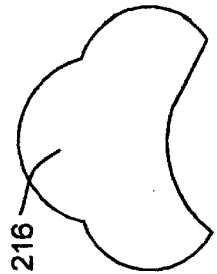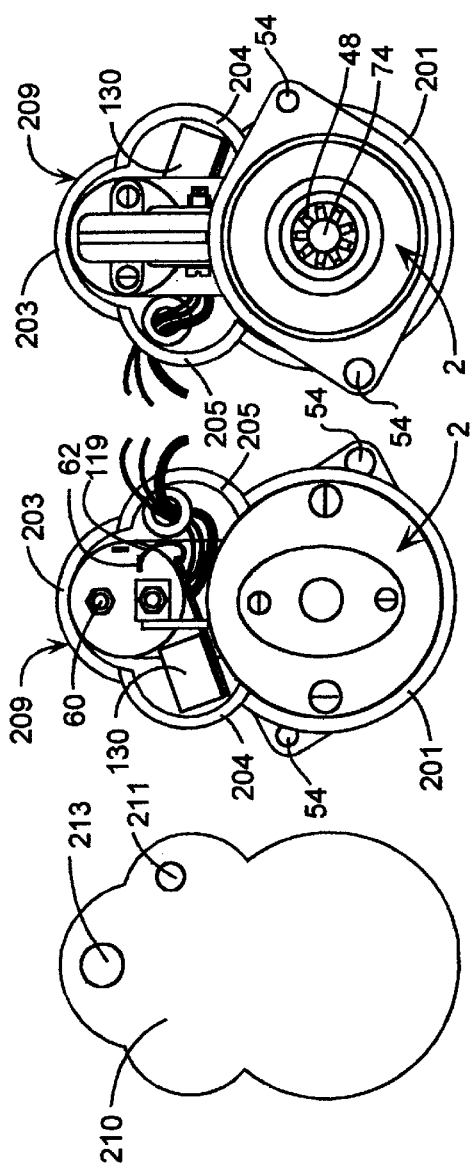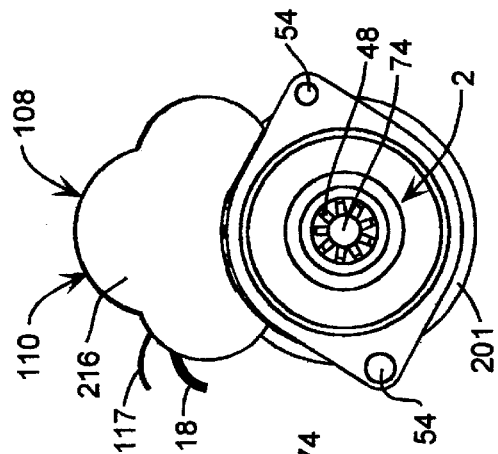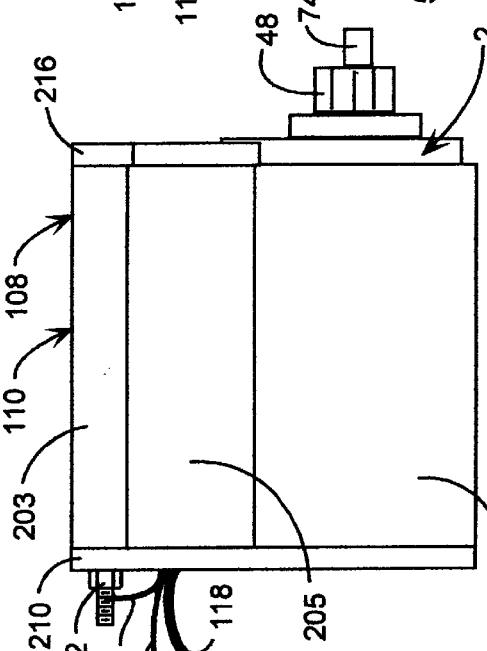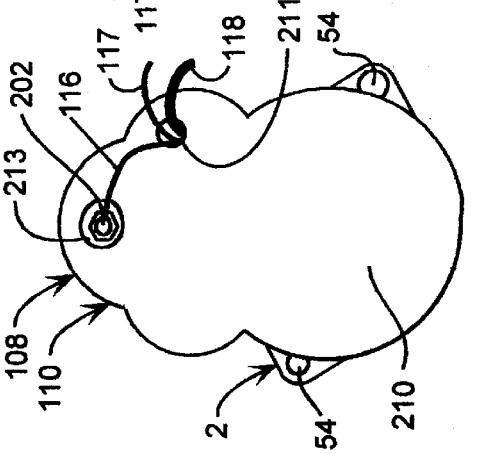

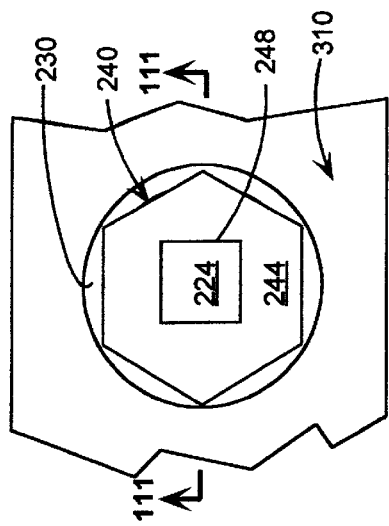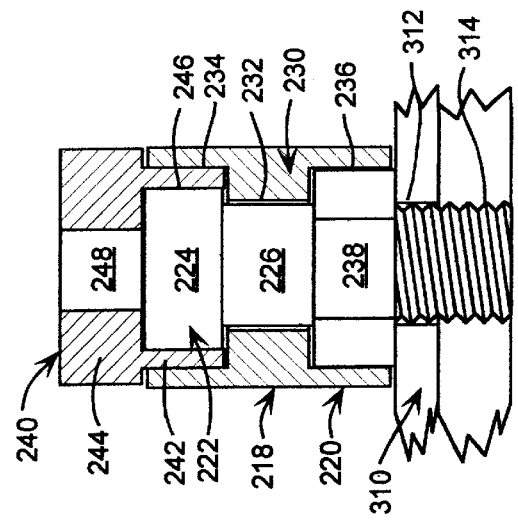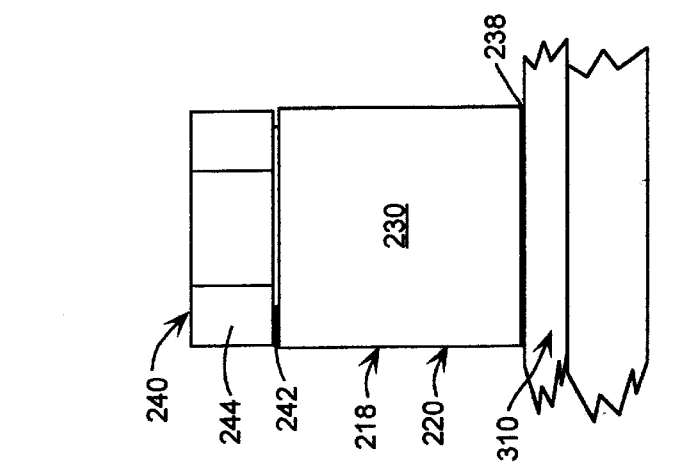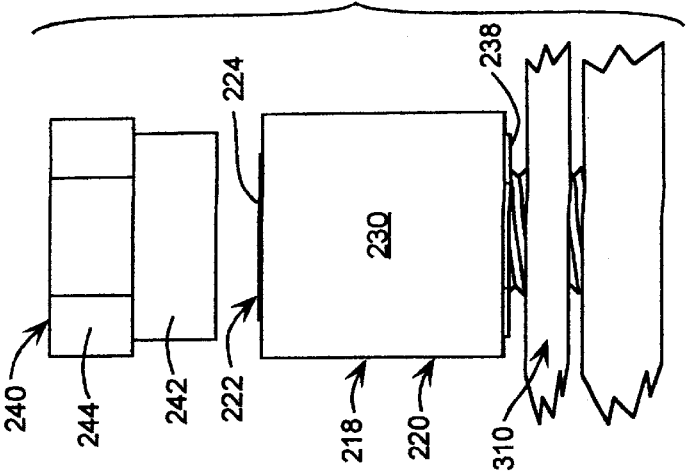

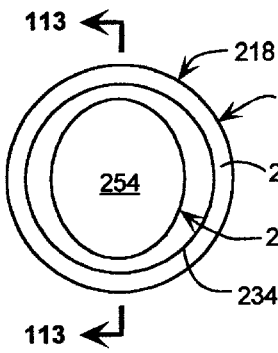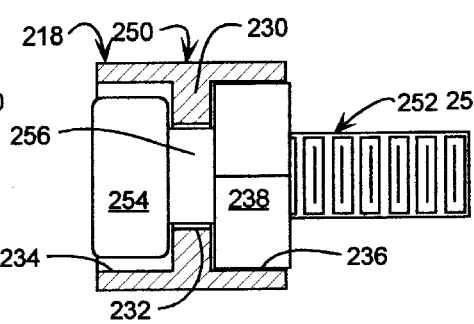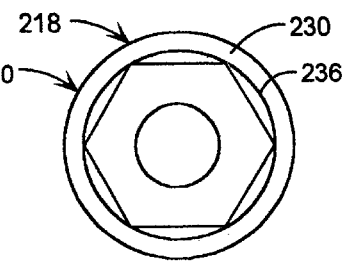
*Fig.112*   *Fig.113*   *Fig.114*
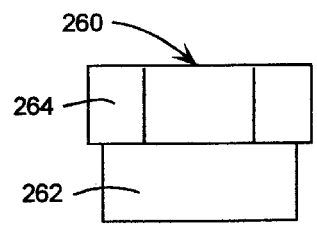
*Fig.115*
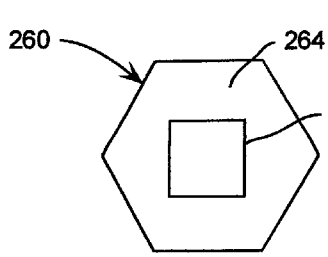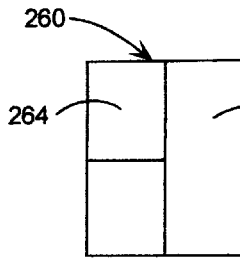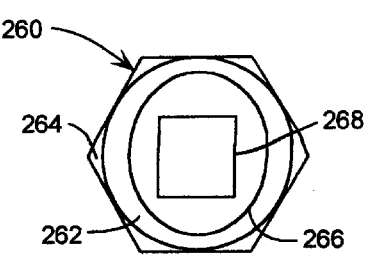
*Fig.118*   *Fig.117*   *Fig.116*

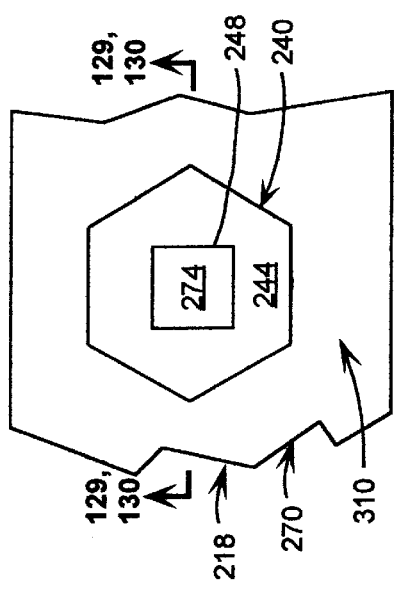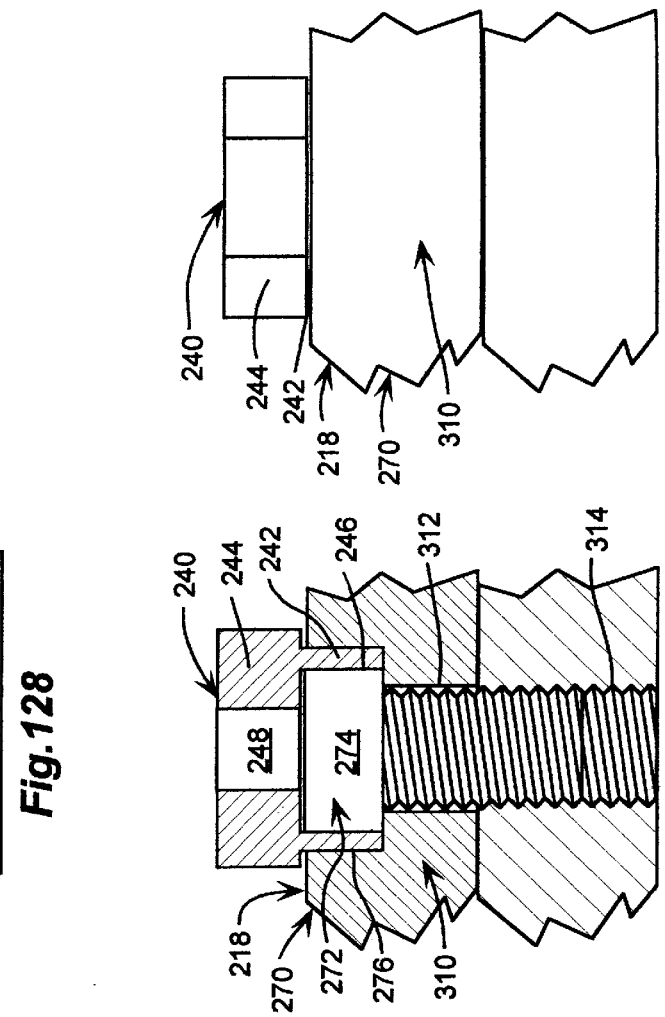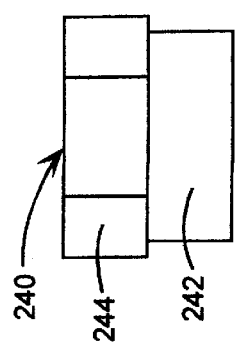

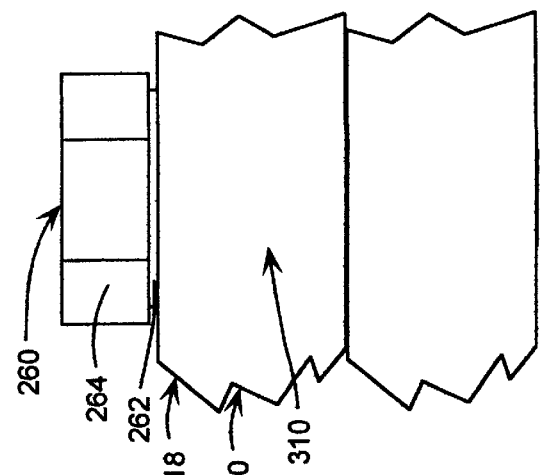
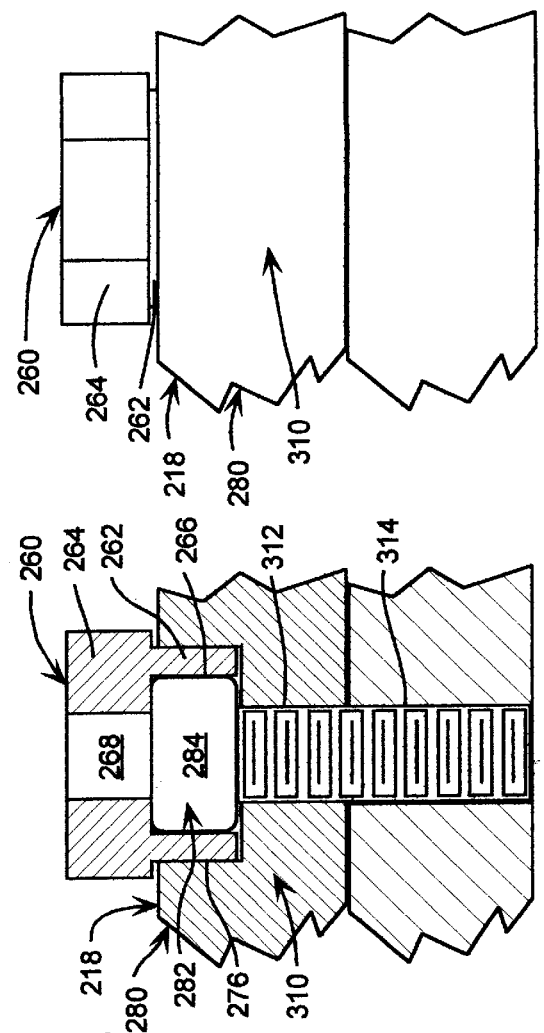
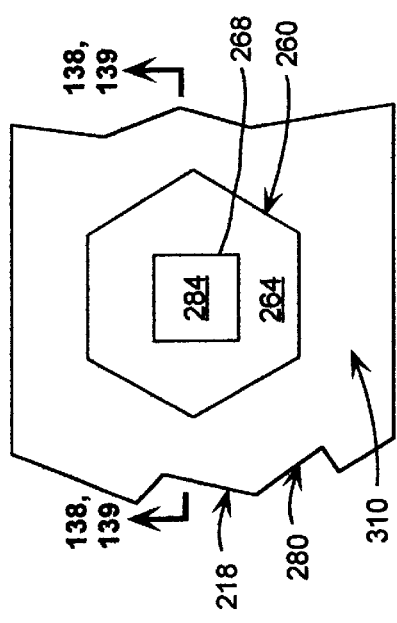
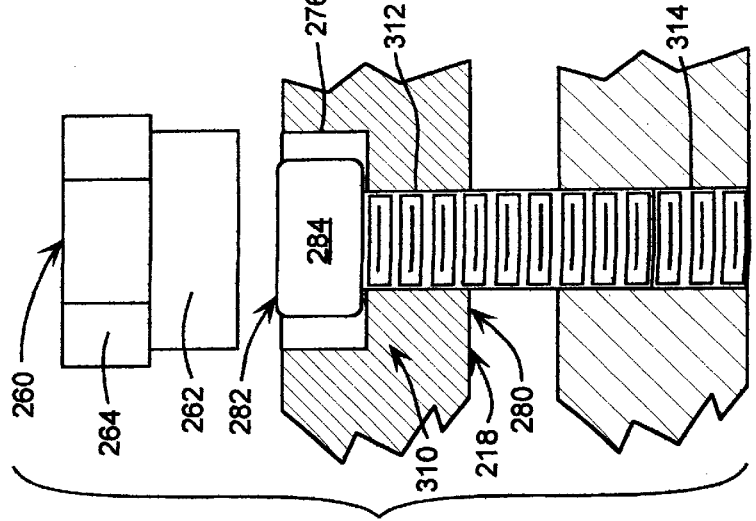

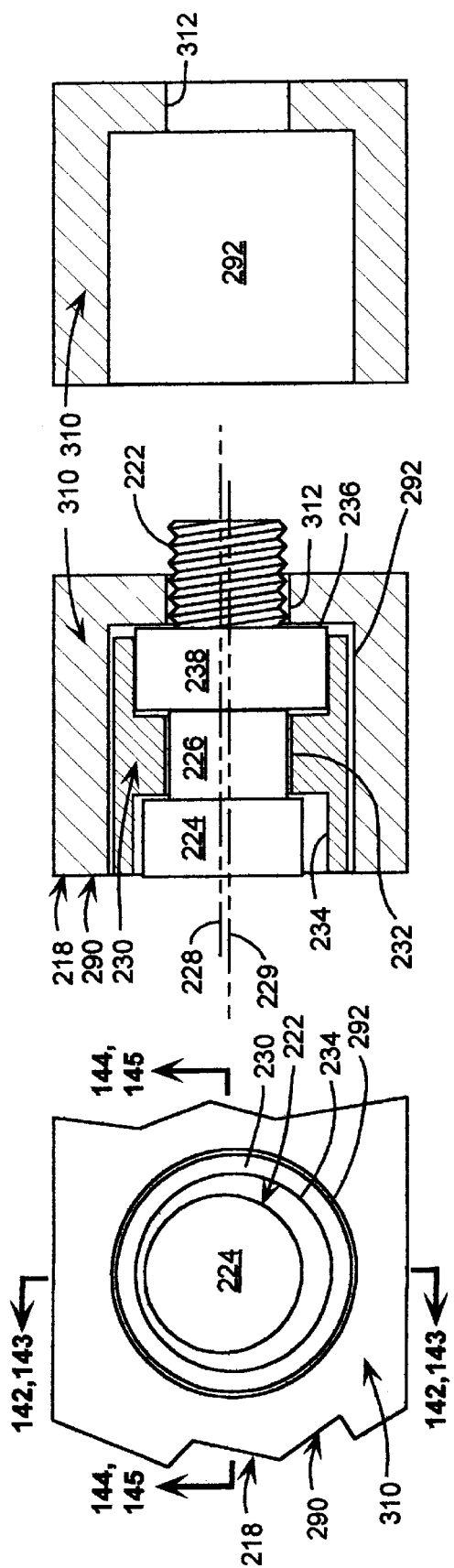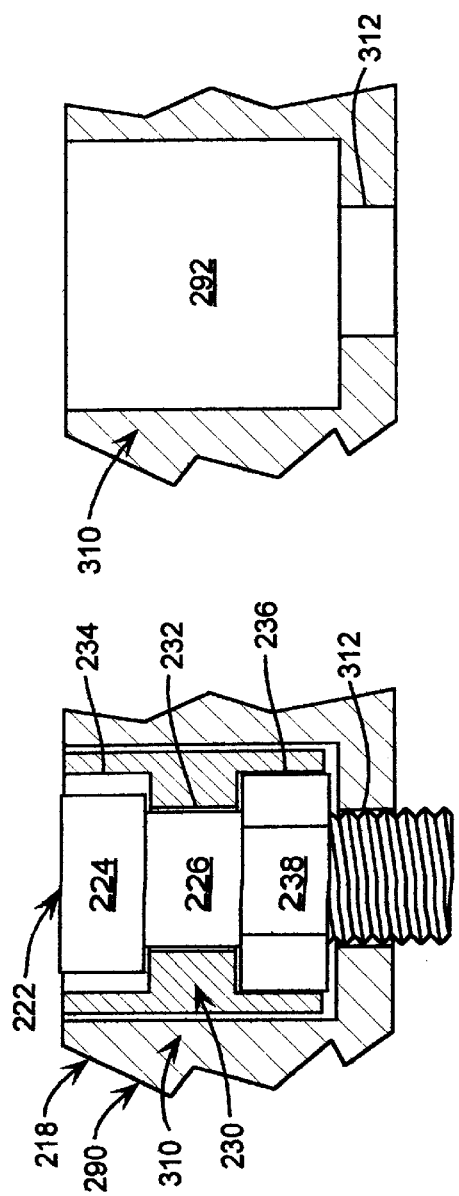

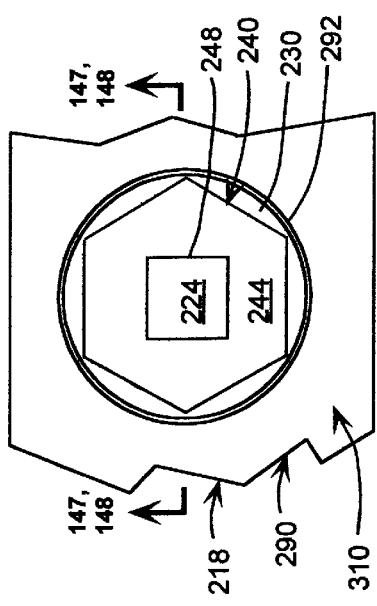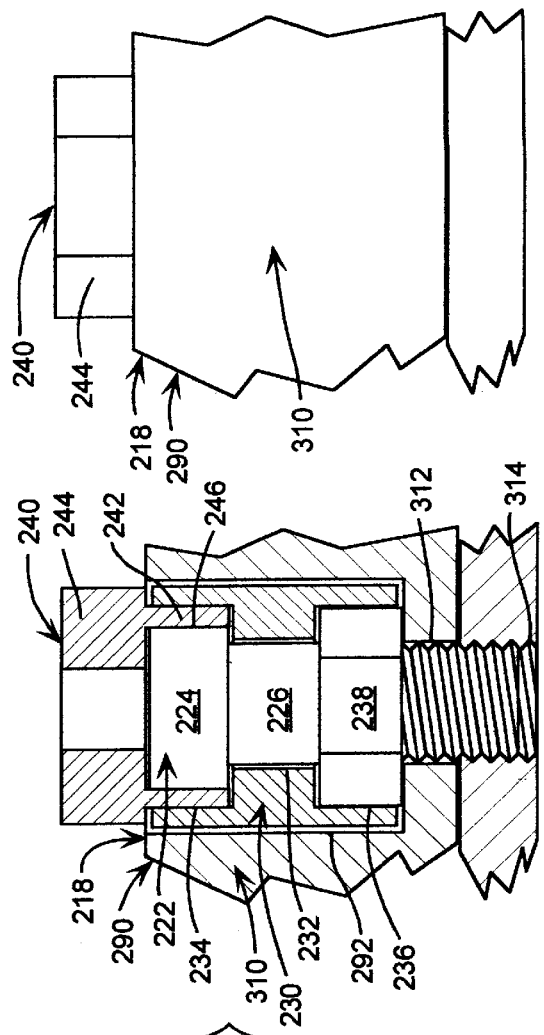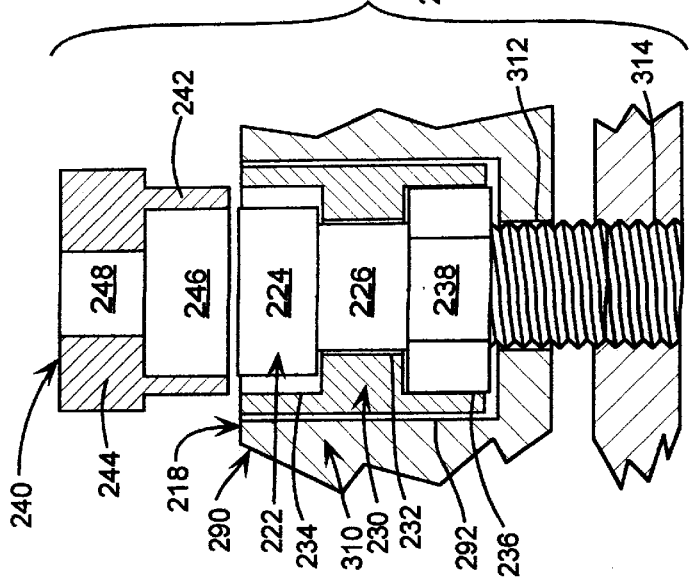

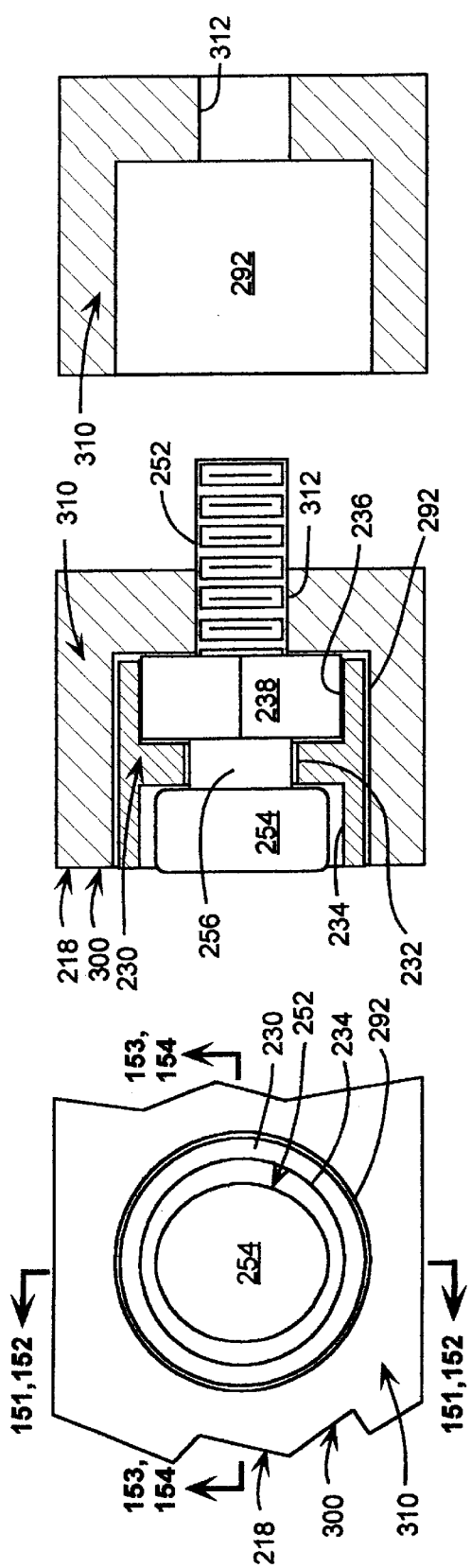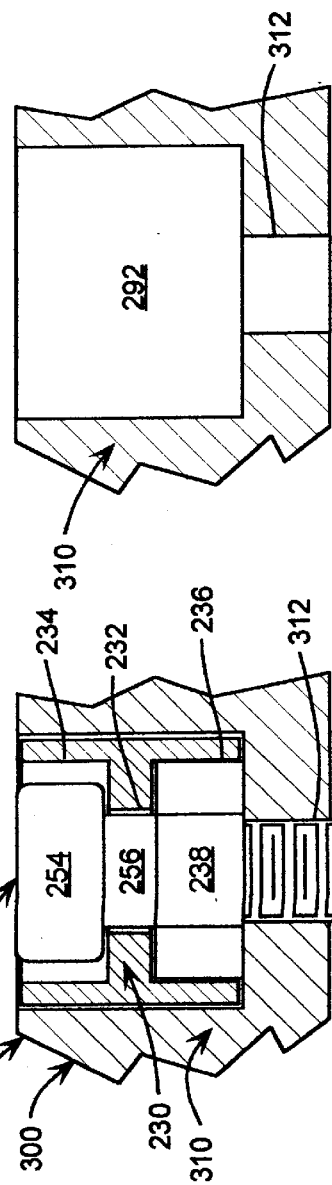

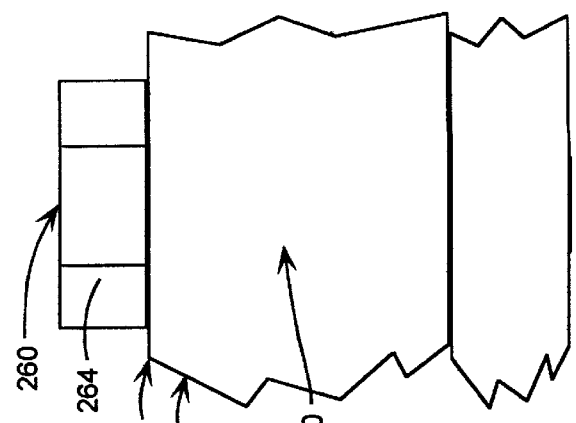
Fig.158
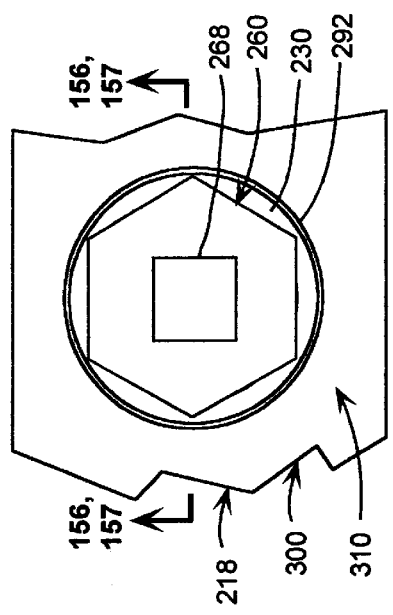
Fig.155
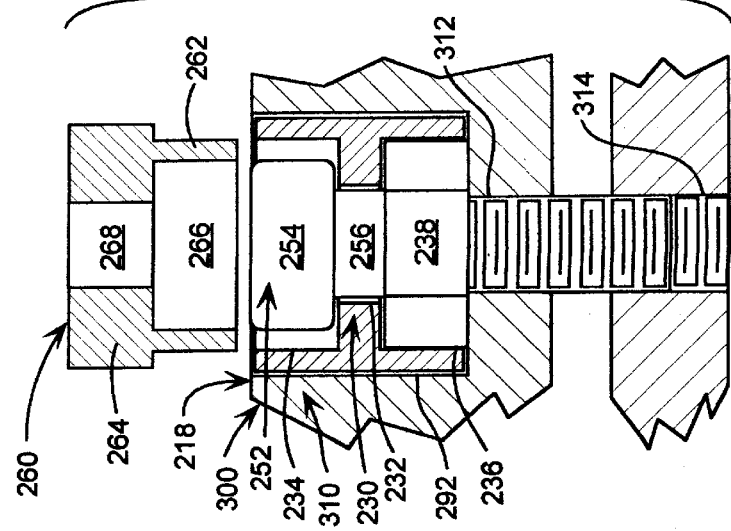
Fig.157
Fig.156

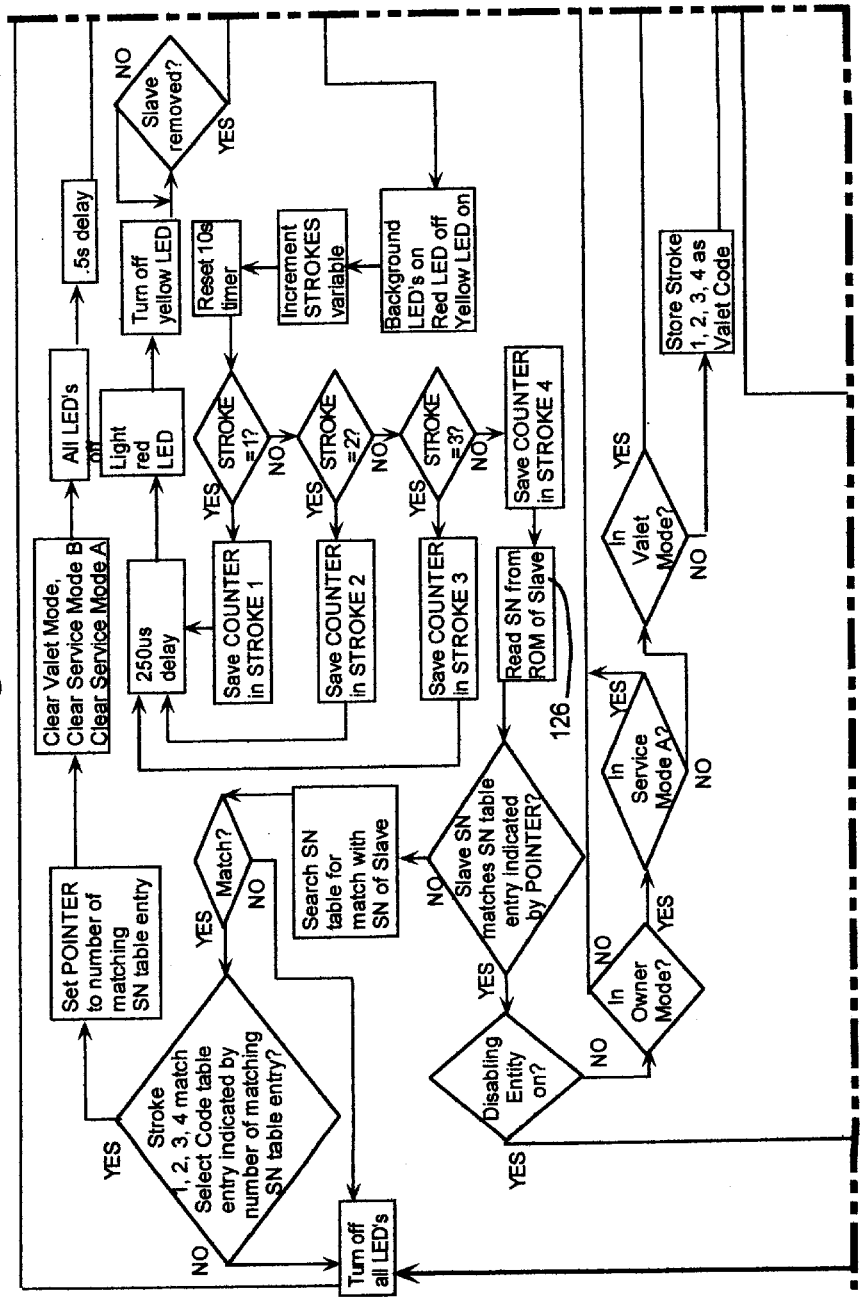

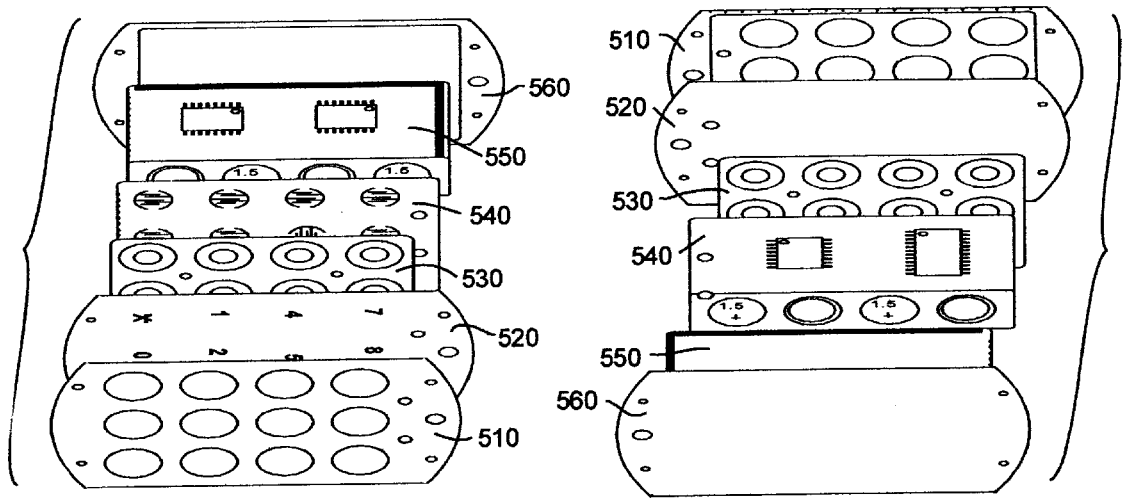
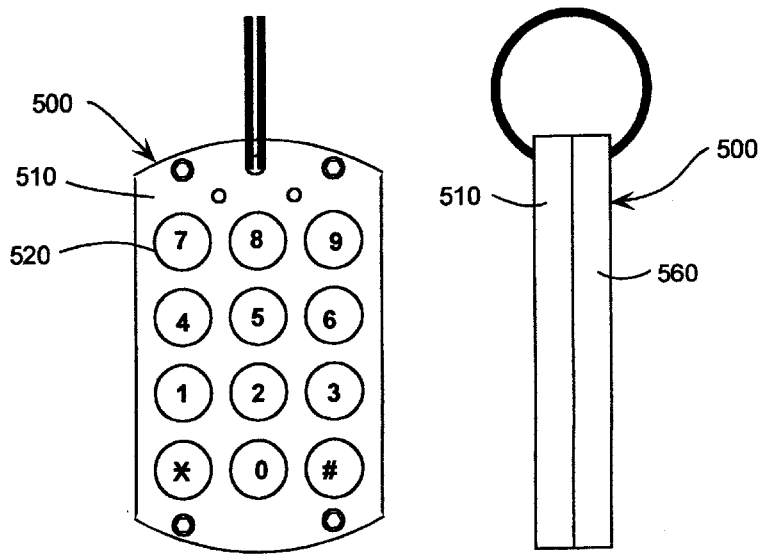
Fig.177  Fig.178
Fig.179  Fig.180

HOUSING SHARED BY VEHICLE COMPONENT AND DISABLING SWITCH AND DECODER

FIELD OF INVENTION

This invention relates to motor vehicle anti-theft systems. More particularly, this invention relates to a decoder device that, without being actuated in response to receiving a signal comprising data embodying a particular pre-selected variation of a complex coded signal from a particular transmitter device containing this particular data and being inserted into a series of different sockets in a manner similar to entering a manual code upon a keypad, disables normal operation of a system vital to starting and/or operation of a motor vehicle, and that when so actuated, enables operation of this vital system. This invention employs a durable, secure enclosure to protect the decoder device, the vital system enabled and disabled to the decoder device, and any electrical and/or mechanical communication between the decoder device and this vital system from tampering, damage, and removal.

PROBLEM INVENTION ADDRESSES

Motor vehicle theft is an epidemic with profound economic impact upon motorists. To avoid paying the full replacement or damage cost of stolen vehicles, many motorists choose to purchase vehicle theft insurance at significant cost. Furthermore, by installing costly prior art vehicle anti-theft systems in their vehicles, motorists hope to significantly reduce the probability of their vehicle being stolen, and subsequently expect lower theft insurance rates. But, motorists who have installed even the costliest and most sophisticated anti-theft systems in their vehicles receive only a paltry reduction in their vehicle theft insurance premiums because, to date, no such device has proven a significant enough deterrent to professional auto theft to justify otherwise.

Installing one or more of the most popular anti-theft systems such as a starter kill interlock, alarm device, steering wheel lock, or concealed tracking device may indeed scare away, aid the apprehension of, or discourage many thieves or would-be thieves. But, every year, in the United States alone, hundreds of thousands of cars equipped with one, several, or even all of these devices are stolen for the simple reason that no currently available motor vehicle anti-theft system effectively deters professional thieves from freely practicing their trade. The applicant believes this invention to be a significant advance toward preventing professional thieves from stealing motor vehicles.

PRIOR ATTEMPTS

There are three basic ilk of vehicle anti-theft systems: Physical deterrents which actually disable the vehicle in some way, psychological deterrents which attempt to scare away a would-be-thief, and devices which embody both a physical and psychological deterrent to vehicle theft.

Unfortunately, all prior art physical deterrents to vehicle theft are either effective at the expense of being difficult or impractical to actually use, or are easy to use but are easily defeated by professional thieves, thus prompting the public to believe that there is no practical way to physically deter a professional vehicle thief. For this reason, many vehicle owners have opted to equip their vehicles with anti-theft systems that aid in recovery of their vehicle if stone, thereby hoping to provide at least a psychological deterrent to professional thieves. The fact remains that NO prior art anti-theft system has proved to present either a significant psychological or physical deterrent to professional thieves— Vehicles equipped with the even the most expensive and sophisticated vehicle recovery systems are still stolen, not always recovered, and often recovered damaged and or stripped.

By first examining just how easily professional, and in some cases amateur thieves defeat motor vehicle anti-theft systems currently regarded as the finest available, and what the vehicle owner, installer, and police must do in order for these devices to be at all effective, the weakness of prior art, as well as the strengths of this invention, when they are finally described in detail, will appear far clearer. Furthermore, in light of the shortcomings of even the most recently patented advances in the area of vehicle anti-theft systems, this invention has not only escaped anticipation, but departs from all related prior art in that it embodies a way to eliminate the two most vexing shortcomings that plague all prior art vehicle anti-theft systems.

The strengths this invention offers are: A: Substantially higher level of physical security against motor vehicle theft, B: Unprecedented ease of use by the vehicle owner to obtain this substantially higher level of security; C: Unprecedented simplicity and unobtrusiveness of installation in order to achieve this substantially higher level of security.

POPULAR PRIOR ART DEVICES

Tracking Devices

LoJack was the first, and for several years was a popular and highly regarded vehicle-recovery device. It is marketed by LoJack of Los Angeles, Calif. This device currently retails by about $400 installed. It consists of a battery powered radio frequency transceiver which is hidden in an allegedly difficult-to-access location in the vehicle. The transmitter portion of the transceiver is activated by local police when the vehicle is reported stolen by the owner. When activated, this device transmits a signal intended to be monitored by police with tracking devices purchased from LoJack. By using this equipment to track a LoJack equipped vehicle, the police hopefully locate, and if not apprehend the thief while in the vehicle, at least recover the vehicle soon after it is stolen. Police departments in metropolitan areas of eight states have purchased one or more LoJack tracking devices. However, due to a recent decline in popularity of the device, and due to the special effort required by police to use the tracking equipment, some major police departments, such as the Chicago Police Department, have stopped supporting the LoJack system altogether.

Nonetheless, LoJack boasts that 95% of stolen vehicles equipped with their device are recovered within two hours.

This figure tells little about the effectiveness of the LoJack device. It does not reveal how many vehicles equipped with LoJack are stolen in the first place, nor does it tell the condition of the 95% of stolen LoJack equipped vehicles that are recovered within 2 hours, nor how many of the remaining 5% of LoJack equipped vehicles that are stolen and not recovered within 2 hours are not recovered at all. Furthermore, it remains to be seen whether this two hour period begins when the vehicle is actually stolen, or when the vehicle owner finally realizes the vehicle is missing and reports the theft to the police.

Clearly, a vehicle equipped with a LoJack will be recovered quickly only if the police care enough to track it, and only if the vehicle owner realizes immediately that his or her car has been stolen. Furthermore, the LoJack only helps if it can't be found or disabled by the thief. Should the same police who ignore the blaring sirens of car alarms be expected to intently monitor LoJack transmissions? In most cases, as shown by the Chicago Police Department abandoning the LoJack device, police officers have better things to do than look after a car. Furthermore, how can a vehicle owner be expected to know immediately if his or her car is stolen without either watching it 24 hours a day, or carrying a paging device connected to an additional alarm device, which a professional thief will likely disable before he attempts to steal the vehicle away? Finally, as will become clearer once the installation procedure for LoJack is described, professional thieves usually have an easy time finding, removing and discarding the LoJack before making off with a vehicle.

In an attempt to prevent tampering with LoJack, it is often sealed inside a hollow section of the vehicle's body. An aperture leading to such a hollow cavity must usually be cut with a torch or saw, thus making its installation obtrusive, messy and difficult. Furthermore, if the piece of metal cut out of the body is not welded back into place, the LoJack can be removed in a matter of seconds by a professional car thief. Such drastic installation procedures contribute to the high installation cost of the LoJack and their negligent execution contributes to it's spotty effectiveness against professional car thieves—The most common way in which this device is defeated by professional thieves is by simply finding where it is hidden and discarding it.

The most popular cavity in which to hide the LoJack device is really not very difficult to access—inside the driver's side rocker panel. In order to gain access to this location, the installer, (or a thief,) need only to remove several screws which affix a rubber cover over the rocker panel. If the aperture leading to the cavity has not been welded closed during installation of the device, removing this plastic cover leaves the LoJack device completely exposed. Even if the aperture leading to the cavity has been welded shut, a cheap portable torch makes quick work of cutting or weakening sheet metal, especially the 'high strength' steel sheet metals, which are easily weakened by heat and are used extensively in constructing the unit bodies of modern vehicles. Since the LoJack device can be easily located, uncovered, and removed, it's effectiveness against a professional thief, even if all else goes well, is limited by this weakness. Perhaps the greatest shortcoming of the LoJack device is the fact that it does nothing to physically deter vehicle theft in the first place.

TeleTrac is another popular vehicle anti-theft system which shares its basic principle of operation with the LoJack device. TeleTrac is presently marketed by AirTouch Corporation, (formerly Pac-Tel Corp.) of Garden Grove, Calif. This device also consists of a battery operated transmitter concealed within a vehicle; however, this transmitter differs from the LoJack transmitter in that it is activated by sensors which detect unauthorized entry or starting or driving of the vehicle. Also, unlike the LoJack device, the transmissions of the TeleTrac transmitter are monitored by AirTouch's ground-based receiving stations, instead of by local police. The receiving stations determine the location and heading of the vehicle and relay this information to the local police. Consequently, the vehicle owner need not realize immediately that his or her vehicle is missing in order to initiate timely activation of the transmitter.

Unfortunately, this device shares all of the other shortcomings of the LoJack device in that the transmitter is still easily found and removed by professional thieves, and the police most still care enough to pursue. Finally, at an installed retail price of $b 595,plus a $35 "hookup" fee, plus $95 per year for the monitoring services of AirTouch, this device is significantly more expensive than the LoJack.

Auto-Trac is yet a third tracking and recovery device. It is marketed by Auto-Trac of Dallas, Tex. This device consists of a transmitter installed in the vehicle which, when activated, determines the position of the vehicle via an onboard Global Positioning System, (GPS,) receiver (which calculates position by tracking the beacon's of several of 21 geosynchronous satellites) then transmits this information to Auto-Trac's monitoring facility via either UHF radio, VHF radio, cellular phone, or satellite relayed microwave signal, whereupon Auto-Trac notifies the local police of the location of the stolen vehicle. Unfortunately, the vehicle based transceiver that is part of this device is too large to fit inside a closed frame member of the vehicle and, furthermore, requires connection to both the vehicle's electrical system and to external satellite and/or radio-frequency antennas. Thus the unit is even easier to locate, remove, and disable than a LoJack or TeleTrac transceiver.

Although a GPC receiver gives astonishingly accurate position information when it works properly, in order to work at all, it needs a special antenna that must be placed in an area free of metal obstruction (i.e. in the window of the vehicle). Thus the antenna is easy to find, and need only be shielded by metal or disconnected from the transceiver in order to completely disable the device from relaying position information. The ease with which this device may be located and disabled by a thief minimally educated in its function makes this device impractical as a deterrent to professional thieves. This device is extremely expensive in light of tis utility—$800 to $1200 (depending upon choice of radio frequency, cellular, or satellite link between vehicle transceiver and Auto-Trac monitoring facility) plus a monthly monitoring fee of between $10 and $15.

Intercept, marketed by Code Alarm of Madison Heights, Mich., is a fourth recently developed tracking/recovery style vehicle anti-theft system. Like Auto-Trac, Intercept is activated by an attempted theft and relays navigation data to a tracking station that in turn notifies police of the location of the vehicle. The vehicle mounted Intercept device uses the Loran C navigation device instead of a GPC receiver. While this navigation device does not rely as heavily upon an unobstructed antenna, it still requires an external antenna which can be easily disconnected.

The Intercept system also consists of several separate pieces which must be mounted to the vehicle, each of which is too large to be concealed in a hollow body section, and requires not only connection to the vehicle's electrical system, but also to other parts of the Intercept system. This prevents the device from being well concealed and protected from removal by a pro, and allows easy disabling by cutting cables or simply unplugging parts. This device comes bundled with a cellular telephone which must be permanently installed in the vehicle. The cellular telephone serves as tantalizing bait for amateur thieves, and contributes to the device's price of $1599. Furthermore, since this cellular telephone is employed to relay navigation information to the tracking station, if removed, this feature of the system is disabled, (see infra comments pertaining to Help Express.)

A recently patented device with claimed vehicle anti-theft benefits comes from Help Express of San Diego, Calif. Help Express receives packets of data sent by a transceiver onboard the vehicle, descriptive of the received signal strength of several cellular telephone network cells nearest the vehicle. By manipulating this data, Help Express claims to be able to determine the location of the transceiver to within 100 feet. The circuitry and software for this transceiver are incorporated into a cellular telephone, which presents new benefits, and new problems.

Although this feature makes the device useful as a personal security device (when installed inside a pocket-sized portable cellular phone,) it offers little or no benefit as far as vehicle security is concerned. Thieves will be aware of the availability of this new device, and look upon a cellular phone inside a vehicle not as a bonus prize, but as a threat to being caught. Who but the most greedy amateur vehicle thief would risk even a slight additional chance of being caught stealing a $20,000 car, (or a $2,000 car, or a $120,000 car,) for not parting with what appears to be a $300 cellular telephone. Expect any professional vehicle thief to know of this device, to keep these numbers in mind, and to search for, tear out by the roots, and deposit summarily upon the curb any cellular phone left inside a vehicle before he or she makes off with that vehicle.

Physical Deterrents

A popular physical deterrent type anti-theft device is The Club, marketed by Winner International of Sharon, Pa. This device is a long steel rod that locks to a steering wheel. When attached, The Club limits turning the steering wheel of the vehicle. This device was effective against amateur thieves. But, professional car thieves developed several quick and easy methods of defeating this device, and as of late, these techniques are not only known and used by amateurs, but are known to the general public thanks to the concern of investigative journalists.

The pro either unbolts the steering wheel from a vehicle's steering column and then steers the vehicle with a pair of locking pliers gripping the splined end of the steering column shaft, or he cuts a section out of the steering wheel with a hacksaw or chain cutters to allow removal of The Club and normal steering, or, perhaps the easiest method, he uses The Club itself as a lever to break the steering wheel and allow removal of The Club. The Club has subsequently proven to not deter professional thieves at all, and has lately become an object of ridicule even among small time thieves. None the less, The Club. remains popular, due in no small part to its manufacturer agreeing to pay $500–$2000 toward the customer's insurance deductible if a Club equipped vehicle is stolen and not recovered. Many motorists are happy to keep the $50 Club in their car just for this guarantee, and are quite happy when they learn that most stolen vehicles are in fact recovered, and frequently are recovered with extensive damage, in which case Winner International does not pay them a dime for their trouble.

Another physical deterrent type anti-theft system is a wire lock. Several companies market a kit that consists of a plastic electrical plug with a length of identically colored wire attached to each pin, and a "key" which mates with the plug and shorts pairs of pins of the plug in a particular pattern. In order to install this kit into a vehicle, a number of wires (half of the number of pins in the plug) are cut (preferably wires that power devices or systems vital to operating the vehicle) and two of the wires coming from the plug are spliced into each cut connection so that when the "key" is inserted into the plug, each of the cut wires is reconnected properly through the plug/key combination. The plug is to be hidden under the dashboard of the vehicle to avoid detection by cursory inspection, while the key is to be carried by the vehicle owner.

This clever device is not easily defeated. Randomly shorting the pins of the plug, in an attempt to simulate the function of the "key" (especially without first using a volt/ohm meter to discover any ground or power wires) could blow fuses and damage the disabled devices or the vehicle's electrical system thereby making stealing the vehicle more difficult. Furthermore, all of the wires coming from the plug are the same color, so that in order to restore the broken connections with the key, these wires must be traced all the way back to each original cut wire—a difficult and potentially time consuming task. But, defeating this device is possible, and discrete since this device may usually be tampered with by a thief while he or she is sitting inconspicuously in the drivers seat of the vehicle.

Defeating this device would not be easy for an amateur vehicle thief, but pros come to battle armed with such automotive knowledge as characteristic resistance's, impedance's, and capacitance's of typically disabled devices in specific vehicles as an aid to properly reconnecting the cut wires without leaving the driver's seat. An uninformed thief has initial odds of properly reconnecting the cut wires equal to one chance in the number of pins −1, factorial (example: 8 pins: $7!=7*6*5*4*3*2*1=5040$,). These odds substantially improve after using a volt-ohm meter for 15 seconds to identify any grounded and or positive pins of the wire lock, (possibly $(n-4)!=24$) so the pro might try his luck and succeed.

Or, the pro will simply try starting the vehicle, note which devices are not operating, then apply power directly to each, (example: starter solenoid, ignition distributor, engine control computer, electric fuel pump.) Assuming this professional will have the foresight to disable any noisemaker [prior art anti-theft system] before attempting to start the vehicle, a window of opportunity during which to wire power to the disabled devices is usually easy to come by.

This device is excellent in that it is cheap and annoying to defeat; however, it does not offer enough annoyance to the professional to make him move on before at least trying to defeat it. With a little luck and effort, he or she will succeed in stealing a wire lock equipped vehicle; without such luck, he or she will likely destroy the electrical system of the vehicle.

The concealed kill switch is a simple and effective physical deterrent to vehicle theft. A concealed kill switch is merely a tiny but otherwise ordinary electrical switch that may be hidden virtually anywhere in a vehicle and is installed either so that when open it opens a circuit supplying power to the starter solenoid, electrical fuel pump, etc., or so that when closed it grounds a power wire that ordinarily conducts power to one of the aforementioned vehicle components. In either configuration, the vehicle will not start unless the kill switch is in the proper position.

Although simple and quite effective against amateur vehicle thieves, this device has major weaknesses which make it a laughing matter for professional thieves:

One: NO HIDING PLACE IS SECURE. For the sake of convenience, the kill switch is often placed so as to be easily accessible to the driver. If placed somewhere outside the vehicle's cabin, such as in a wheel well, the drive must crouch down to set or reset the switch, thereby giving away, by this seemingly strange behavior, the location of the switch to any wily thief who may be watching. As an alternative, the switch is often placed near the driver's seat, in one of several common locations: (A) on the shaft of or behind one of the pedals: (B) under the carpeting at the driver's or passengers feet; (C) under the dashboard; or (D) under either front seat. Professional thieves are well aware of all these hiding places, as well as all those external to the cabin. There are, unfortunately, a limited number of places to hide even small objects within a vehicle.

Two: TWELVE VOLTS ARE EASY TO COME BY. No matter where the switch is hidden, there must be wires connecting it to whatever device it disables. Once the thief determines which device has been disabled, by attempting to start the vehicle, these wires are necessarily easy to locate— They must either terminate at the disabled device itself or at some point along only several feet of wire that follows a path published in any good service manual for the vehicle, (which incidentally can be perused free of charge at many retail auto parts stores.) Finding any stray wires usually leads the thief directly to the switch—just flip and go. Finally, the thief does not even have to locate the switch in order to eliminate its effects. Without regard to the kill switch, the original wires powering the disabled device may be cut, and power then routed to the disabled device directly from any "hot" wire in the vehicle or from a wire attached directly to the vehicle's battery. Often, depending upon exactly how the switch has been installed, it may be bypassed in such a manner from the driver's seat just as quickly and easily as the vehicle could be hot-wired if it had no kill switch.

The most vexing weaknesses of the kill switch are the most vexing weaknesses of ANY presently available electrical or electronic anti-theft system—Electrical components and wiring of any prior art vehicle anti-theft system must be hidden yet it is impossible to adequately hide any device or wires within a vehicle; and, any component electrically "disabled" by any currently available anti-theft system may be activated simply by applying power directly to that device.

Nearly every electrical device within a vehicle is controlled with a one bit on/off signal, and no prior art anti-theft system discards this simple control logic. If a code is to be deciphered at all in an existing anti-theft system, in order to turn a device on or off, this decoding is done at a location remote to the component controlled, in a "black box." Any wiring between such a prior art "black box" and a vehicle component that it controls carries not a code, but a code already boiled down to ON or OFF—an ON being easily reproduced by wiring the device directly to the vehicle's battery.

Retaining one bit on/off signals to control disabling or enabling of a component of a vehicle or anti-theft system makes such a system easy to defeat, and requires that components of the system be hidden in order to minimize the likelihood of their function being bypassed.

This invention eliminates both of these weaknesses of prior art anti-theft systems—By physically and electrically modifying a component of a vehicle such that this component can not be activated by a simple one bit on/off signal, but must instead receive a complex coded signal in order to operate, provided this complex signal may not be easily reproduced, no component of this anti-theft system needs to be hidden. The simple methods and apparati of this invention could easily be applied to the design of original components of motor vehicles, or applied to components of existing motor vehicles, or applied to add-on, after market vehicle components.

OTHER ATTEMPTS

In the prior art there have been numerous other attempts to provide vehicle anti-theft systems.

For example, U.S. Pat. No. 5,224,567 issued in 1993 to Tomlinson discloses a "VEHICLE ANTI-THEFT DEVICE REMOTELY OPERABLE FOR DISABLING THE VEHICLE IGNITION AND STARTER". The Tomlinson device comprises a portable transmitter small enough to be retained on a key ring or kept in a purse or pocket and used by the vehicle operator to transmit an encoded signal when the operator wishes to disable or enable the vehicle. The receiver of the Tomlinson device which decodes this signal is preferably mounted in an unobtrusive location in the vehicle. This receiver is also placed in an enclosure made of a high-impact resistant steel cylinder. Exposed wires are used to connect the Tomlinson receiver to the starter. Tomlinson provides for similar enclosures for the vehicle's battery and its ignition switch, but for no other components of the vehicle. Tomlinson discloses a physically separate enclosure for each unit. Each Tomlinson receiver is activated by the encoded signal coming from the transmitter. Tomlinson does not disclose, nor does he hint, that there be a shared enclosure for the starter and a receiver. Tomlinson does not disclose a decoder to be embodied within an enclosure enclosing any means for either starting or maintaining operation of an engine. The Tomlinson device does provide means for opening the electrical circuit which powers the starter when any of the individual enclosures are tampered with. But, since the Tomlinson device does not include any enclosure of the starter itself, the Tomlinson device does not, and cannot provide any means of disabling the normal function of the vehicle's starter if power is applied to the starter directly from another battery or power source.

U.S. Pat. No. 4,552,331 issued in 1985 to Smart is entitled "REMOTELY CONTROLLABLE RESET MECHANISM FOR A VACUUM-ACTUATED SYSTEM". This discloses a solenoid which is energized to open a relief valve of the first portion of the reset stroke for a vacuum-actuated lockout device that disables a flush valve to prevent flooding a receptacle. This relates to a lockout mechanism for disabling a flush valve in an institutional toilet used in correctional facilities. No application of this device for controlling a solenoid for electrical or mechanical control is disclosed. No disclosure is made of disabling a solenoid actuated switch from energizing an electrical device such as a vehicle engine starter. This patent does not disclose any device intended to be used in a vehicle related application, nor any mechanism to be enclosed within a tamper-resistant housing that also encloses means that must be operable for either starting or maintaining operation of a vehicle.

U.S. Pat. No. 4,619,231 issued in 1986 to Stolar is entitled "SYSTEM FOR REMOTE DISABLING OF AN INTERNAL COMBUSTION ENGINE". This discloses means for remotely controlling the speed of an engine by transmission of a disabling signal by an authorized person to prevent improper operation of a vehicle equipped with a receiver for this signal. This does not disclose or suggest incorporating the receiver within a housing shared by a system vital to driving the vehicle, such as within a single housing covering both the receiver and either the starter, distributor, or electric fuel pump of a vehicle. This device does not totally disable the vehicle, it only limits the speed while permitting the engine to idle. This device was designed for use while a vehicle engine was running, and does not provide any means for disabling a vehicle engine starter. U.S. Pat. No. 4,689, 603 issued in 1987 to Conigliore is entitled "VEHICLE IGNITION AND ALARM SYSTEM". The Conigliore device is a digitally controlled ignition and security device for a car, including an alcohol detective device for preventing starting a vehicle upon detecting a predetermined alcohol content on the breath of the vehicle operator. The Conigliore patent discloses no means of enclosing both the disabling relay and receiver within a housing that also covers the starter or any other means initiating or providing or permitting operation of a vehicle engine.

U.S. Pat. No. 4,383,242 issued in 1983 so Sassover is entitled "AUTOMOBILE ANTI-THEFT SYSTEM". The Sassover device detects tampering with an automobile, and upon detecting such tampering, generates warning signals such as sounding the vehicle horn and flashing the vehicle's lights. The Sassover device is disarmed upon receipt of a signal from a remote transmitter. When the Sassover device is armed, unauthorized access is sensed by monitoring attempted opening of doors and vibrations in the vehicle radio loudspeakers. The Sassover device also locks and unlocks the vehicle's doors in response to signals from the remote transmitter. The Sassover patent discloses no enclosure shared by any system necessary for driving the vehicle and by a radio receiver. The Sassover patent does disclose a number of circuits, including encoders, transmitters, multi-channel decoders, complex arrays of logic gates, and another number of logic devices and receivers, together with a small hand-held transmitter utilizing buttons and flexible materials engaging conducting strips, many of which can be utilized as portions, but not the entire device, of an embodiment of the present invention.

Ignition-key transponders are disclosed in sketchy form in an article with that heading appearing on page 16 of AUTOMOTIVE ENGINEERING, December 1993 issue. This transponder device, disclosed generically but not in detail, utilizes a small transponder in an ignition key that carries a 64-bit identification code that can be read at radio frequencies. The device which reads a transponder key is installed in the steering column of a vehicle. If the reader fails to receive the expected signal from the transponder when the key is turned, the fuel pump relay or the electronic system of the vehicle will not function. When the reader finds that the key has the proper code, the reader supplies a high logic signal to either the fuel pump relay or an interlock turning on the vehicle's electronic system. Regardless of the status of the reader, power can be applied directly to either the vehicle's fuel pump, fuel pump relay, or electronics system since electrical communication between the reader and these components is not protected. In any case, this article does not disclose and this transponder device does not incorporate an enclosure shared by a device necessary for operating a vehicle that also encloses a decoder controlling an interlock of that device.

U.S. Pat. No. 4,107,962 issued in 1978 to MacKinnon is entitled "AUTO ANTI-THEFT DEVICE". The MacKinnon patent discloses a circuit which controls the operation of an electrically operated fuel injection system. The MacKinnon device makes use of a concealed interlock to disable a fuel injector. MacKinnon's device functions as follows:

When a vehicle equipped with MacKinnon's device is started properly, by turning the original equipment ignition switch, current energizes a relay which enables normal operation of a fuel injector, thereby allowing the vehicle to run normally. If the vehicle is started without using the original ignition switch, this relay will not be energized and, after a delay, the associated fuel injector will cease to function properly, thereby disabling the vehicle after an unauthorized driver has traveled only a short distance.

The MacKinnon patent does not disclose any complex coded signal for rendering operable a device necessary to drive a vehicle. The MacKinnon patent does not disclose an enclosure shared by a device vital to starting or driving a vehicle and by a circuit disabling that device. Finally, the MacKinnon device is easily defeated by simply applying current through the wiring of the factory ignition switch even if the switch is to be physically bypassed.

U.S. Pat. No. 4,719,460 issued in 1988 to Taksuchi et al and assigned to Nissan Motor Co. is entitled "KEYLESS ENTRY SYSTEM FOR AUTOMOTIVE VEHICLE DEVICES WITH THEFT PREVENTION FEATURES". The Taksuchi patent discloses a keyless entry device for unlocking an automotive vehicle door, trunk lid, glove box or steering column, without an ignition key. Transmitters and coded signals are utilized to this end. The Taksuchi patent discloses no enclosure shared by a device vital for starting or driving a vehicle and by a decoder of a coded signal.

U.S. Pat. No. 3,906,369 issued in 1975 to Pitman et al is entitled "FUNCTION SWITCH ARRANGEMENT FOR HAND-HELD REMOTE CONTROL UNIT". The Pitman patent discloses a portable hand held remote control transmitter with a unique arrangement of finger operated switches that made the remote control unit easier to use for controlling a crane. The Pitman patent does not discloses or suggest applying this remote control unit to any vehicle related system or any anti-theft or security related device.

U.S. Pat. No. 4,118,607 issued in 1978 to Shaffer, assigned to ITE Imperial Corp., is entitled "SWITCH MEANS FOR SWITCH ENCLOSURE". The Shaffer patent discloses an enclosed electric switch which opens an electrical circuit when the cover of the enclosure is opened. This enclosed switch is intended to prevent actuating another switch while the cover to the enclosure is open for safety reasons. The Shaffer patent discloses that the function of the enclosed switch is intended to be easily defeated. The Shaffer patent also discloses that this switch is to be placed inside an enclosure meant to be opened. The Shaffer patent discloses no application of this enclosed switch of a vehicle related system or to any anti-theft or security related application.

U.S. Pat. No. 4,104,491 issued in 1978 to Duble and assigned to Gould, Inc. is entitled "LATCH MEANS FOR SWITCH ENCLOSURE". The Duble patent should be considered in light of the same comments applied to the previously considered Shaffer patent.

U.S. Pat. No. 4,587,388 issued in 1986 to Cavini is entitled "REMOTE SWITCHING DEVICE FOR ELECTRIC TROLLING MOTOR". The Cavini patent discloses an interlock for operating an electric boat motor switch is separate from that motor and enclosed in a durable rust-proof housing activated by a foot pedal remote to that housing. The Cavini patent does not disclose any device preventing any operation of a motor, nor does it disclose any wireless transmitter or receiver nor does it disclose any coded signal, nor any device inhibiting theft.

U.S. Pat. No. 5,003,800 issued in 1991 to Bublewicz-Leszek is entitled "DOOR LOCK CONTROL SYSTEM FEATURING A REMOTE CONTROL FOR A PNEUMATICALLY POWERED DOOR LOCK MECHANISM". The Bublewicz-Leszek patent discloses a wireless device for unlocking and locking a car door. The Bublewicz-Leszek patent does not disclose any housing shared by both a system vital to starting or driving a vehicle and by a decoder controlling an interlock of that vital system.

OBJECTS OF THE INVENTION

1. Provide a vehicle anti-theft system in which the following apparati perform the following functions: an interlock or disabling entity normally disables a vehicle from unauthorized operation by disabling a device or system necessary to start or to drive the vehicle; a decoder temporarily defeats said interlock or disabling entity thereby temporarily enabling normal operation of said necessary device, in response to said decoder receiving a pre-selected variation of a complex coded signal; a shared enclosure being resistant to penetration, removal, or destruction, and enclosing said necessary device as well as said interlock/disabling entity as well as said decoder, as well as any electrical communication between said necessary device/system and said interlock/disabling entity, as well as any electrical communication between said interlock/disabling entity and said decoder.

2. Provide the aforementioned anti-theft system preventing said necessary device/system from operating responsive to any electrical conductor protruding from said enclosure being cut, being spliced to any other of said conductors, being in electrical communication with a source of electrical current, or being in electrical communication with a drain of electrical current.

3. Provide the aforementioned anti-theft system with any electrical connection point on said necessary device/system, which when energized by connection to an electrical source would ordinarily activate said system, being enclosed within said shared enclosure, these electrical connection points therefore being inaccessible from outside said shared enclosure.

4. Provide the aforementioned anti-theft system with said decoder defeating said interlock/disabling entity only in response to receiving and decoding both electronically and manually generated pre-selected variations of complex coded signals.

5. Provide the aforementioned anti-theft system, where said necessary device/system is secured inside of said shared enclosure, (in a first manner,) by special fasteners that can be removed only with special tools having a peculiar shape; or, alternatively, in a second manner; by fasteners that may be installed with common tools, but that are machined, welded, ground, or otherwise deformed after installation so as to require additional machining, welding, or grinding to allow their removal with standard tools; or, alternatively, a third manner; said necessary device/system is secured inside of said shared enclosure by fusion welding, brazing, or soldering these two pieces together; or, alternatively, in a yet a fourth manner; after installation of said necessary device/system into said shared enclosure, an additional piece is welded, brazed, or soldered to this enclosure or to said necessary device/system so as to modify its shape sufficiently to prevent removing said necessary device/system from said shared enclosure without cutting away, or melting the solder or other filler metal securing said additional piece to said shared enclosure or to said necessary device/system; or, alternatively, in a fifth manner; after installation of said necessary device/system into said shared enclosure, any gaps between said necessary device/system and said shared enclosure being filled with a hardening filler material such as epoxy, or another thermoplastic resin, or cement.

6. Provide the aforementioned anti-theft system such that said shared enclosure is secured to a vehicle (in a first manner) by fasteners that can be removed only with special tools having a peculiar shape; or, alternatively, in a second manner; where said shared enclosure is secured to a vehicle by fasteners that may be installed with common tools, but that are machined, welded, ground, or otherwise deformed after installation so as to require additional machining, welding, or grinding to allow their removal with standard tools; or, alternatively, in a third manner; where said shared enclosure is secured to a vehicle by fusion welding, brazing, or soldering these two pieces together.

7. Provide the aforementioned anti-theft system such that said necessary device/system is secured to a vehicle (in a first manner) by fasteners that can be removed only with special tools having a peculiar shape; or, alternatively, said necessary device/system is secured to a vehicle by fasteners that may be installed with common tools, but that are machined, welded, ground, or otherwise deformed after installation so as to require additional machining, welding, or grinding to allow their removal with standard tools; or, alternatively, said necessary device/system is secured to a vehicle by fusion welding, brazing, or soldering these two pieces together.

8. Provide the aforementioned anti-theft system, where the original enclosure of said necessary device/system is initially constructed or modified so as to embody said shared enclosure.

9. Provide the aforementioned anti-theft system where a part of the vehicle to which or within which said necessary device/system ordinarily mounts or which is related to the mounting of or function of said necessary device/system is initially constructed or modified after initial construction so as to embody said shared enclosure.

10. Provide the aforementioned anti-theft system where a part of the vehicle unrelated to the mounting of, or function of said necessary device/system is initially constructed or modified so as to embody said shared enclosure.

11. Provide the aforementioned anti-theft system with said shared enclosure being made, at least in part, from sections of metal tubing or pipe.

12. Provide the aforementioned anti-theft system where said shared enclosure is secured in a location normally inaccessible from the cabin of the vehicle, such as underneath the vehicle or embedded within the engine compartment.

13. Provide a second anti-theft system, embodying the features of the aforementioned anti-theft system, with said necessary device/system being a starter motor or starting system comprising the starter motor and starter actuating solenoid switch, (such a system being necessary for starting the engine of a vehicle equipped with an automatic transmission,) this starter motor or starting system being enclosed within said shared enclosure.

14. Provide the aforementioned second anti-theft system with said interlock/disabling entity preventing the starter from being sufficiently electrically energized to start the engine.

15. Provide the aforementioned second anti-theft system with the said interlock/disabling entity preventing the hold in coil of the solenoid switch from being sufficiently electrically energized to close a circuit supplying electrical power to the starter motor, thereby said interlock/disabling entity would prevent the starter from being sufficiently electrically energized to start the engine.

16. Provide a third anti-theft system embodying the features of the aforementioned second anti-theft system including a starter motor and starter actuating solenoid switch, both enclosed within the aforementioned shared enclosure.

17. Provide the aforementioned third anti-theft system with the said shared enclosure having the general shape of and enclosing the outside of the starter motor and starter actuating solenoid switch, which are themselves typically installed in a vehicle in a stacked cylindrical arrangement, (when viewed from the rear, this system appears to have the two dimensional shape of the numeral "8",) said ENCLOSURE not projecting far in any direction beyond the dimensions of the original starter motor and solenoid switch so as not to interfere with or require extensive modification of surrounding components of the vehicle or standard mounting components for the starter or solenoid switch to provide sufficient room to install said shared enclosure in vehicle.

18. Provide the aforementioned third anti-theft system with said shared enclosure being constructed into the immediately aforementioned stacked cylindrical shape of the starter motor and solenoid by welding or otherwise joining two or more longitudinal sections of pipe or tubing into an integral whole encompassing the starter motor and solenoid switch, or by forming one or more flat pieces of metal into this shape, or by casting or forging metal into this shape so as to form an integral whole encompassing the starter motor and solenoid switch, and having the same stacked cylindrical shape as the starter motor and solenoid switch.

19. Provide the aforementioned third anti-theft system with said shared enclosure having the stacked cylindrical shape of the starter motor and solenoid switch and comprising flat pieces to cover the ends of these cylinders, these flat pieces also being welded or otherwise joined, formed, forged, or cast into the immediately aforesaid integral whole encompassing the starter motor and solenoid switch.

20. Provide a fourth anti-theft system, embodying each or all of the aforementioned anti-theft systems, with one or more electrical connection points external to said shared enclosure, and communicating electricity to the interior thereof.

21. Provide the aforementioned fourth anti-theft system where any electrical connections between said external electrical connection points and said necessary device/system being normally open and being enclosed within said shared enclosure.

22. Provide the aforementioned fourth anti-theft system with any electrical connections between said electrical connection points and said interlock/disabling entity being enclosed within said shared enclosure.

23. Provide a fifth anti-theft system embodying each or all of the aforementioned anti-theft systems, with any electrical connections between said interlock/disabling entity and said necessary device/system, these electrical connections being enclosed within said shared enclosure.

24. Provide each or all of the aforementioned anti-theft systems with the aforementioned interlock/disabling entity being rendered inoperable upon receipt of and processing of a complex signal by a master transceiver part of the decoder enclosed within said shared enclosure and in electrical communication with said interlock/disabling entity, this signal being transmitted by wired or wireless means from a slave transceiver remote to said shared enclosure.

25. Provide each or all of the aforementioned anti-theft systems, where said interlock/disabling entity is defeated by a complex sequence of transactions and processing of serially coded digital information exchanged between a master transceiver part of the decoder and a slave transceiver outside the shared enclosure via a multi-channel serial data bus connecting the two.

26. Provide each or all of the aforementioned anti-theft systems with a multi-channel serial data bus outside the shared enclosure that consists of a group of sockets into which a slave transceiver can be easily momentarily inserted by the driver of a vehicle, each socket being in electrical communication with a master transceiver part of the decoder via wires, said wires being bundled yet electrically insulated from each other, said bundle being shielded to prevent reception of or transmission of radio frequency signals, said bundled wires being sheathed in a heat resistant insulating material and passed through the fire wall of the vehicle and into the shared enclosure where said wires shall connect to the master transceiver circuit of the decoder.

27. Provide each of all of the aforementioned anti-theft systems, in which a slave transceiver is remote to said shared enclosure and has the size and weight of, as well as the durable physical properties of any ordinary key chain fob, so that it may be carried on, and used while attached to a key ring.

28. Provide each or all of the aforementioned anti-theft systems in which a slave transceiver has the general shape of a solid right cylinder and has two electrical contact surfaces, one such surface being round and flat in shape shall come into electrical contact with a data line of a multi channel serial data bus outside the shared enclosure when said slave transceiver is inserted into a socket of an array of sockets, while the other being right cylindrical in shape but with only one closed end such that when said slave transceiver is placed into said socket the right cylindrical portion of said slave transceiver shall be in electrical contact with the common electrical ground of the anti-theft system.

29. Provide a sixth anti-theft system embodying one or all of the aforementioned anti-theft systems, in which an array of sockets shall comprise an array of wire traces on a printed circuit board outside the shared enclosure, said wire traces being in the shape of alphanumeric characters or forming the outline thereof, each of said characters or outlines of characters being in electrical contact with one data line of a multi-channel serial data bus.

30. Provide the aforementioned sixth anti-theft system in which said wire traces in the shape of alphanumeric characters or the outlines thereof shall be illuminated roughly parallel to the plane of said circuit board, preferably by light emitting diodes attached to said printed circuit board.

31. Provide one or all of the aforementioned anti-theft systems in which a flat piece of sheet metal, preferably stainless steel, is in electrical contact with the common electrical ground of the anti-theft system, and is perforated or otherwise fabricated such that it has a number of apertures corresponding to the number of sockets making up an array of sockets, each of said apertures therefore also being in electrical contact with said common electrical ground of the anti-theft system, and each of said apertures being similar in diameter to a cylindrical slave transceiver such that a curved ground contact of said cylindrical slave transceiver shall come into electrical contact with said aperture upon being inserted into one of said apertures with any degree of force parallel to the plane of said flat piece of sheet metal.

32. Provide one or all of the aforementioned anti-theft systems, in which said shared enclosure is made of a composite material comprising fibers that have tensile strength and or compressive strength and or toughness in excess of that of hardened steel and or are electrically non-conductive, such as aramid fiber in an epoxy matrix, carbon fiber in an epoxy matrix, aramid and carbon fibers in an epoxy matrix, or carbon and or aramid fiber cloth or tape in an epoxy matrix; said fibers being wrapped around said necessary device/system, interlock/disabling entity and decoder.

33. Provide the aforementioned third anti-theft system in which said interlock/disabling entity comprises a transistor switch, electromechanical relay, silicon controlled rectifier, solid state relay, optoisolator, or other solid state, hybrid, or mechanical switching device or combination of switching devices which, only as long as it receives electrical current from said decoder, establishes normal electrical communication between said starter solenoid switch and said electrical connection point, thereby allowing said starter solenoid switch to be normally powered through the vehicle's factory ignition switch. Under any other circumstances, this interlock/disabling entity will prevent electrical communication between said solenoid and said electrical connection point, thereby preventing said starter solenoid switch from being powered at all.

34. Provide each or all the aforementioned anti-theft systems with only one serial data line and with switching circuitry in the decoder in electrical communication with a group of sockets, located outside the shared enclosure, into which a slave transceiver can be easily momentarily inserted; said switching circuitry being controlled by a master transceiver in said decoder and selectively connecting the said singular serial data line to one socket at a time; said switching circuitry thereby functioning as a single pole multiple throw switch.

35. Provide each or all of the aforementioned anti-theft systems in which a master transceiver in the decoder comprises a microcontroller with nonvolatile memory and other peripheral circuitry such as is sufficient to allow storage and execution of a program designed to reset and acknowledge the presence of, transmit commands and addresses and passwords and data to, and receive and decode and store and process information received from a slave transceiver outside the shared enclosure.

36. Provide each or all of the aforementioned anti-theft systems, in which a slave transceiver outside the shared enclosure comprises nonvolatile memory, and control circuitry which enables password protected access to this nonvolatile memory by a master transceiver in the decoder, and in which said slave transceiver also comprises circuitry to enable recognition of and response to properly formatted commands and reset signals transmitted by said master transceiver, and in which said slave transceiver also comprises circuitry to enable transmitting data to and receiving data transmitted by said master transmitter.

37. Provide each or all of the aforementioned anti-theft systems in which said master transceiver in said decoder shall respectively receive and process a pre-selected variation of a complex signal from a particular slave transceiver device if and only if a pre-selected variation of a secondary code is manually actuated by connecting said particular slave transceiver to a sequence of several sockets connected to said master transceiver.

38. Provide a seventh anti-theft system, identical to each or all of the aforementioned anti-theft systems, with the exception that the interlock/disabling entity shall be temporarily defeated upon receipt of a primary complex signal within the said shared enclosure by a multi-channel receiver; said primary complex signal being transmitted by wireless or fiber optic means, said primary complex signal being transmitted and received by modulating and demodulating an array of one or more different carrier frequencies of at least 20 kilohertz and falling into the frequency range of the radio, infra-red, microwave, visible, ultraviolet, or x-ray regions of the electromagnetic spectrum.

39. Provide the aforementioned seventh anti-theft system in which the aforementioned complex signal if transmitted by a transmitter remote to said shared enclosure.

40. Provide the aforementioned seventh anti-theft system in which said remote transmitter shall transmit said complex signal in parallel fashion on an array of carrier frequencies only in response to said remote transmitter receiving a secondary manual code being entered by pressing a sequence of buttons which form a keypad on said remote transmitter.

41. Provide an eighth anti-theft system identical to the aforementioned seventh anti-theft system except that said interlock/disabling entity shall be defeated by a sequence of complex signals, sent serially by a transmitter remote to said shared enclosure only in response to pressing a sequence of buttons which form a keypad on said remote transmitter.

42. Provide each or all of the aforementioned anti-theft systems, in which a delay of several seconds is imposed during which no action toward defeating said interlock/disabling entity can be executed whenever an improper manual code sequence is entered either by pressing an improper sequence of buttons on a remote transmitter or by inserting a slave transmitter into an improper sequence of sockets connected to a corresponding array of improper data lines, or in response to any aberration in the said receipt and said processing of complex coded data, respectively, by said master transceiver or by said decoder, or in response to said multi-channel receiver receiving an improper signal, said delay helping to slow the process of finding the proper codes by random or sequential trial and error methods.

43. Provide a fastening means to be used to fasten said shared enclosure and or said necessary component/system to a vehicle; said fastener being resistant to removal by ordinary tools designed to engage ordinary threaded fasteners; said fastening means being easily removable only by extraordinary tools;

said fastening means comprising a bolt having a head; said head being shaped such that a polygonal concavity of the driving end of any ordinary tool designed to engage the head of an ordinary threaded fastener may not fit over said head; said head being shaped such that a polygonal aperture of the driving end of any tool designed to engage the head of an ordinary threaded fastener may not fit over said head; said head being shaped such that a polygonal convexity of the driving end of any tool designed to engage the head of an ordinary threaded fastener may not fit into said head; said head being free of any aperture, and free of any slot, and free of any groove; said head being free of any upstanding boss, and free of any convexity;

said bolt engaging a mounting member integral with or fixed to a component selected from the group consisting of said necessary device/system and said shared enclosure;

a collar closely surrounding said head of said bolt; said collar being journaled on said bolt and, and being rotatable with respect to said bolt, and being rotatable with respect to said mounting member; said head of said bolt being countersunk into said collar when said fastening means is fully tightened;

said collar being limited in axial translation with respect to said bolt by said head of said bolt; said collar being limited in axial translation with respect to said bolt by a nut or any fastening member threaded onto said bolt; said fastening member being countersunk into a second aperture in said collar; said nut or fastening member being at least partially protuberant from said second aperture in said collar when said nut or said fastening member is fully threaded onto said bolt; said second aperture closely surrounding said nut or fastening member;

said head having face; said face having a predetermined shape chosen from a group of shapes consisting of each non-polygonal shape having a geometric center being non-coincident with the geometric central axis of said bolt, and each shape being both non-polygonal and non-circular; a tool having, at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head.

44. Provide the fastening means immediately previously described with said collar being countersunk into said integral or fixed mounting member to a depth such that when said fastening means are fully tightened, the top of said collar is substantially flush with the top surface of said integral or fixed mounting member.

45. Provide a method of physically inhibiting vehicle theft by replacing a component or system of a vehicle with either another of that same component/assembly or a different component/assembly performing the same function as the original component/assembly, either replacement having previously been aromored in a durable shared enclosure; said shared enclosure also enclosing an added interlock/disabling entity disabling the function of the said replacement component/assembly and enclosing a decoder controlling the interlock/disabling entity, and enclosing any wiring between said decoder and said interlock/disabling entity, and enclosing any wiring between said replacement component/assembly and said interlock/disabling entity.

46. Provide a method of physically inhibiting vehicle theft by armoring within an integral shared enclosure the following apparati: a vehicle component or system necessary to operate said vehicle, an interlock/disabling entity disabling said vehicle component or system, and a decoder controlling the said interlock/disabling entity.

47. Provide a method of preventing a vehicle's engine from being started by armoring within a shared enclosure a vehicle's starter-solenoid assembly together with an interlock/disabling entity normally disabling said starter-solenoid assembly; said shared enclosure also enclosing a decoder conditionable to temporarily defeat said interlock/disabling entity thereby temporarily enabling said starter-solenoid assembly to operate, and said engine to be started; a transmitter device external to said enclosure and bearing unique unalterable identification data, and being capable of transmitting, to said decoder, said unalterable identification data, a pre-selected variation of a primary complex coded signal and multiple variations of a manually coded secondary signal; said decoder receiving said pre-selected variation of said primary complex coded signal responsive to receiving a primary preselected variation of a manually coded secondary signal from said transmitter device; said decoder receiving said pre-selected variation of said primary complex coded signal responsive to receiving one of several secondary variations of said manually coded secondary signal; said decoder receiving said preselected variation of said primary complex coded signal only from a particular preselected transmitter device bearing a particular set of said unique unalterable identification data.

48. Provide a the method outlined in object 47 with the additional steps of conditioning said decoder to receive said pre-selected variation of said primary complex coded signal from only one particular transmitter device at any given time responsive to receiving said primary pre-selected variation of said manually coded secondary signal by establishing a one to one to one relationship between a group of variations of said identification data, a group of variations of said secondary signal, and a group of variations of a tertiary signal by storing a table of data in memory of said decoder; said table having three corresponding columns of data entries; the first column of said table comprising a list of different variations of said unique unalterable identification data; the second column of said table comprising a list of different variations of said secondary signal; the third column of said table comprising a list of different variations of a manually coded tertiary signal; said decoder accepting said pre-selected variation of said primary complex coded signal only from a slave device carrying unique unalterable identification data described by data found in the said first column of a particular pre-selected row of said table, responsive to said transmitter device, (identified by data found in said particular row of said first column,) being used to enter the particular primary variation of said secondary manually coded signal described by data found in the said second column of that same row of said table; said decoder being conditioned to accept said pre-selected variation of said primary complex coded signal from another transmitter device not carrying unique unalterable identification data matching data found in said first column and said particular pre-selected row of said table, provided a different row of said table is pre-selected; said different row being selected provided said other transmitter's unique unalterable identification data matches data found in another row of said first column of said table and provided said other transmitter device is used to enter the particular variation of said tertiary manually encoded signal matching data found in this same other row of said table, in said third column of said table.

49. Provide the methods outlined in objects 47 and 48 with the additional steps of pre-selecting a secondary variation of said secondary manually encoded signal that said decoder will accept, in lieu of said primary pre-selected variation of said secondary signal, for period of several hours, or several uses, or until said primary pre-selected variation of this secondary signal is again received by said decoder, whichever occurs first; the vehicle owner pre-selecting said secondary variation of said secondary manually encoded signal by manually encoding this signal, immediately after said decoder receives said pre-selected variation of said primary complex coded signal in response to receiving said primary pre-selected variation of said secondary manually encoded signal.

50. Provide the methods of objects 47, 48 and 49 with the additional steps of pre-selecting a tertiary variation of said secondary manually encoded signal that said decoder will accept, in lieu of said primary pre-selected variation of said secondary signal, for a period of several weeks, or until said primary pre-selected variation of this secondary signal is again received by said decoder, whichever occurs first; said tertiary pre-selected variation of said secondary signal, once pre-selected, being partially comprised of said secondary pre-selected variation of said secondary signal, and preventing said secondary pre-selected variation from being recognized except as a part of said tertiary variation; a vehicle owner pre-selecting said tertiary variation of said secondary manually encoded signal by manually encoding this signal, immediately after pre-selecting said secondary pre-selected variation of said secondary signal;

54. Provide a printed circuit board having wire traces in the shape of alphanumeric characters, or the outlines thereof, upon which solder forms a convex upstanding three dimensional substantially curved surfaced boss which reflects light and which shall be illuminated, roughly parallel to the plane of said circuit board, by light emitting diodes attached to said printed circuit board.

These and other objects of this invention can be more fully understood from the following specifications and claims.

SUMMARY OF THE INVENTION

An embodiment of the present invention ARMORS a device like the starter motor so that power can NOT be applied directly to it in order to operate it, and further, replaces the simple single big on/off logic, traditionally used to control various components of an anti-theft system and of a vehicle physically separate from each other, with huge packets of data containing extremely complex, almost indecipherable codes, which must be deciphered INSIDE THE ARMOR which covers any device to be activated. Furthermore, because present technology allows extremely fast, reliable and secure reading writing and storage of data to tiny durable portable media such as the Touch Memory, (TM Dallas Semiconductor Corporation,) user insertable memory products marketed by Dallas Semiconductor Corporation of Dallas, Tex., these complex codes can be carried on a key ring. Also, because presently available microcontrollers, which are generally necessary to communicate with user insertable memory products such as the Dallas Touch Memory™ devices and certainly necessary to decipher such complex codes, are manufactured in such small, durable, heat resistant packages they may be placed in tiny cervices WITHIN components of the vehicle or WITHIN the ARMOR which covers these vehicle components as specified in the following detailed description of the present invention. Additionally, in order to install an embodiment of the present invention, not a single wire of the original electrical system of the vehicle need be cut or rerouted, save moving one to three wires from the armored device itself to the same number of connectors on the outside of its armor. Only one thin cable need connect a dashboard-mounted input device to the armor, this cable carrying nothing to the decoder but complex coded data, NOT simple one bit on/off signals. Finally, because of the use of unique fasteners, which are a portion of several embodiments of this invention, these portions of this invention should be significantly resistant to removal from the vehicle. For these reasons, the applicant believes the present invention to be a true breakthrough in the art of vehicle anti-theft devices.

ON THE DRAWINGS

FIG. 1 is a diagrammatic view of typical prior art starter system showing major components thereof and basic electrical connections within starter system and between starter system and vehicle electrical system;

FIG. 2 is a diagrammatic view of the preferred embodiment of this invention showing most of its components;

FIG. 7 is a perspective exploded view of the installation of a prior art starter system onto a prior art engine;

FIG. 8 depicts installation of the preferred embodiments of the shared enclosure and special fastener portions of this invention to the same prior art starter system and engine as shown in FIG. 7;

FIG. 11 is a perspective exploded view of the installation of a prior art starter system onto a prior art engine;

FIG. 12 depicts installation of the preferred embodiments of the shared enclosure and special fastener portion of this invention to the same prior art starter system and engine as shown in FIG. 11;

FIG. 13 is a perspective exploded view of the installation of a prior art starter system onto a prior art engine;

FIG. 14 depicts installation of the preferred embodiments of the shared enclosure and special fastener portion of this invention to the same prior art starter system and engine as shown in FIG. 13;

FIG. 18 is a front view of the bare keyhole pad circuit board portion of the preferred embodiment of this invention;

FIG. 19 is a bottom view of the bare keyhole pad circuit board portion of the preferred embodiment of this invention;

FIG. 20 is a right side view of the apparatus shown in FIG. 19;

FIG. 21 is a rear view of the apparatus shown in FIG. 19;

FIG. 22 is a magnified top view of a prior art surface mount chip style LED such as that used on the keyhole pad circuit portion of the preferred embodiment of this invention;

FIG. 23 is a magnified front view of the apparatus shown in FIG. 22;

FIG. 24 is a magnified bottom view of the apparatus shown in FIG. 22;

FIG. 25 is a magnified side view of the apparatus shown in FIG. 22;

FIG. 26 is a front view of a prior art diode such as that used in both the keyhole pad circuit and master transceiver/disabling entity circuit portions of the preferred embodiment of this invention;

FIG. 27 is a side view of the apparatus shown in FIG. 26;

FIG. 28 is a front view of a prior art disc type capacitor such as that used in both the keyhole pad circuit and master transceiver/disabling entity circuit portions of the preferred embodiment of this invention;

FIG. 29 is a side view of the apparatus shown in FIG. 28;

FIG. 30 Is a top view of surface mount 24 pin integrated circuit analogous to the multiplexer/demultiplexer integrated circuit used in the keyhole pad circuit portion of the preferred embodiment of this invention;

FIG. 31 is a side view of the apparatus shown in FIG. 30

FIG. 32 is an end view of the apparatus shown in FIG. 30

FIG. 33 is a top view of a surface mount 16 pin integrated circuit analogous to the 4 bit binary counter integrated circuit used in the keyhole pad circuit portion of the preferred embodiment of this invention;

FIG. 34 is an end view of the apparatus shown in FIG. 33;

FIG. 35 is a side view of the apparatus shown in FIG. 33;

FIG. 36 is a top view of the keyhole pad circuit portion of the preferred embodiment of this invention.

FIG. 37 is a front view of the apparatus shown in FIG. 36;

FIG. 38 is a bottom view of the apparatus shown in FIG. 36;

FIG. 39 is a right side view of the apparatus shown in FIG. 36;

FIG. 40 is a top view of the apparatus shown in FIG. 36;

FIG. 41 is a rear view of the apparatus shown in FIG. 36;

FIG. 42 is a bottom view of the apparatus shown in FIG. 36;

FIG. 43 is a front view of stainless steel keyhole pad facia portion of the preferred embodiment of this invention;

FIG. 44 is a bottom view of the apparatus shown in FIG. 43;

FIG. 45 is a right side view of the apparatus shown in FIG. 43;

FIG. 46 is a top view of the fully assembled keyhole pad circuit portion of the preferred embodiment of this invention;

FIG. 47 is a front view of the apparatus shown in FIG. 46;

FIG. 48 is a bottom view of the apparatus shown in FIG. 46;

FIG. 49 is a right side view of the apparatus shown in FIG. 46;

FIG. 61 is a rear view of an alternative embodiment of the shared enclosure portion of this invention, without front or rear covers, as constructed to fit the prior art starter system shown in FIG. 55;

FIG. 62 is a right side view of the apparatus shown in FIG. 61;

FIG. 63 is a front view of the apparatus shown in FIG. 61;

FIG. 64 is a left side view of the apparatus shown in FIG. 61;

FIG. 65 is a bottom view of the apparatus shown in FIG. 61;

FIG. 84 is a top view of the rear cover for an alternative embodiment of the shared enclosure portion of this invention constructed to fit a prior art integral solenoid type starter system;

FIG. 85 is a rear view of the apparatus shown in FIG. 84;

FIG. 86 is a right side view of the apparatus shown in FIG. 84;

FIG. 87 is a front view of the apparatus shown in FIG. 84;

FIG. 88 is a top view of the front cover for an alternative embodiment of the shared enclosure portion of this invention constructed to fit a prior art integral solenoid type starter system;

FIG. 89 is a front view of the apparatus shown in FIG. 88;

FIG. 90 is a side view of the apparatus shown in FIG. 88;

FIG. 94 is identical to FIG. 85;

FIG. 95 is a rear view of the apparatus shown in FIG. 91 installed over a prior art starter system manufactured by the Robert Bosch Corporation;

FIG. 96 is a front view of the apparati shown in FIG. 95;

FIG. 97 is identical to FIG. 89;

FIG. 98 is a rear view of an alternative embodiment of the shared enclosure portion of this invention after installation of its front and rear covers and enclosing a prior art starter system manufactured by the Robert Bosch Corporation;

FIG. 99 is a right side view of the apparati shown in FIG. 98;

FIG. 100 is a front view of the apparati shown in FIG. 98;

FIG. 108 is a top view of the preferred embodiment of the special tool portion of this invention being used to install the preferred embodiment of the special fastener portion of this invention;

FIG. 109 is an exploded front view of the preferred embodiment of the special tool portion of this invention being used to install the preferred embodiment of the special fastener portion of this invention;

FIG. 110 is a front view of the preferred embodiment of the special tool portion of this invention being used to install the preferred embodiment of the special fastener portion of this invention;

FIG. 111 is a front partial sectional view of the preferred embodiment of the special tool portion of this invention being used to install the preferred embodiment of the special fastener portion of this invention;

FIG. 112 is a top view of the assembled first alternative embodiment of the special fastener portion of this invention;

FIG. 113 is a right side sectional view of the assembled first alternative embodiment of the special fastener portion of this invention;

FIG. 114 is a bottom view of the assembled first alternative embodiment of the special fastener portion of this invention;

FIG. 115 is a rear view of the assembled first alternative embodiment of the special tool portion of this invention;

FIG. 116 is a bottom view of the first alternative embodiment of the special tool portion of this invention;

FIG. 117 is a right side view of the first alternative embodiment of the special tool portion of this invention;

FIG. 118 is a top view of the first alternative embodiment of the special tool portion of this invention;

FIG. 128 is a top view of the preferred embodiment of the special tool portion of this invention being used to install the second alternative embodiment of the special fastener portion of this invention;

FIG. 129 is an exploded front partial sectional view of the preferred embodiment of the special tool portion of this invention being used to install the second alternative embodiment of the special fastener portion of this invention;

FIG. 130 is a front partial sectional view of the preferred embodiment of the special tool portion of this invention being used to install the second alternative embodiment of the special fastener portion of this invention;

FIG. 131 is a front view of the preferred embodiment of the special tool portion of this invention being used to install the second alternative embodiment of the special fastener portion of this invention;

FIG. 137 is a top view of the first alternative embodiment of the special tool portion of this invention being used to install the third alternative embodiment of the special fastener portion of this invention;

FIG. 138 is an exploded front partial sectional view of the first alternative embodiment of the special tool portion of this invention being used to install the third alternative embodiment of the special fastener portion of this invention;

FIG. 139 is a front partial sectional view of the first alternative embodiment of the special tool portion of this invention being used to install the third alternative embodiment of the special fastener portion of this invention;

FIG. 140 is a front view of the first alternative embodiment of the special tool portion of this invention being used to install the third alternative embodiment of the special fastener portion of this invention;

FIG. 141 is a top view of the assembled fourth alternative embodiment of the special fastener portion of this invention;

FIG. 142 is a right side partial sectional view of the assembled fourth alternative embodiment of the special fastener portion of this invention;

FIG. 143 is a right side sectional view of the countersunk aperture portion of the fourth alternative embodiment of the special fastener portion of this invention;

FIG. 144 is a front partial sectional view of the assembled fourth alternative embodiment of the special fastener portion of this invention;

FIG. 145 is a front sectional view of the countersunk aperture portion of the fourth alternative embodiment of the special fastener portion of this invention;

FIG. 146 is a top view of the preferred embodiment of the special tool portion of this invention being used to install the fourth alternative embodiment of the special fastener portion of this invention;

FIG. 147 is an exploded partial sectional front view of the preferred embodiment of the special tool portion of this invention being used to install the fourth alternative embodiment of the special fastener portion of this invention;

FIG. 148 is a partial sectional front view of the preferred embodiment of the special tool portion of this invention being used to install the fourth alternative embodiment of the special fastener portion of this invention;

FIG. 149 is a front view of the preferred embodiment of the special tool portion of this invention being used to install the fourth alternative embodiment of the special fastener portion of this invention;

FIG. 150 is a top view of the assembled fifth alternative embodiment of the special fastener portion of this invention;

FIG. 151 is a right side partial sectional view of the assembled fifth alternative embodiment of the special fastener portion of this invention;

FIG. 152 is a right side sectional view of the countersunk aperture portion of the fifth alternative embodiment of the special fastener portion of this invention;

FIG. 153 is a partial sectional front view of the assembled fifth alternative embodiment of the special fastener portion of this invention;

FIG. 154 is a front sectional view of the countersunk aperture portion of the fifth alternative embodiment of the special fastener portion of this invention;

FIG. 155 is a top view of the first alternative embodiment of the first alternative embodiment of the special tool portion of this invention being used to install the fifth alternative embodiment of the special fastener portion of this invention;

FIG. 156 is an exploded partial sectional front view of the first alternative embodiment of the special tool portion of this invention being used to install the fifth alternative embodiment of the special fastener portion of this invention;

FIG. 157 is a partial sectional front view of the first alternative embodiment of the special tool portion of this invention being used to install the fifth alternative embodiment of the special fastener portion of this invention;

FIG. 158 is a front view of the first alternative embodiment of the special tool portion of this invention being used to install the fifth alternative embodiment of the special fastener portion of this invention;

FIG. 177 is an exploded semi-perspective front view of the assembly of the individual parts of the keypad actuated remote transmitter portion of an alternative embodiment of this invention;

FIG. 178 is an exploded semi-perspective rear view of the assembly of the individual parts of the keypad actuated remote transmitter portion of an alternative embodiment of this invention;

FIG. 179 is a front view of the assembled keypad actuated remote transmitter portion of an alternative embodiment of this invention;

FIG. 180 is a side view of the assembled keypad actuated remote transmitter portion of an alternative embodiment of this invention;

Figure 3:
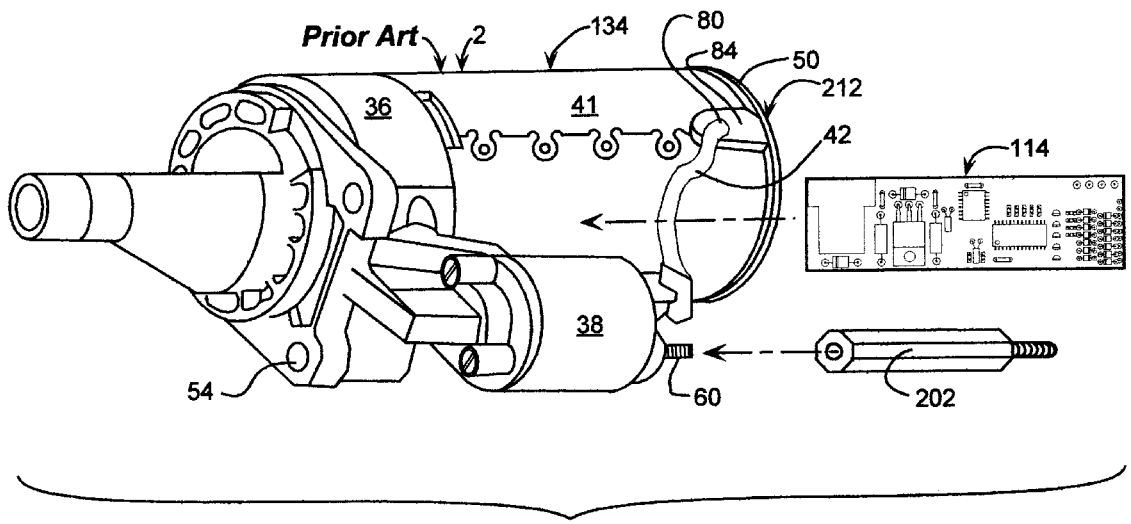
FIG. 3 is a perspective view of a prior art starter system manufactured by the Robert Bosch Corporation also showing placement of the master transceiver/disabling entity circuit board portion and electrically conductive battery positive terminal extension portion of the preferred embodiment of this invention.
Figure 4:
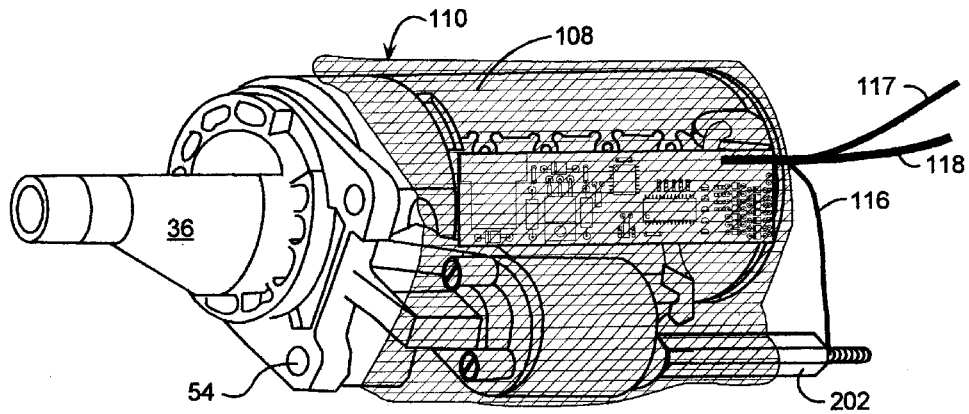
FIG. 4 is a perspective view of the apparati shown in FIG. 3 after installation of preferred embodiment of shared enclosure.
Figure 5:
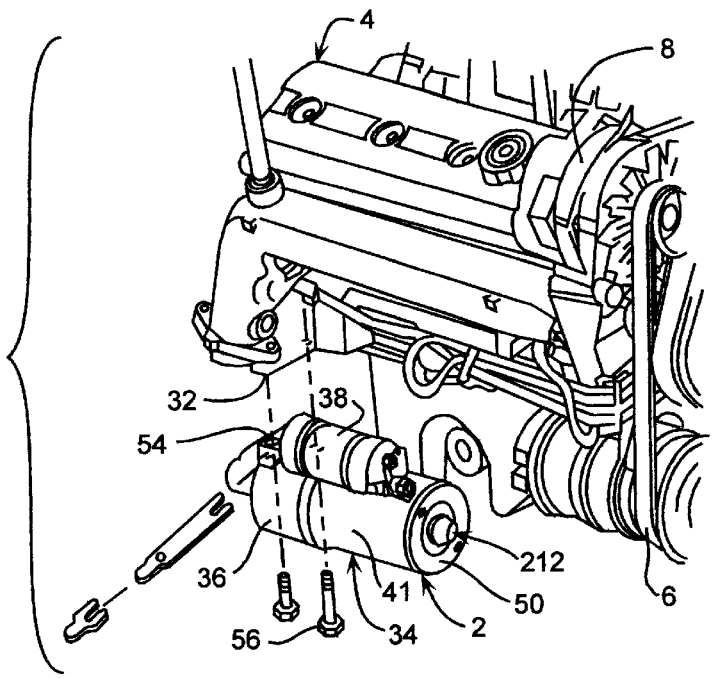
FIG. 5 is a perspective exploded view of the installation of a prior art starter system onto a prior art engine.
Figure 6:
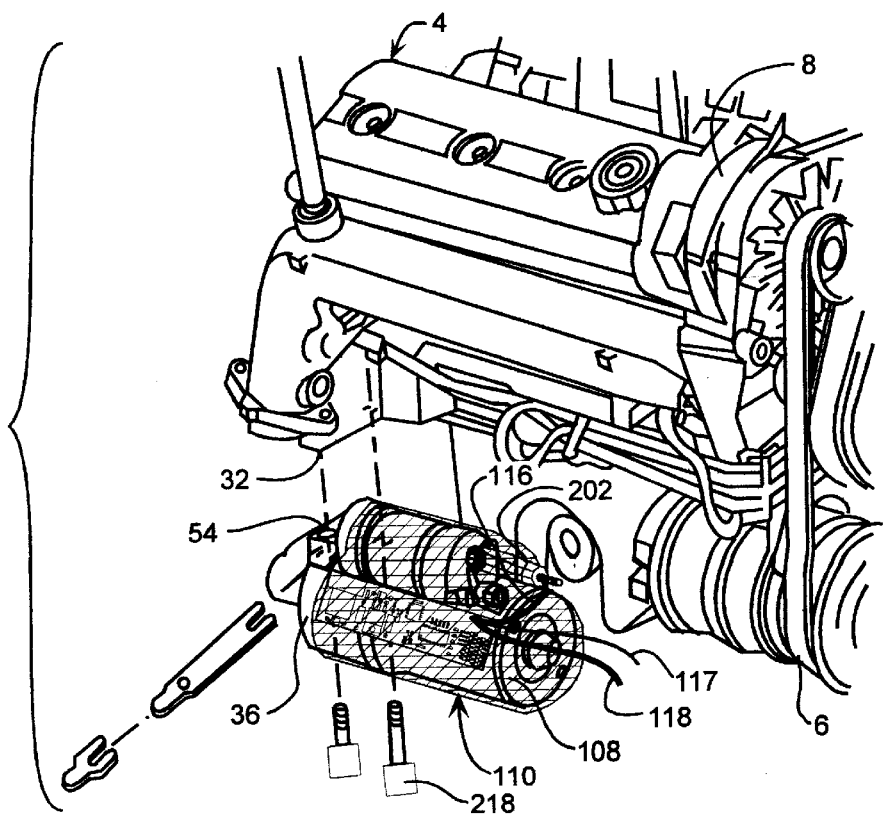
FIG. 6 depicts installation of the preferred embodiments of the shared enclosure and special fastener portions of this invention to the same prior art starter system and engine as shown in FIG. 5.
Figure 9:
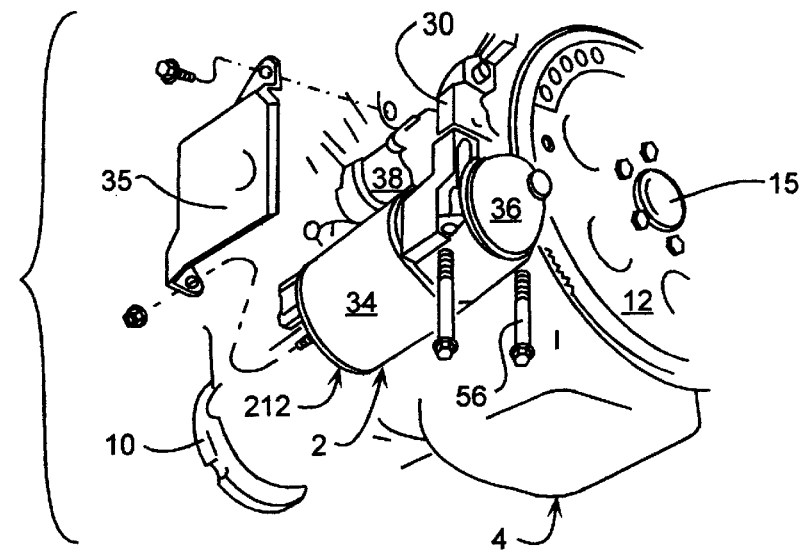
FIG. 9 is a perspective exploded view of the installation of a prior art starter system onto a prior art engine.
Figure 10:
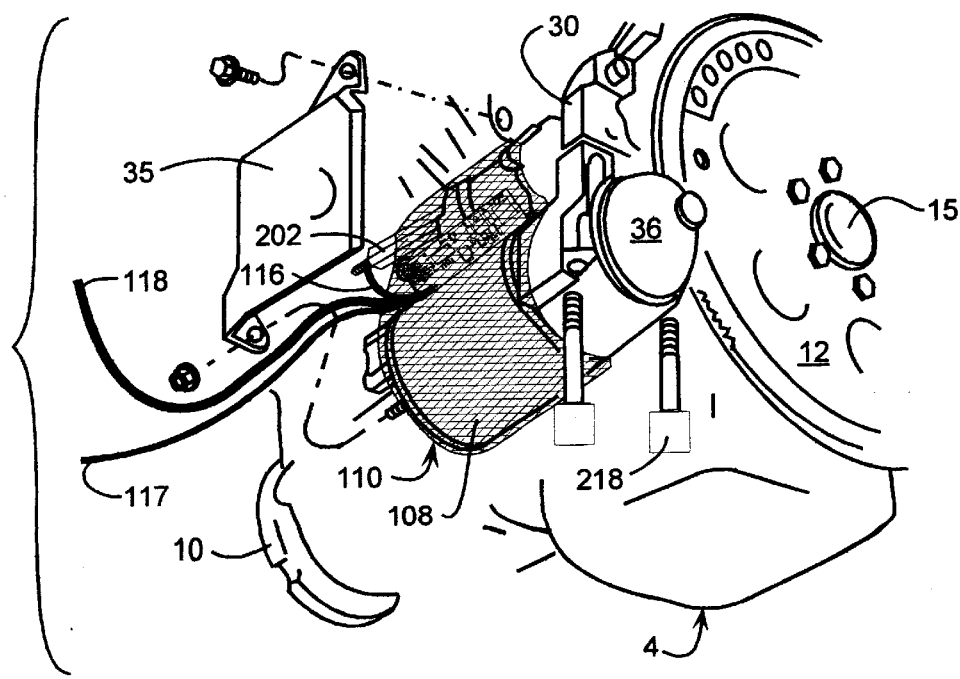
FIG. 10 depicts installation of the preferred embodiments of the shared enclosure and special fastener portions of this invention to the same prior art starter system and engine as shown in FIG. 9.

Before explaining preferred and alternative embodiments of this invention in greater detail, it should be understood that the phraseology and terminology used herein are for the purpose of description, not limitation. Also, the invention can be practiced, or carried out, in various ways not described herein.

AS SHOWN ON THE DRAWINGS

The preferred embodiment of this invention is utilized in a motor vehicle such as a motor car having an engine starter system 2 of the integral solenoid type as shown diagrammatically in FIG. 1, common to nearly all recently and presently produced vehicles. Alternatively, the car could have a starter system of the separate solenoid type common to earlier vehicles produced by the Ford Motor Company of Dearborn, Mich.

The preferred embodiment of this invention is utilized in a motor vehicle preferably having an automatic transmission rather than a manual transmission. Because a motor vehicle with a manual transmission may be "push started," disabling the starter motor of such a vehicle would not be as effective as disabling another, more vital, yet more difficult to armor component of such a vehicle such as an electric fuel pump or electronic engine control computer. A vehicle having an automatic transmission may not be "push started," so disabling only its starter motor is a sufficient physical deterrent to starting the engine of such a vehicle.

The starter system 2 comprises several major components: cranking motor 34, starter housing 36, and solenoid assembly 38.

The cranking motor 34 shall comprise armature windings 40, cranking motor case or field frame 41, positive electrical cable 42, output shaft 44, pinion gear or pinion 48, commutator cover 50, overrunning clutch 52, and collar 100. Additionally, if the cranking motor is of the field coil type, as opposed to the permanent magnet type, it shall further comprise field coil windings 78.

The starter housing 36 shall comprise mounting bolt apertures 54, and be secured to the engine 4, or torque converter housing/bell housing 14 of a vehicle with mounting bolts 56.

The solenoid or solenoid assembly 38, regardless of whether attached to or separate from a cranking motor 34, shall comprise contact plate 58, positive battery terminal 60, ignition positive terminal 62, cranking motor positive terminal 64, hold in windings 66, and ferrous plunger 68.

FIG. 1 is a diagrammatic view of a prior art, integral solenoid, direct drive, overrunning clutch, field coil type starter system 2. This type of starter system 2 is fitted to most types and models of motor vehicles presently produced. This drawing illustrates most of the aforementioned starter system parts 34 through 68 as well as several additional parts of the starter system which shall be discussed below. FIG. 1 also shows the mechanical interconnection of these parts in the assembled starter system 2. FIG. 1 also shows the basic electrical connections between the different components of the starter system 2 and between the starter system 2 and the electrical system of the vehicle in which it is installed.

FIGS. 55–60 illustrate, in orthographic projection, a prior art starter system 2, used in many vehicles produced by the General Motors Corporation of Detroit, Mich., to more clearly show the external features of this starter system 2.

As illustrated best by FIGS. 3, 5, 7, 9, 13, and FIGS. 55–60, both the cranking motor 34 and solenoid assembly 38 are secured to the starter housing 36, an irregularly shaped part located at the front end of the starter system 2, so that the assembled starter system 2 is shaped roughly like two stacked right cylinders.

When installed normally in a vehicle, as shown in FIGS. 5, 7, 9, 11, and 13, the starter system 2 is physically mounted to a vehicle engine 4 or bell housing 14 as follows. The starter system is mounted parallel to the central axis 13 of the engine's crankshaft and nearest the rear end 15 of the engine's crankshaft. When so mounted, the front end of the starter housing 36 protrudes, generally through an aperture 24 in the vehicle's bell housing 14, into close proximity with the flywheel ring gear 12. The flywheel ring gear 12 is attached to the rear end 15 of the crankshaft, between the engine 4 and transmission, and within the bell housing 14. The distal end 74 of the output shaft 44 of the cranking motor 34 is therefore in close proximity to the flywheel ring gear 12. When the pinion gear 48 is extended to the distal end 74 of the output shaft 44, it meshes with the teeth 76 of the flywheel ring gear 12.

As seen in FIG. 1, the armature windings 40 and field coil windings 78 of the cranking or starter motor 34 are both contained within the field frame 41. As seen in FIGS. 3, 5, 7, 9, 11 and FIGS. 55–60, the field frame 41 is generally cylindrical in shape. As seen in FIGS. 3, 13, 55, 57, 58, 59 the cranking motor positive cable 42 protrudes from an aperture 80 in the field frame 41. This cranking motor positive cable 42 is connected electrically with both the armature windings 40 and field coil windings 78, (if field coil windings are present,) of the cranking motor 34 via the cranking motor positive terminal 64 on the solenoid assembly 38. This cranking motor positive cable 42 is insulated electrically from the field frame 41 by a rubber grommet 84 which may be best seen in FIGS. 3, 55, 57, 58, and 59.

FIG. 1, which is a schematic diagram of the electrical circuit of a typical starter system 2 and its interconnection with the vehicle electrical system illustrates the electrical continuity mentioned above.

FIG. 1 also shows that the positive battery terminal 60 of the solenoid assembly 38 is connected directly to the positive terminal of the vehicle's battery 16 via the battery positive cable 18, and that the ignition positive terminal 62 of the solenoid 38 is connected to the ignition switch 20 via the positive ignition wire 22. The starter system 2 is grounded to the vehicle via its mounting to the engine 4 with conductive mounting bolts 56.

The output shaft 44 of the cranking motor 34 spins in bushings 96 at each end of the output shaft 44. One bushing is typically embedded in the starter housing 36, and the other busing is typically integral to the commutator cover 50 at its rearmost protuberance 212, as seen in FIGS. 5, 7, 55, 57, and 58. The pinion gear 48 is free to move axially along the output shaft 44, and once it is extended to the distal 74 end of the output shaft 44, it is driven by the output shaft 44.

Various mechanical mechanisms are employed by manufacturers of starter systems 2 to transmit torque to the pinion gear 48 from the output shaft 44, and to extend the pinion gear 48 along the output shaft 44 and into engagement with the teeth 76 of the flywheel 12 of the vehicle's engine 4. The most popular of which, as of late, has been the overrunning clutch 52 type mechanism. The overrunning clutch assembly 52 has internal spiral splines which mesh with spiral splines on the external surface of the output shaft 44. The overrunning clutch 52 engages with two other parts; a collar 100 which rotates freely and engages with the lower forked end of the shift lever 102, and a mechanical clutch assembly at its distal end which transmits rotational torque to the pinion gear 48 yet allows the pinion gear 48 to rotate faster than the output shaft 44 once the engine 4 has started.

The shift lever 102 is engaged at its upper end with the plunger 68 of the solenoid assembly 38. The shift lever 102 pivots on a steel pin or bolt 104 that generally protrudes through both sides of the starter housing 36. The lower end of the shift lever 102 pivots outward when the plunger 68 of the solenoid assembly 38 is retracted, thereby extending the collar 100, overrunning clutch 52 and the pinion gear 48 outward along the output shaft 44 into engagement with the teeth 76 of the flywheel ring gear 12.

With starter systems utilizing an overrunning clutch 52, in order for the pinion gear 48 to be extended into engagement with the teeth 76 of the flywheel ring gear 12, the solenoid 38 must be energized. When the vehicle's ignition switch 20 is turned to the start position, electric current is supplied to the hold in windings 66 of the solenoid 38 via the ignition positive wire 22, and the ignition positive terminal 62 on the solenoid 38. When energized, the hold in windings 66 produce a magnetic field which retracts the ferrous plunger 68. By retracting, the plunger 68 of the solenoid assembly 38 retracts the upper end of the shift lever 102, thereby retracting the lower end of the shift lever 102, which extends the pinion gear 48 into engagement with the teeth 76 of the flywheel ring gear 12.

By retracting, the plunger 68 of the solenoid assembly 38 also forces the contact plate 58 to move backward and into electrical contact with both the positive battery terminal 60 and the cranking motor positive terminal 64, thereby supplying electrical current to the cranking motor 34 from the vehicle's battery 16 via the positive electrical cable 42. When so energized, a typical cranking motor 34 generally spins at several thousand revolutions per minute and produces about 1 horse power at this speed.

Once the pinion gear 48 is fully extended and engaged with the teeth 76 of the flywheel ring gear 12, and the cranking motor 34 is operating, the pinion gear 48 drives the flywheel ring gear 12. Since the flywheel ring gear 12 is generally ten to sixteen times larger in diameter than the pinion gear 48, (and has of course a proportionately larger number of teeth than the pinion gear 48,) the flywheel ring gear is driven with 10 to 16 times the torque developed by the cranking motor at $\frac{1}{10}$th to $\frac{1}{16}$th the speed, or several hundred revolutions per minute, this rotational velocity and force being adequate to start the engine 4 of a vehicle, provided other vehicle systems are functional.

In starter systems 2 employing the overrunning clutch 52 mechanism described above, the positive ignition terminal 62 of the solenoid assembly 38 is generally in electrical continuity with the armature windings 40 and field coil windings 78 of the cranking motor 34 via the cranking motor positive terminal 64 and positive electrical cable 42, even when the solenoid is not energized. This feature possibly made bench testing of such a starter system 2 easier for the following reason: If electrical current is supplied directly to the cranking motor positive terminal 64 or the positive electrical cable 42 of the cranking motor, electrical current will also be supplied to the windings 66 of the solenoid assembly 38 which will properly activate the entire starting system. But, because of this feature, protecting only the ignition positive terminal 62 from being energized would not be sufficient to prevent such a starter system 2 from starting a vehicle's engine—the cranking motor positive terminal 64 and positive electrical cable 42 must also be protected from being energized.

If electrical connection between a vehicle's ignition switch 20 and the positive ignition terminal 62 was to be broken and made inaccessible to tools or wires by a physical obstruction, and additionally, the cranking motor positive terminal 64 and positive electrical cable 42 were similarly made inaccessible to tools or wires by the same obstruction, the starter system 2 installed on that vehicle would be useless for starting its engine 4. With this in mind, the preferred embodiment of this invention, as well as several alternative embodiments of this invention so protect these electrical connections yet provide for the connection between the positive ignition terminal 62 and the vehicle's ignition switch to be temporarily reestablished pursuant to receipt of a complex digitally coded signal within the physical obstruction that armors this broken connection.

It is the primary objective of the preferred embodiment of this invention to prevent the ignition positive terminal 62 from being energized by encasing the entire starter system 2 in a durable case or physical enclosure or shared enclosure or shroud or durable physical enclosure or case or durable shared enclosure 108, (these terms being used synonymously herein,) and channeling current to the ignition positive terminal 62 through a normally open circuit or relay or interlock or disabling entity or electromagnetically actuated relay 130 which is also enclosed within this shroud 108. The preferred embodiment of this invention shall allow this normally open circuit 130 to be temporarily closed if and only if the following conditions are met:

A: A user insertable non-volatile memory device or slave transceiver 126 bearing the correct unalterable electronic serial number as well as several unique blocks of data is recognized by a microcontroller 138 as having been inserted into each of a series of individual sockets, in the proper order, each such socket being connected to a data line of this microcontroller.

B: The microcontroller reads this serial number and these blocks of data and verifies that they match acceptable values for the same stored in additional non-volatile memory proximate to the microcontroller 138.

In order to hinder removal of the shared enclosure or starter system from the vehicle, this durable shared enclosure 108 may also obstruct access to the heads of any fasteners that attach the encased starter system 110 or the shared enclosure 108 to the vehicle's engine 4. Removal of the so encased starter system 110 or the shared enclosure 108 from the vehicle shall be further hindered in the preferred embodiment and alternative embodiments of this invention by using special fasteners 218, described in detail infra, to attach the one or both of these components 110, 108 to the vehicle. These special fasteners shall require the use of special, custom machined tools 240 or 250, described in detail infra, for removal or complete installation.

Figure 15:
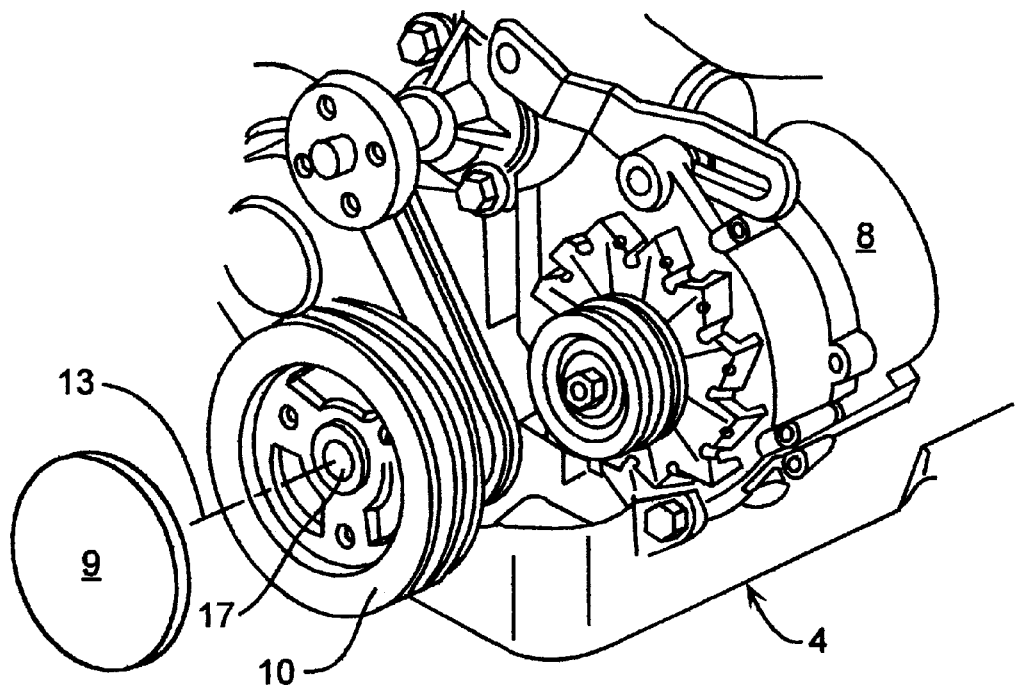
FIG. 15 is a perspective exploded view of a prior art engine showing installation of a portion of this invention—the steel plate covering the crankshaft pulley of the engine.
Figure 16:
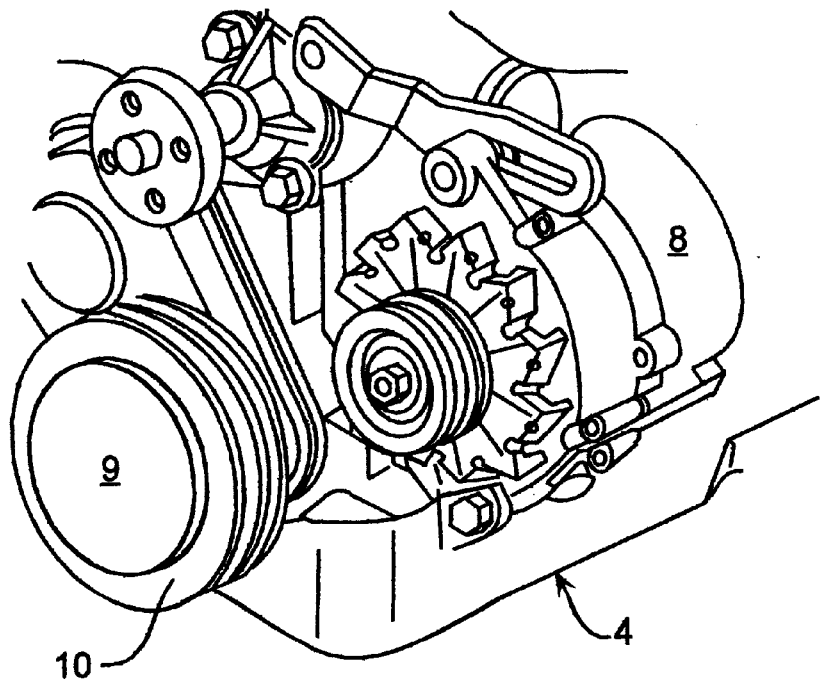
FIG. 16 is a perspective view of a prior art engine after installation of the steel plate covering the crankshaft pulley.

Finally, to hinder cranking the vehicle's engine by applying sufficient torque to the vehicle's crankshaft without using the encased starter system 110, the preferred embodiment of this invention shall further comprise a smooth steel plate 9 covering any fasteners which attach to the front end 17 of the engine's crankshaft, such as the fasteners attaching the crankshaft pulley/harmonic balancer 10 to the crankshaft. If left uncovered, these fasteners could be used to couple the driving end of a device such as an air ratchet to the crankshaft, thereby allowing said device to be used to crank and start the engine 4. This steel plate 9 and its installation can be seen in FIGS. 15, 16.

FIG. 2 is a general overview of the preferred embodiment of this invention as it should be installed in a vehicle. Visible in FIG. 2 are the following vehicle components: starter system 2, battery 16, battery positive cable 18, ignition switch 20, positive ignition wire 22, fire wall 121, aperture in fire wall 122. Also visible in FIG. 2 are many components of the preferred embodiment of this invention. Some these components are the durable shared enclosure 108, the starter system encased in this shared enclosure 110, an extension 202 of the solenoid's battery positive terminal 60, the master transceiver/disabling entity circuit 114, the master transceiver/disabling entity power wire 116, the relay input wire 117, the relay output wire 119, multi conductor data cable 118, the front 154 of the keyhole pad circuit board 120, a slave transceiver 126, and a key chain fob 194.

Detailed descriptions of the construction, installation, and function of each component of the preferred embodiment of this invention, as well as descriptions of the construction, installation, and function of several alternative embodiments of this invention follow.

The preferred and first alternative embodiments of this invention shall comprise a durable shared enclosure 108 which covers the starting system 2 of a vehicle in such a manner as to prevent access to all electrical connection points associated with it except that to which the positive battery cable 18 connects, (the battery positive terminal 60.) This durable shared enclosure 108 shall also cover a circuit board 132 mounting a relay 130 controlled by a master transceiver circuit 114 which shall include a microcontroller 138, and a non-volatile memory device/time keeping device 146.

When activated by the master transceiver circuit 114, this relay 130 shall momentarily establish electrical contact between the protected ignition positive terminal 62 of the solenoid switch 38 of the encased starter system 110 and a relay input wire 117 protruding from the shared enclosure 108. That relay input wire 117 being connected electrically to the ignition switch 20 of the vehicle via the original positive ignition wire 22 of the vehicle.

As shown in FIGS. 2, 4, 6, 8, 10, and 14, this master transceiver circuit 114 shall be powered by the electrical system of the vehicle via a master power wire 116 protruding from the shared enclosure 108 and connected electrically to the positive battery cable 18, and shall be grounded to the conductive housing 36 of the cranking motor 34 within the shared enclosure 108 by a master ground wire 115.

As shown in FIGS. 2, 4, 6, 8, 10, 12, and 14, also protruding from the shared enclosure 108 shall be a multi-conductor cable 118 which also passes through the fire wall 121 of the vehicle through an aperture 123 and into its passenger compartment. This cable 118 shall carry digitally encoded data between the master transceiver 114 and a keyhole pad circuit 136 located within the passenger compartment of the vehicle, and shall also provide power to the various light emitting diodes 122 and integrated circuits which this keyhole pad circuit 136 shall comprise. This keyhole pad circuit 136 shall provide multiple sockets 124 into which the portable slave transceiver 126 may be inserted and thereby connected electrically with a data line connected to the master transceiver 114. This slave transceiver 126 shall carry data that the master transceiver 114 may only read if the slave transceiver 126 is inserted momentarily into a particular sequence of the sockets 124 of the keyhole pad 136.

Upon inserting the slave transceiver 126 into the last socket of the proper sequence, the master transceiver 114 shall read data stored in ROM of the slave transceiver 126 descriptive of a unique serial number of that slave transceiver 126. If and only if the unique serial number of that slave transceiver 126 corresponds to the sequence of sockets into which it has been inserted, said correspondence being stored in a table in non-volatile memory of the master transceiver 114, the master transceiver 114 shall issue the commands and passwords necessary to read three partitions of password secured data from the slave transceiver 126. These three secured partitions of data embody a second code. If and only if this second code matches a value stored in non-volatile memory of the master transceiver 114, the master transceiver 114 shall momentarily deactivate the interlock/disabling entity thereby allowing the vehicle to be started, or additional features of the system to be invoked.

In the preferred embodiment of this invention, the disabling entity or interlock or switch or normally open circuit 130, and the master transceiver circuit 114 shall be constructed as follows.

Figure 17:
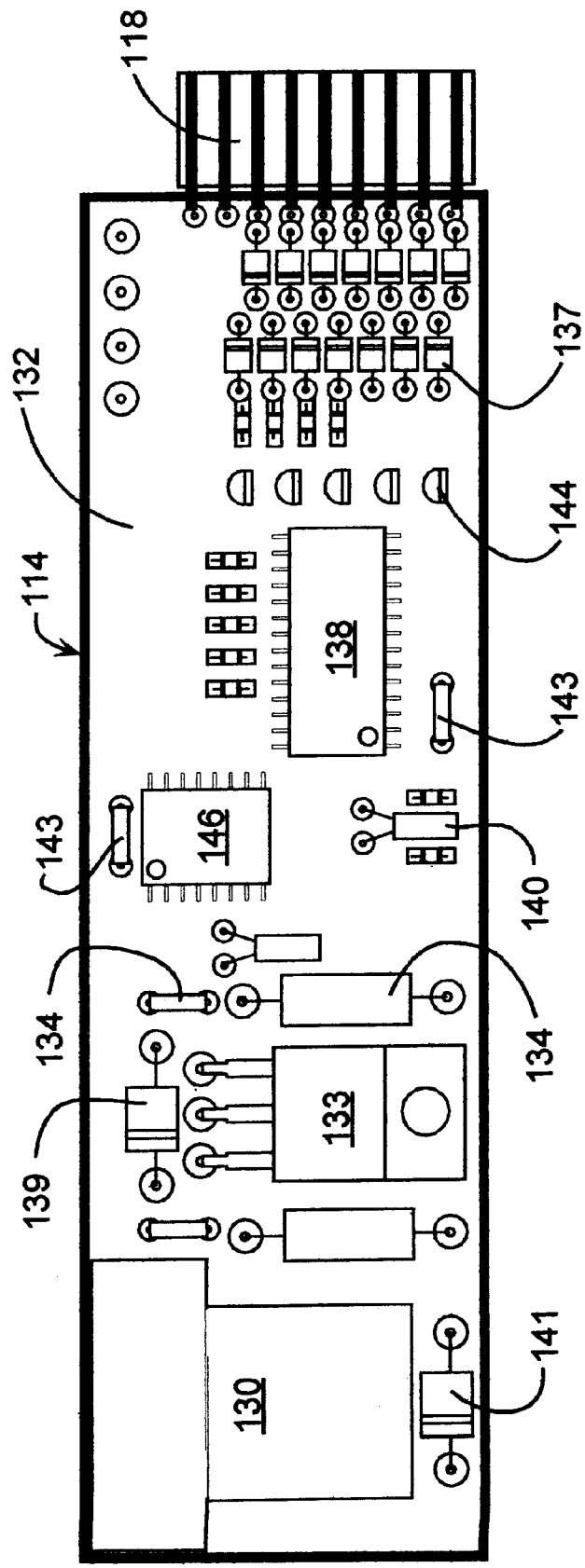
FIG. 17 is an enlarged diagrammatic front view of the master transceiver/disabling entity circuit board portion of the preferred embodiment of this invention.
Figure 50:
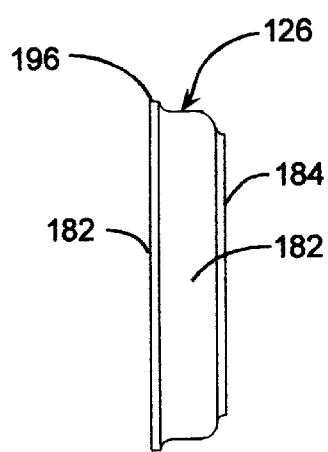
FIG. 50 is a side view of the slave transceiver portion of the preferred embodiment of this invention. It is a DS1991 Touch Multikey manufactured by Dallas Semiconductor of Dallas, Tex.
Figure 51:
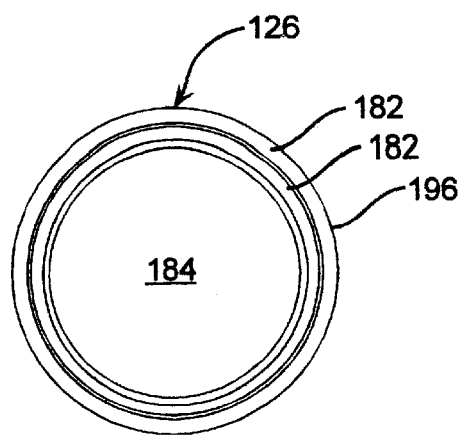
FIG. 51 is a front view of the apparatus shown in FIG. 50.
Figure 54:
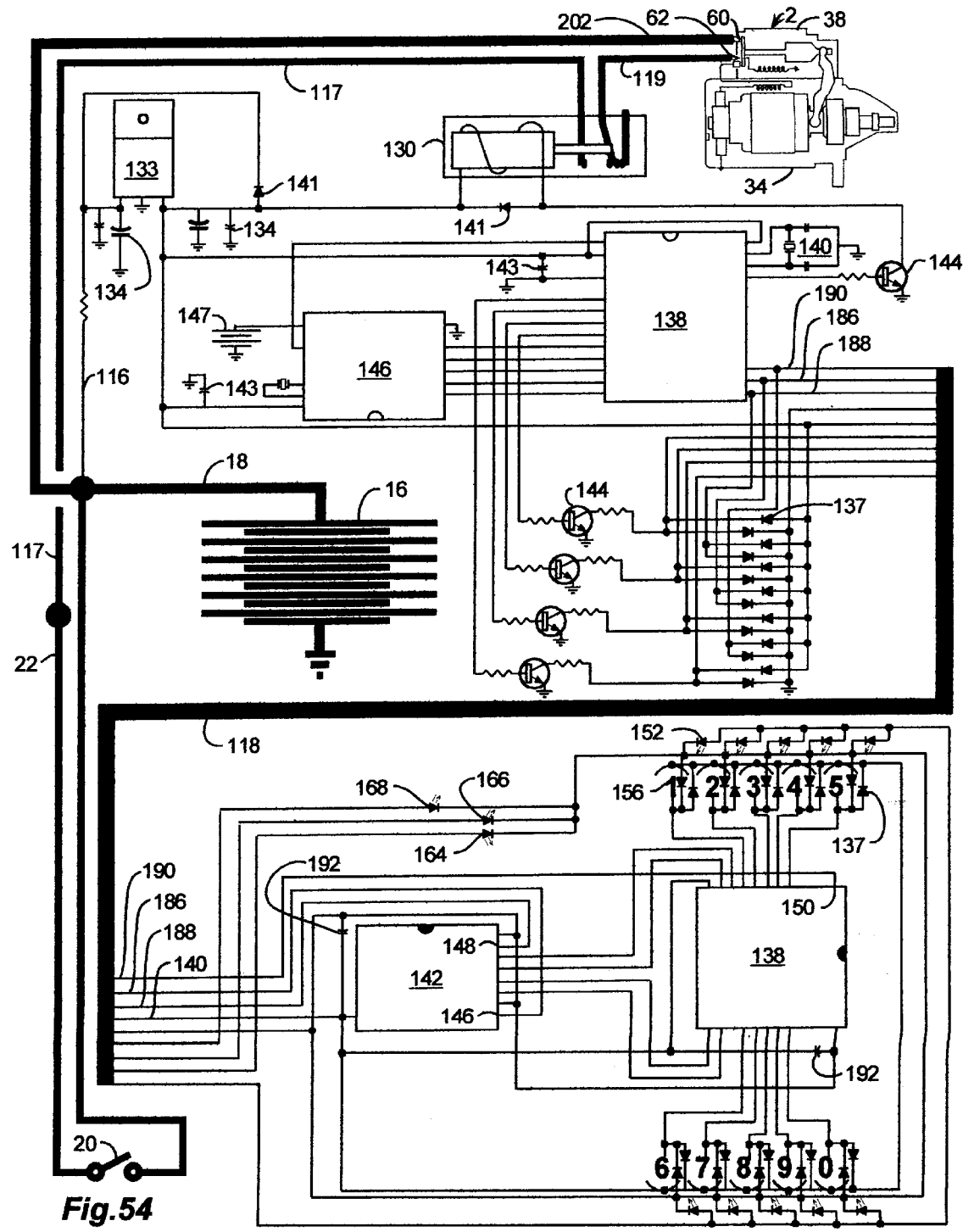
FIG. 54 is an electrical schematic diagram of the preferred embodiment of this invention and its connection to a prior art starter system and the electrical system of a vehicle.
Figure 55:
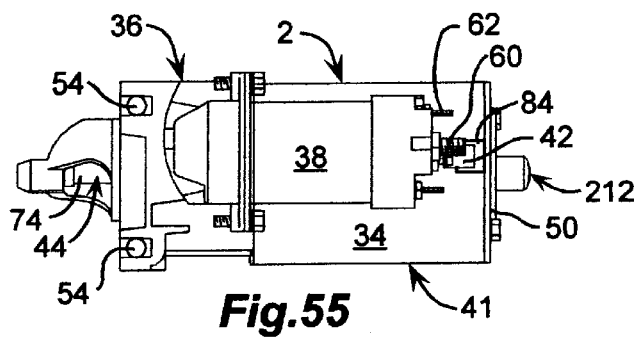
FIG. 55 is a top view of a prior art integral solenoid type starter system.
Figure 56:
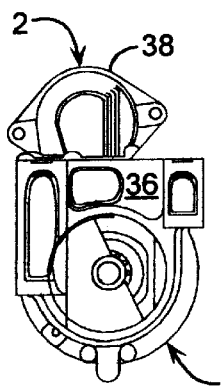
FIG. 56 is a front view of the apparatus shown in FIG. 55.
Figure 57:
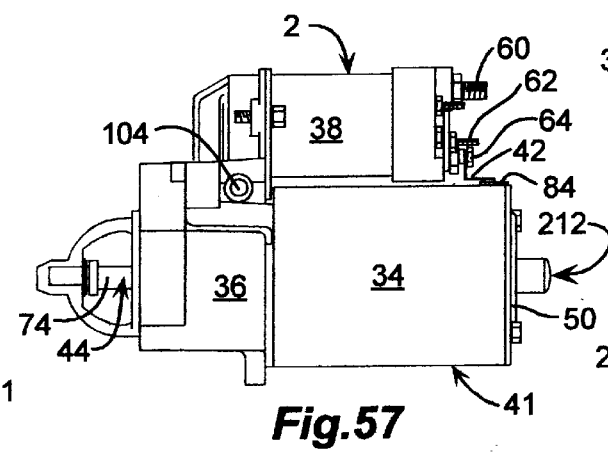
FIG. 57 is a left side view of the apparatus shown in FIG. 55.
Figure 58:
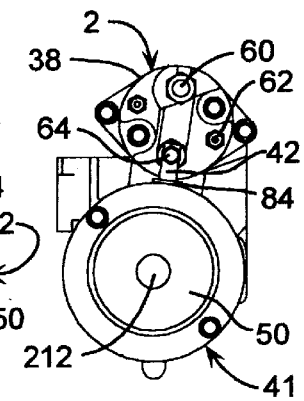
FIG. 58 is a rear view of the apparatus shown in FIG. 55.
Figure 60:
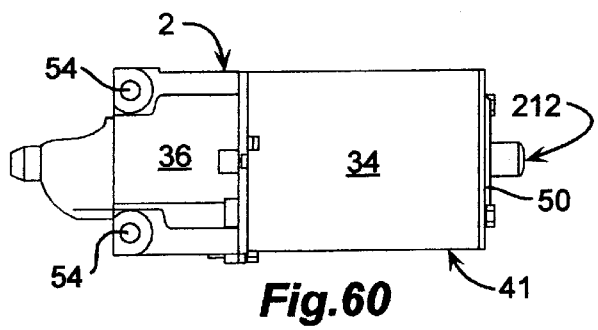
FIG. 60 is a bottom view of the apparatus shown in FIG. 55.
Figure 59:
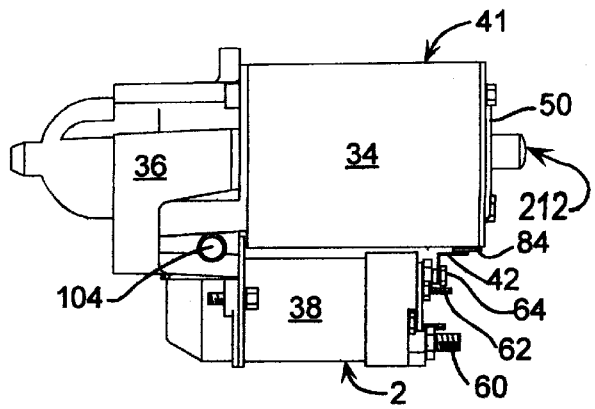
FIG. 59 is a right side view of the apparatus shown in FIG. 55.

As shown in FIGS. 17 and 54, a printed circuit board 132, also referred to as the master transceiver/disabling entity circuit board 132, shall contain electrical noise and surge suppression components 134, (capacitors), a quench diode 141, as well as a voltage regulator 133 to provide the master transceiver circuit 114 with a power supply of clean regulated 5 volts direct current, (later referred to as 5VDC.) These power supply components 134, 136 and 141 are necessary to prevent voltage spikes and noise, caused by a typical vehicle's spark ignition system and alternator, from damaging the circuitry of the master transceiver 114.

As shown in FIGS. 17, 54, the master transceiver/disabling entity circuit board 132 shall contain a high speed 8 bit microcontroller 138 such as the PIC16C57 microcontroller manufactured by Microchip Technologies of Phoenix, Ariz., as well as a high speed oscillator circuit 140 to provide clock signals to the microcontroller 138, de-coupling capacitors 143 to filter power to each integrated circuit, and discrete transistor switches 144 to amplify and isolate the outputs of the microcontroller 138 from the substantial current demand light emitting diodes, (LED's 122,) and relay 130 which it will control.

As shown in FIGS. 17, 54, the master transceiver/disabling entity circuit board shall also contain resistors to limit the current drawn by the LED's 122 located on the keyhole pad circuit board 120. Placing these current limiting resistors on the master transceiver/disabling entity circuit board 132 instead of upon the keyhole pad circuit board 120 merely saves space upon the latter for other components.

As shown in FIGS. 17, 54, the master transceiver/disabling entity circuit board 132 shall also contain an array of high speed diodes 137 to protect the master transceiver/disabling entity circuitry from electrostatic discharge, (ESD), over-voltage, and under-voltage conditions. These protection diodes 137 shall be electrically connected to each line of the 9 conductor cable 118 as follows. The 4 LED control lines, data line 190, count line 186, and reset line 188 shall each be connected to a pair of protection diodes 137. One protection diode 137 of each pair shall switch overvoltage to the positive supply line, while the other diode shall switch under-voltage to the ground line.

As shown in FIGS. 17, 54, the master transceiver/ disabling entity circuit board 132 shall also contain a serial electrically erasable and programmable ROM (serial EEPROM) device, such as the industry standard 93CX6, and a time keeping device, or a device 146 which incorporates both features such as the DS2404 EconoRAM Time Chip manufactured by Dallas Semiconductor of Dallas, Tex. This serial EEPROM and Clock/Calendar device 146 shall provide extra non-volatile data storage capacity for the microcontroller 138, as well as time information for the control of the Valet and Service Modes of this invention, (these Modes to be discussed infra.) Furthermore, the Clock/Calendar device or the time keeping portion of the EEPROM/time keeping device 146 shall continue to keep accurate time in the event that the circuit board is disconnected from the 12VDC power supply of the vehicle. This shall be accomplished by providing the time keeping circuit with a 3V lithium backup battery 147 that will power it in case of failure of its normal 5VDC power supply.

As shown in FIGS. 17, 54, the master transceiver/ disabling entity circuit board 132 shall contain an electromagnetically actuated relay 130 controlled by the output of the microcontroller 138 through a transistor switch 144 and switching diode 141. This relay 130 shall establish electrical contact between the ignition switch 20 of a vehicle and the positive ignition terminal 62 of the solenoid switch of the starter system only when energized by the master transceiver circuit 114.

The master transceiver/disabling entity circuit board 132 containing all of the aforementioned components may be encapsulated in an epoxy or thermoplastic resin based potting compound to prevent moisture from damaging said components, and to otherwise prevent physical shock from damaging them. In addition, this circuit board 132 may be wrapped in grounded metal foil or cloth or other conductive material so as to shield the master transceiver/disabling entity circuit 114 from electromagnetic interference caused by operation of the starter system or other nearby electrical components of the vehicle or any attempt to cause a malfunction of its circuitry by applying a magnetic field to the outside of the shroud 108.

As shown in FIGS. 2, 54, in the preferred embodiment of this invention, the aforementioned master transceiver/ disabling entity circuit 114, containing power supply circuitry 148, disabling entity 130, and master transceiver 114 upon the master transceiver/disabling entity circuit board 132 shall be electrically connected to the vehicle and starter system as follows.

An insulated 10 gauge (American standard wire gauge) wire shall serve as relay input wire 117, and shall be soldered to the circuit board 132, and shall be electrically connected to a normally open throw contact of the relay 130, and shall protrude from the durable shared physical enclosure 108 where it shall be connected to the vehicle's ignition positive wire 22, (which ordinarily powers the solenoid 38 of the starter system 2 through the ignition switch 20 of the vehicle.)

A second insulated 10 gauge wire shall serve as relay output wire 119, and shall be soldered to the circuit board 132, and shall be electrically connected to the pole of the relay 130, and shall also be electrically connected, within the durable shared physical enclosure 108, to the ignition positive terminal 62 of the solenoid switch of the starter system 2.

A third insulated wire of smaller gauge than the first two shall serve as the master power wire 116, and shall be soldered to the circuit board 132, and shall be electrically connected to the power supply circuitry of the master transceiver circuit 114, and shall protrude from the durable shared physical enclosure 108 where it shall be electrically connected to the heavy gauge positive battery cable 18 thereby supplying the power supply circuit with positive 12V direct current.

A fourth insulated wire, of similar gauge as the third, shall serve as master ground wire 115, and shall be soldered to the master transceiver/disabling entity circuit board 132, and shall be electrically connected at one end to all ground connections on the circuit board 132. This master ground wire 115, at its opposite end, shall be connected electrically to any conductive fastener of the starting system 2 that is within the durable shared physical enclosure 108, thereby grounding the circuitry of the disabling entity and master transceiver 114 to the vehicle when the conductive starter system case 36 is bolted to either the engine 4, or bell housing 14, both of which being electrically conductive.

As shown in FIGS. 2, 54, in the preferred embodiment of this invention, the keyhole pad circuit 136 shall be connected to the master transceiver 114 as follows. A nine conductor insulated and shielded cable, aforementioned as multi-conductor cable 118, having an outer diameter of approximately ¼" shall protrude from the durable shared physical enclosure 108. Each conductor within the cable 118 shall be connected to the master transceiver/disabling entity circuit board 132, inside the enclosure 108, as follows. One conductor shall be grounded while a second conductor shall be connected to the positive side of the 5VDC power supply. The remaining seven conductors shall be connected either directly to seven different input/output pins of the microcontroller 138 or, preferably, to transistor switches 144 or optoisolators connected to different input/output pins of the microcontroller 138.

As shown in FIGS. 2, 54, this 9 conductor cable 118 shall also pass through an aperture 123 in the fire wall 121 of a vehicle into the vehicle's passenger compartment, where each conductor, at its most distant end from the enclosure 108, shall connect to the keyhole pad circuit board 120 as follows.

The ground conductor of the 9 conductor cable 118 shall be electrically connected to all ground connections 140 of the keyhole pad circuit 136.

The positive 5V direct current conductor of the 9 conductor cable 118 shall be electrically connected to the positive power supply pins of two integrated circuits: an industry standard CMOS 4 bit binary counter chip 142, and an industry standard CMOS 16 to 1 multiplexer/ demultiplexer chip 144, which together make up the switching circuitry of the keyhole pad circuit 136.

One of the remaining 7 conductors of the 9 conductor cable 118 shall be connected to the count pin 146 of the 4 bit binary counter chip 142, and shall be referred to as the count line 186 of the 9 conductor cable 118.

One of the remaining 6 conductors of the 9 conductor cable 118 shall be connected to the reset pin 148 of the 4 bit binary counter chip 142, and shall be referred to as the reset line 188 of the 9 conductor cable 118.

One of the remaining 5 conductors of the 9 conductor cable 118 shall be connected to the pole input/output pin 150 of the 16 to one multiplexer/demultiplexer chip 144 and shall be referred to as the data line 190 of the 9 conductor cable 118.

One of the remaining 4 conductors of the 9 conductor cable 118 shall be connected in parallel to 10 surface mount light emitting diodes which shall hereafter be referred to as background LED's 152 and which shall illuminate the front surface 154 of the keyhole pad circuit 136.

Each of the remaining 3 conductors of the 9 conductor cable 118 shall be connected to one of three additional light emitting diodes, each a different color, which shall indicate the status of the master transceiver 114 to the operator of the vehicle.

The nine conductor cable 118 shall be further protected from heat where it passes near components of the vehicle that become hot during normal operation, such as the exhaust manifold, with a sheath made of braided or woven heat resistant fibrous material such as Nomex™, manufactured by the DuPont Corporation of Wilmington, Del.

The nine conductor cable 118 shall be further protected from abrasion where it passes through the aperture 123 in the fire wall 121 of the vehicle by an additional sheath made of nylon or fiberglass.

As shown in FIGS. 18–21, 36–49, in the preferred embodiment of this invention, the keyhole pad circuit 136 shall be constructed as follows.

As shown in FIG. 18, a double sided copper clad FR-4 epoxy based printed circuit board, approximately 1.5" high and 3.125" wide, serving as keyhole pad circuit board 120, shall be etched such that copper Arabic numerals 156 zero through nine remain on the front surface 154 of this keyhole pad circuit board 120. These numerals 156 shall be arranged in two horizontal rows of five which shall be vertically separated by approximately ¾".

These conductive numerals 156 shall be electrically connected to the rear side 158 of this keyhole pad circuit board 120 by plated through holes (vias) 160 in the circuit board 120 that are drilled through the numerals 156 themselves. The numerals 156 shall be coated with solder. This solder coating will make the numerals 156 more reflective and slightly convex thereby improving their ability to reflect light toward the eye of the vehicle operator. This solder coating will also fill in said vias 160 with solder thereby allowing the delicate vias 160 to conduct higher current and prevent the copper plating within the vias 160 from peeling away.

As shown in FIG. 18, on the front side 154 of the keyhole pad circuit board 120, there shall also remain wire traces supplying ground contact to 4 apertures 162 approximately 0.100" in diameter which penetrate the keyhole pad circuit board 120 near each of its corners. As shown in FIGS. 46–49, when 4 conductive fasteners 172 and washers 174 are installed through these apertures 162 to attach a stainless steel facia 170 to the keyhole pad circuit board 120, the facia will be grounded via these grounded apertures 162.

As shown in FIGS. 18, 37, on the front side 154 of the keyhole pad circuit board 120, there shall also remain wire traces supplying +5VDC to the anode of each of 13 surface mount chip style LED's 122 shown in FIGS. 36–41, 46–49. Ten of these LED's shall be green or amber in color (so as to match the color of the dashboard illumination of the vehicle), and shall be mounted to the circuit board on edge, in two rows of 5 (one above the top row of numerals 156 and one beneath the bottom row of numerals 156), so as to shine light parallel to the plane of the keyhole pad circuit board 120 toward the ten numerals 156. These first ten LED's shall be hereafter referred to as background LED's 152. The remaining 3 LED's shall each be a different color, shall be mounted flat to the circuit board 120 above the top row of background LED's 152, and shall serve as indicators of the status of the master transceiver 114. These three LED's shall be hereafter referred to as the red 164, green 166, and yellow 168 indicator LED's.

As shown on FIG. 18, on the front side 154 of the keyhole pad circuit board 120, there shall also remain solder pads connected to the cathode of each of the 13 aforementioned LED's. Through each of these solder pads shall pass a via 160 to the rear side 158 of the keyhole pad circuit board 120.

As shown on FIGS. 21, 41, connected to each of these vias 160, on the rear side 158 of the keyhole pad circuit board 120, there shall remain wire traces which shall electrically connect the cathode of each LED to the appropriate conductor of the nine conductor cable 118 that shall control operation of each. Each of these three conductors shall control one of the red 164, green 166, and yellow 168 indicator LED's, while a single additional conductor shall control all ten background LED's 152.

As shown in FIGS. 43–49, a thin yet rigid flat rectangular stainless steel facia 170 of the same height and width as the keyhole pad circuit board 120 shall be affixed to the front surface 154 of the keyhole pad circuit board 120 with 4 conductive machine screws 172 each being inserted first through one of four apertures near the 4 corners of the facia 170, then through a conductive washer 174, then through one of the four 0.100" diameter apertures 162 in corners of the keyhole pad circuit board 120, then finally being secured by a non-conductive nut 176 behind the keyhole pad circuit board 120.

Through the conductive machine screws 172 and washers 174, this facia 170 shall be grounded with the rest of the keyhole pad circuit 136 as shown in the schematic diagram FIG. 54. In addition to enhancing electrical ground connection between the keyhole pad circuit board 120 and the facia 170, the conductive washers 174 serve as stand-offs to locate the facia 170 approximately 2 mm above the front surface 154 of the keyhole pad circuit board 120 so as to allow clearance for the ten edge mounted background LED's 152 as shown in FIGS. 46, 48, 49. This facia 170 shall also have two additional holes or notches near its top edge through which the three indicator LED's 164, 166, 168 will be visible as shown in FIGS. 2, 47.

As shown in FIGS. 2, 43, 47, this facia 170 shall be perforated by ten 0.650" diameter apertures which overlap by approximately 0.150". Through each of these apertures, one of the copper numerals 156 shall be visible, and together, these apertures expose the entire center of the front 154 of the keyhole pad circuit board 120 and border it with ten semicircular recesses. Each such recess shall have a radius of curvature similar to that of the cylindrical slave transceiver 126 which shall be pressed flat against the front 154 of the keyhole pad circuit board 120 then slid into simultaneous contact with one of these recesses and with one of the numerals 156 as shown in FIG. 2. When so pressed and slid, the ground contact 182 of the slave transceiver 126 shall contact one of the recesses while the data contact 184 of the slave transceiver 126 shall contact one of the numerals 156. Each combination of an electrically grounded semicircular recess of the facia 170 and a copper numeral 156 shall embody a single socket 124 into which a slave transceiver device 126 may be inserted as shown in FIG. 2.

As shown in FIG. 47, the facia 170 shall also hide from sight all wire traces and components on the front surface 154 of the keyhole pad circuit board 120 since these components and wire traces shall all be located near the outer edges of the circuit board 120 as shown in FIG. 37.

37

As shown in FIGS. 18, 37, 41, near the left edge of the keyhole pad circuit board 120, there shall be nine plated through holes to which the individual conductors of the nine conductor data cable 118 shall be soldered.

Each of the vias 160 connected to a numeral 156 on the front surface 154 of the keyhole pad circuit board 120 shall be electrically connected, on the rear 158 of the keyhole pad circuit board 120, to a unique throw input/output pin of the 16 to 1 multiplexer/demultiplexer integrated circuit 144 which shall be surface mounted the rear surface 158 of the keyhole pad circuit board 120 as shown in FIG. 41 and in the schematic diagram FIG. 54. Also on the rear surface 158 of the circuit board 120, the dual 4 bit binary counter integrated circuit 142 shall be surface mounted and shall be connected to the count 186 and reset 188 lines of the nine conductor cable 118 as shown in FIG. 41 and the schematic diagram FIG. 54. As shown in FIGS. 41, 54, the four output pins of this integrated circuit 142, which keep count of the number of logic high 402 pulses received from the master transceiver circuit 114 along the count line 186, shall be connected, via 4 wire traces, to the A, B, C, and D inputs of the multiplexer/demultiplexer chip 144 which, based upon the 4 bit binary number presented along these four output pins of the counter circuit 142, shall selectively connect one of its sixteen throw input/output pins, (ten of which are connected to numerals 156 on the front side 154 of the keyhole pad circuit board 120), to the single pole input/output pin 150 connected to the data conductor 190 of the nine conductor cable 118. In conjunction, the 4 bit counter chip 142 and 16 bit multiplexer/demultiplexer chip 144 therefore function as a single pole 16 throw switch that connects a particular one of the numerals 156 to the singular data conductor 190 based upon the number of logic high 402 pulses sent along the count conductor 186 by the master transceiver 114.

As shown in the FIGS. 41, 54, both integrated circuits 142 and 144 shall be powered by and therefore connected electrically to the +5VDC and ground conductors of the nine conductor cable 118. As shown in FIGS. 41, 54, the integrated circuits 142 and 144 shall be protected by one or more de-coupling capacitors 138 which shall be connected from power to ground in close proximity to and in parallel to the devices 142 and 144.

As shown in FIGS. 41, and 54, the keyhole pad circuit board 120 shall also contain an array of high speed diodes 137 to protect the keyhole pad circuitry 136 from electrostatic discharge, (ESD), over-voltage, and under-voltage conditions. A pair of these protection diodes 137 shall be electrically connected to each of 10 copper numerals 156. One protection diode 137 of each pair shall switch overvoltage to the positive supply line, while the other diode shall switch under-voltage to ground.

In the preferred embodiment of this invention, the slave transceiver 126 shall consist of a user-insertable non-volatile memory device with password secured memory partitions such as the DS1991-F5 Touch Multikey manufactured by Dallas Semiconductor of Dallas, Tex. and shown in FIGS. 2, 50–53.

Figure 52:
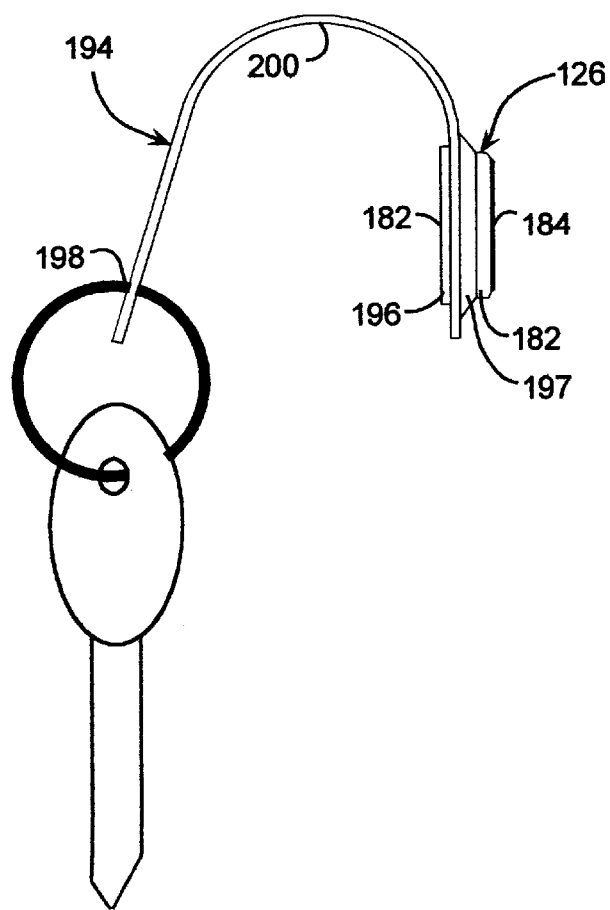
FIG. 52 is a side view of the apparatus shown in FIG. 50 mounted to the key chain fob portion of this invention.
Figure 53:
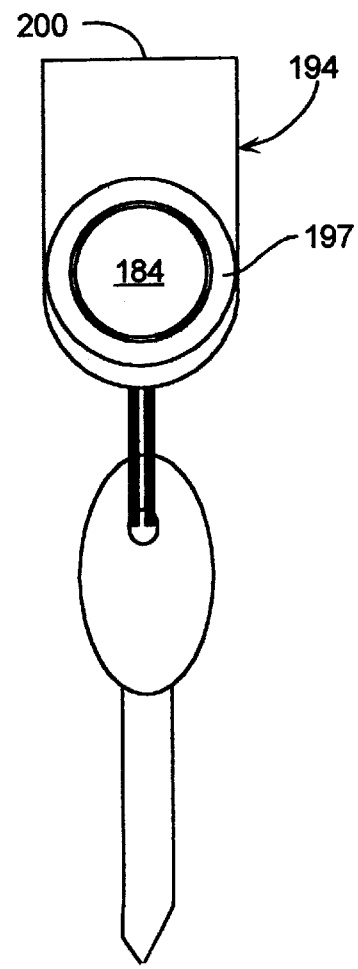
FIG. 53 is a front view of the apparatus shown in FIG. 52.

As shown in FIGS. 52–3, this device 126 shall be secured to a key chain fob 194 made of a bent piece of approximately 20 gauge stainless steel sheet metal. The DS1991-F5 is packaged in a 0.650" diameter right circular cylindrical stainless steel can approximately 5 mm high, this package also having a thin flange 196 at its base measuring approximately 0.040" larger in diameter than the body of the package. The slave transceiver 126 in such a package shall be inserted through a 0.650" diameter aperture in the fob 194 such that the flange 196 of the package shall be flush against the rear surface of the fob. The slave transceiver 126 shall then be secured in this aperture by press fitting a thin stainless steel locking ring 197 over the protruding end of the slave transceiver, (opposite the flanged base,) and flush with the front surface of the fob 194, this locking ring 197 having an inner diameter slightly smaller than 0.650". The fob 194 shall also have a second aperture 198 for mounting the fob 194 to a key ring, this second aperture 198 being located near the end of the fob opposite the slave transceiver 126. The end of the fob 194 opposite the slave transceiver 126 shall also be bent 180 degrees toward the rear flanged surface 196 of the slave transceiver 126 and about the midpoint of the fob 194, this bend having a radius similar to the cross sectional radius of a human index finger or approximately 0.325". By bending the fob 194 in such a manner, the fob 194 and attached slave transceiver 126 may be held and manipulated comfortably while hanging from a persons index finger and steadied by a persons thumb of that same hand.

As shown in FIGS. 2, 3, 4, 6, 8, 10, 12, and 14, in the preferred embodiment of this invention, the durable shared physical enclosure 108 shall be constructed and installed as follows.

First, As shown in FIGS. 2, 54, the disabling entity/master transceiver circuit 114 shall be connected electrically to the starter system as earlier outlined. As shown diagrammatically in FIG. 2 and FIG. 3, the master transceiver/disabling entity circuit 114 and all wires that are to be encased by the physical enclosure 108 shall be physically secured, at least temporarily, as flatly and closely as possible against the outside of the starter system 2, by using one or more of the following materials and methods: applying a heat and chemical resistant adhesive such as silicone to these components, embedding these components in an epoxy or thermoplastic resin based hardening potting compound, anchoring these components with plastic cable ties or insulated bailing wire, or by wrapping the starting system 2, circuit board 186, and wires in a flexible insulating material such as Parafilm™, (used to seal laboratory glassware,) or ordinary food grade plastic wrap or rubber.

Next, as shown in FIGS. 3, 4, 6, 8, 10, 12, and 14, an approximately 2" long piece of hexagonal cross section electrically conductive rod stock having a threaded aperture at one end and a threaded stud at the opposite end shall be screwed onto the positive battery terminal 60 of the solenoid 38 so as to extend the positive battery terminal 60 beyond what will be the boundary of the durable shared enclosure 108 so that the positive battery cable 18 may be electrically connected to it after the housing has been completed. This extension 202 may be replaced by a short length of heavy gauge, (8 gauge or thicker,) insulated wire having a female connecting lug crimped or soldered to each end. If such a wire is used instead of the hexagonal rod described above, a nut may be used to attach one end of this wire to the battery positive terminal 60. After connection to the battery positive terminal 60, this wire shall be left protruding from what shall be the outer boundary of the shared enclosure 108. A bolt and nut may be used to attach the opposite end of this wire to the battery positive cable 18.

Also, the nine conductor cable 118, relay input wire 117, and master power wire 116 shall be left protruding from the starter system 2 so that they may also protrude from the completed enclosure 108.

Next, woven tape or cloth composed of carbon and/or aramid fibers, this tape or cloth moistened in an epoxy or thermoplastic based hardening resin, shall be wrapped around the outside of the starter system wires and master transceiver/disabling entity circuit 114 such that the circuit 114 and all electrical connection points and wires except those intended to be accessible from outside the enclosure as mentioned above shall be covered by approximately ¼" of resin soaked tape or cloth. Once this resin hardens, the resultant durable composite coating shall embody the durable shared physical enclosure 108 of this invention as shown in FIGS. 4, 6, 8, 10, 12, 14.

In an alternative embodiment of this invention, the durable shared physical enclosure 108 shall be constructed as follows, and as shown in FIGS. 61–100.

A first section of schedule 40 mild steel pipe with an inner diameter slightly larger than the cranking motor 34, (approximately 4" inner diameter,) shall be cut to the approximate length of the cranking motor 34, (approximately 9".) A longitudinal section running the entire length of this first section 510 of pipe shall be cut out so as to allow this first section of pipe to slide lengthwise onto the cranking motor 34 without interfering with a piggy back mounted solenoid switch 38. This first cut piece of pipe shall be called the bottom section 201 of this alternative embodiment of the shared enclosure 108 portion of this invention.

A second section of schedule 40 mild steel pipe shall be cut to the same length as that of the bottom section 201 and with an inner diameter slightly larger than the outer diameter of the piggyback mounted solenoid 38, (approximately 2.5" inner diameter.) A lengthwise section shall be cut from this second section of pipe so that this second section of pipe may slide lengthwise onto the solenoid switch 38. This second piece of pipe shall be called the top section 203 of this alternative embodiment of the shared enclosure 108 portion of this invention.

A third section of schedule 40 mild steel pipe or flat stock shall be cut to the same length as that of the top 203 and bottom 201 sections of the shared enclosure 108 such that this third section, hereafter referred to as the left section 204 of the shared enclosure 108, shall cover the left side of the starter system 2 when the shared enclosure is completed and installed. Two variations of the left section 204 are shown in the drawings. A left section 204 made of flat stock is shown in FIGS. 61, 63–65, and 82. A left section 204 made of pipe stock is shown in FIGS. 91, 93, 95, and 96. Using pipe stock for the left section 204 creates additional space inside the shared enclosure 108 in which to place the master transceiver/disabling entity circuit 114, yet, the protuberance of this pipe stock may interfere with properly mounting the enclosed starter system 110 onto some vehicles. When components of a vehicle very closely surround the left side of that vehicle's starter system, a flat section of pipe should be used to construct this left section 204 of the shared enclosure 108.

A fourth section of schedule 40 mild steel pipe or flat stock may be cut to the same length as that of the top 203, bottom 201 sections of the shared enclosure 108 such that this third section, hereafter referred to as the right section 205 of the shared enclosure 108, shall cover the right side of the starter system 2 when the shared enclosure 108 is completed and installed. A right section 205 serving this purpose is shown in FIGS. 91–93, 95–96, and 99.

As shown in FIGS. 91–93, 95–96 and 99, a fifth section of pipe may be used to make a cable channel 206. This fifth pipe or cable channel pipe 207 may be cut from schedule 40 mild steel pipe approximately ¾" in diameter and to a length approximately 1" shorter than the length of either the top 203, bottom 201, left 204, or right 205 sections of the shared enclosure 108. This pipe 207 shall be welded lengthwise to the inside of the right section 205 as shown in FIGS. 91, 93, 95, and 96 such that the rear cover 210 of the shared enclosure 108, when this cover 210 is installed, shall be flush with the rear end 208 of this pipe 207. Because this pipe 207 is shorter than the other pieces of the shroud, there will remain a 1" gap between the front end of this pipe and the front cover 216 of the shared enclosure 108, when this cover 216 is installed.

Alternatively, as shown in FIGS. 61–63, 75–77, and 80, if the top 203 and bottom 201 sections of the shared enclosure 108 meet to form a lengthwise cleft, the right section 205 shall be made of flat stock and shall be used to cover this cleft. Covering the intersecting top 203 and bottom 201 sections with a flat right section 205 forms a triangular cross section channel running the length of the shared enclosure 108. This triangular cross section channel shall also embody the cable channel 206.

Figure 66:
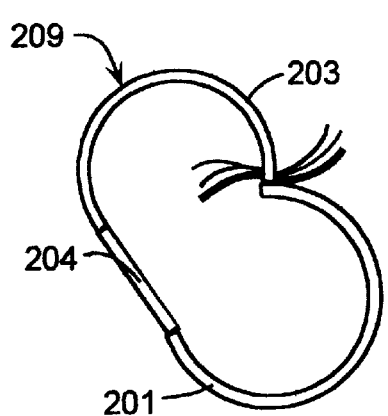
FIG. 66 is a partially disassembled rotated rear view of the apparatus shown in FIG. 61 and is intended to show details of cable routing.
Figure 67:
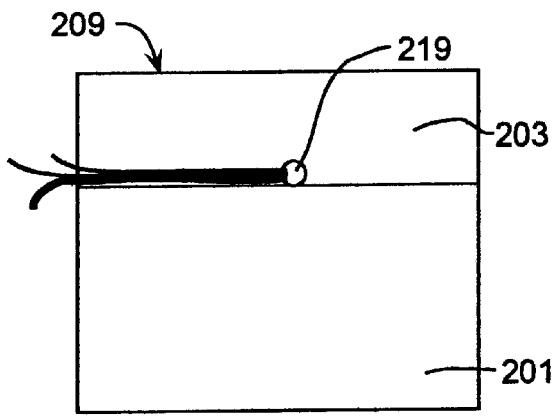
FIG. 67 is a right side view of the apparatus shown in FIG. 66.
Figure 68:
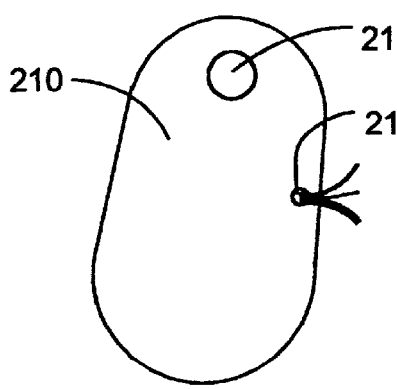
FIG. 68 is a rear view of the rear cover for the apparatus shown in FIG. 61 and show protrusion of cables.
Figure 69:
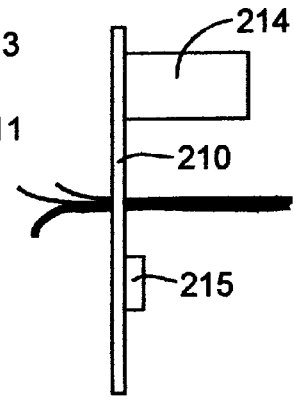
FIG. 69 is a right side view of the apparatus shown in FIG. 68.
Figure 70:
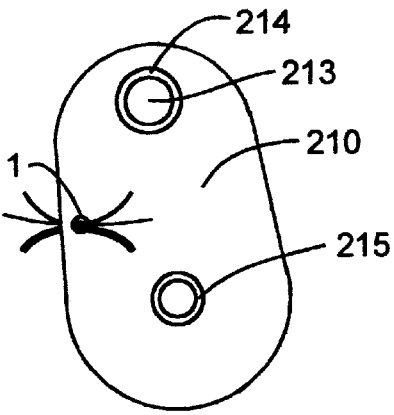
FIG. 70 is a front view of the apparatus shown in FIG. 68.
Figure 71:
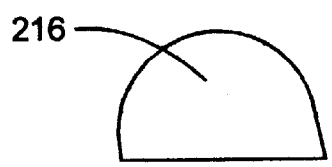
FIG. 71 is a front view of the front cover for the apparatus shown in FIG. 61.
Figure 72:
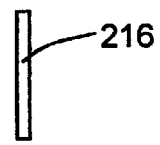
FIG. 72 is a side view of the apparatus shown in FIG. 72.
Figure 73:
FIG. 73 is a bottom view of the apparatus shown in FIG. 72.
Figure 74:
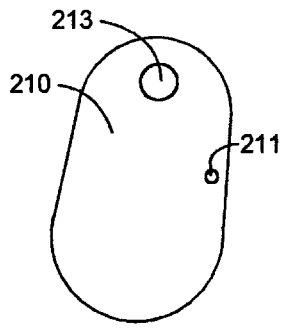
FIG. 74 is identical to FIG. 68 yet does not show protrusion of cables.
Figure 78:
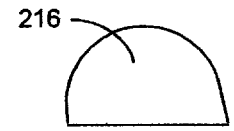
FIG. 78 is identical to FIG. 71.
Figure 75:
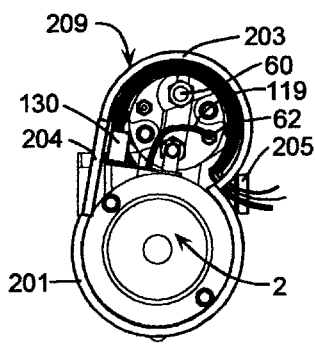
FIG. 75 is a rear view of the apparatus shown in FIG. 55 installed inside the apparatus shown in FIG. 61.
Figure 76:
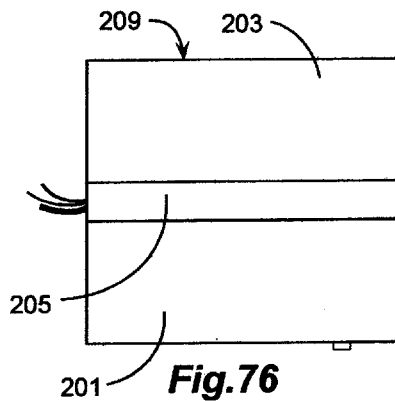
FIG. 76 is a right side view of the apparati shown in FIG. 75.
Figure 77:
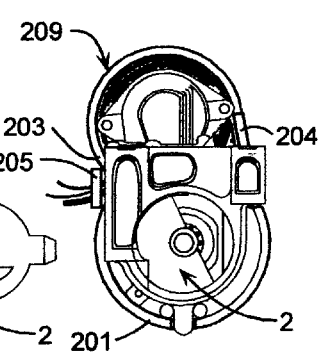
FIG. 77 is a front view of the apparati shown in FIG. 75.
Figure 79:
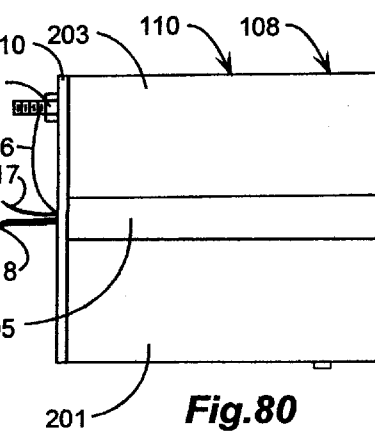
FIG. 79 is a rear view of the apparatus shown in FIG. 55 installed inside the apparatus shown in FIG. 61 after the installation of the covers shown in FIG. 68 and FIG. 71.
Figure 80:
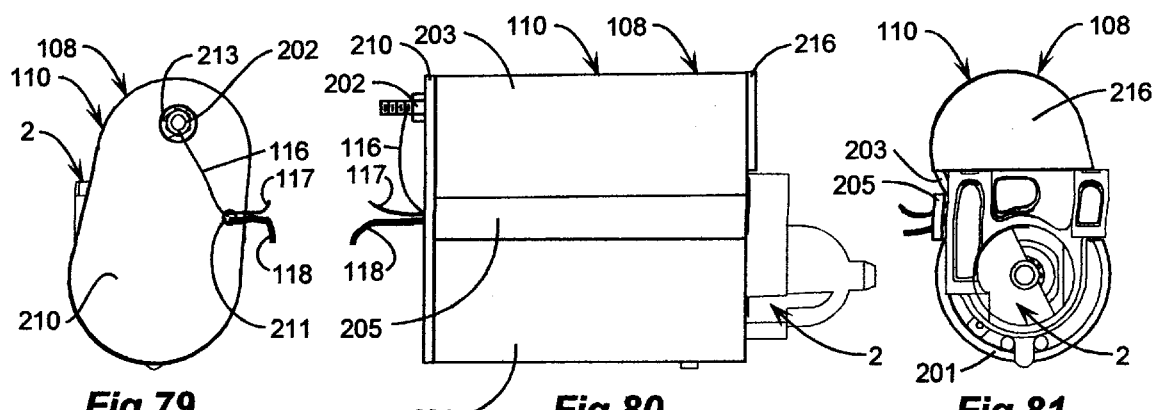
FIG. 80 is a right side view of the apparati shown in FIG. 79.
Figure 81:
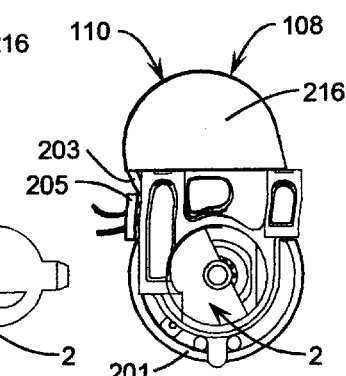
FIG. 81 is a front view of the apparati shown in FIG. 79.
Figure 82:
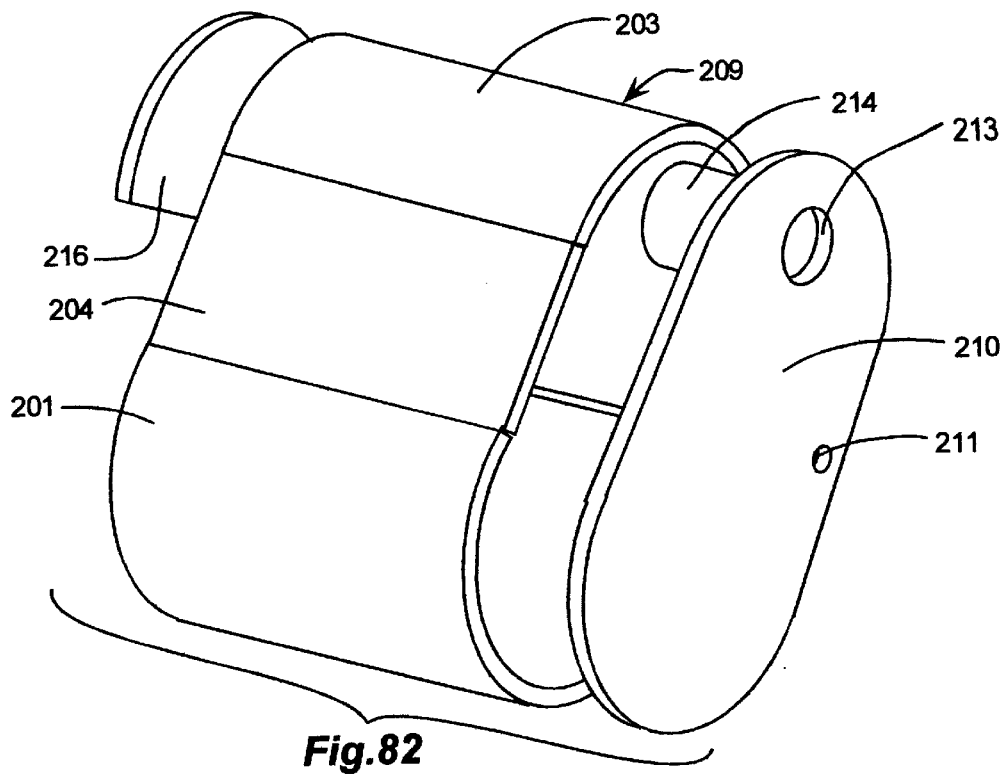
FIG. 82 is a left side perspective exploded view of the assembly of an alternative embodiment of the shared enclosure portion of this invention as constructed to fit the prior art starter system shown in FIG. 55.
Figure 83:
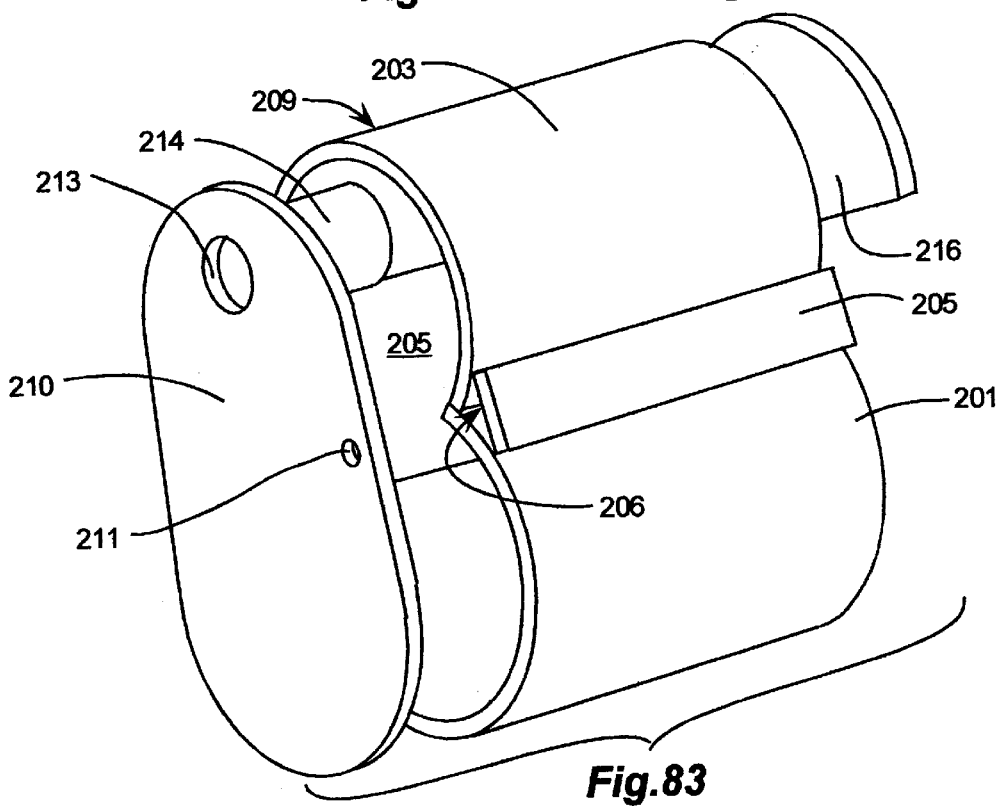
FIG. 83 is a right side perspective exploded view of the assembly of the apparati shown in FIG. 82.
Figure 93:
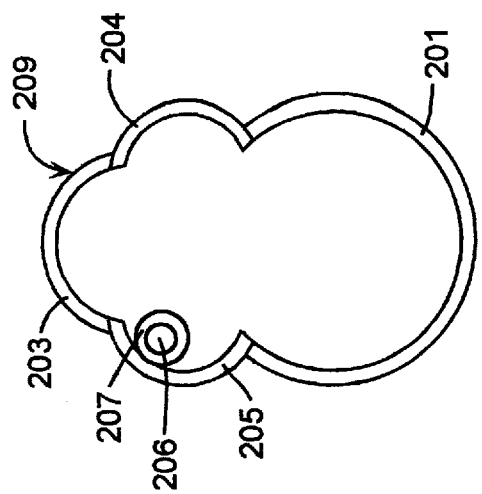
FIG. 93 is a front view of the apparatus shown in FIG. 91.
Figure 92:
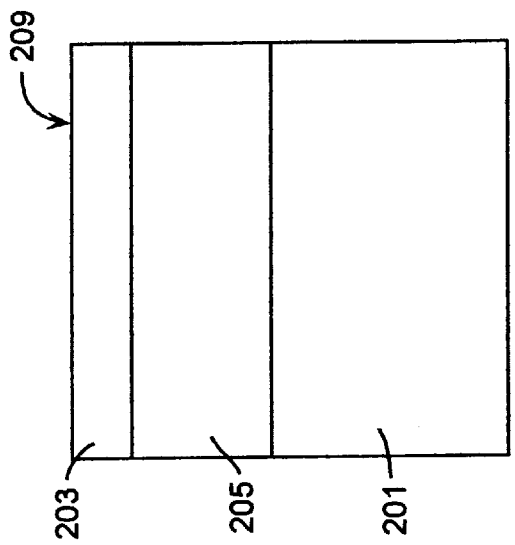
FIG. 92 is a right side view of the apparatus shown in FIG. 91.
Figure 91:
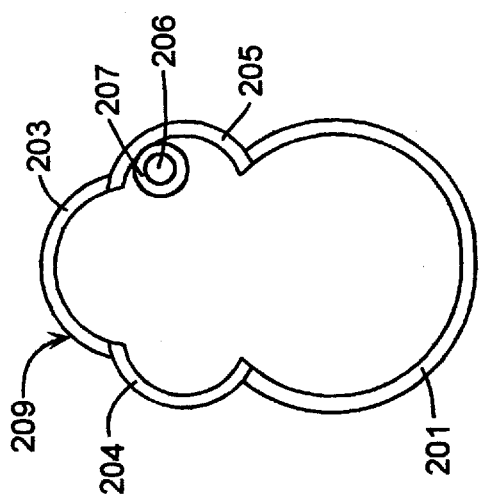
FIG. 91 is a rear view of an alternative embodiment of the shared enclosure portion of this invention, without front or rear covers, as constructed to fit a prior art starter system, manufactured by the Robert Bosch Corporation.
Figures 101, 102, 103:
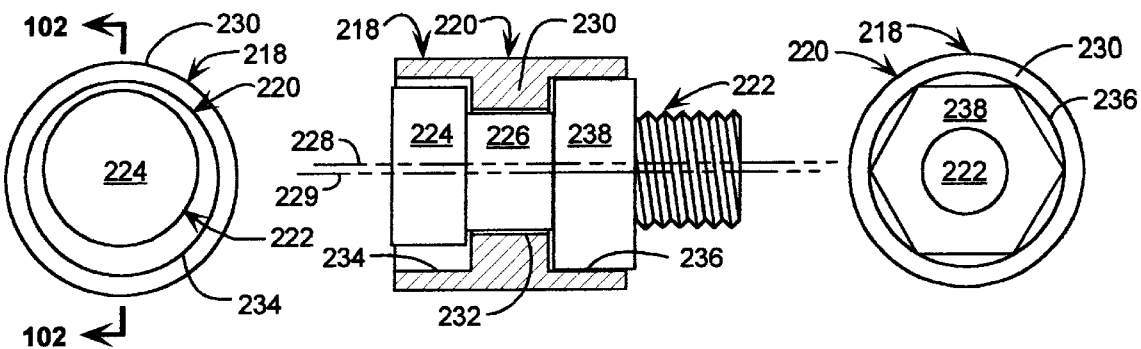
FIG. 101 is a top view of the assembled preferred embodiment of the special fastener portion of this invention.
FIG. 102 is a right side partial sectional view of the assembled preferred embodiment of the special fastener portion of this invention.
FIG. 103 is a bottom view of the assembled preferred embodiment of the special fastener portion of this invention.
Figure 104:
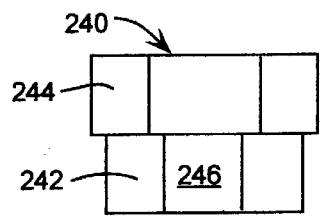
FIG. 104 is a rear view of the preferred embodiment of the special tool portion of this invention.
Figures 105, 106, 107:
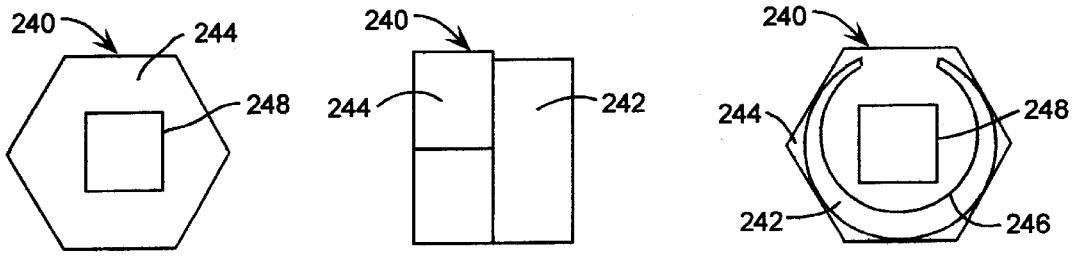
FIG. 105 is a bottom view of the preferred embodiment of the special tool portion of this invention.
FIG. 106 is a right side view of the preferred embodiment of the special tool portion of this invention.
FIG. 107 is a top view of the preferred embodiment of the special tool portion of this invention.
Figure 119:
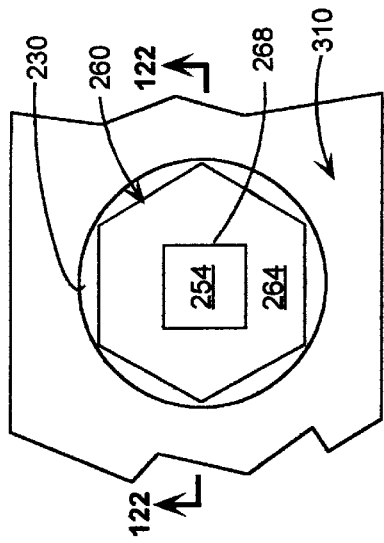
FIG. 119 is a top view of the first alternative embodiment of the special tool portion of this invention being used to install the first alternative embodiment of the special fastener portion of this invention.
Figure 122:
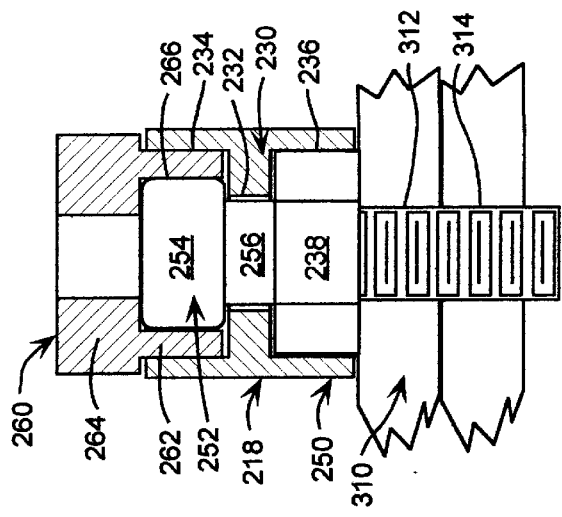
FIG. 122 is a front partial sectional view of the first alternative embodiment of the special tool portion of this invention being used to install the first alternative embodiment of the special fastener portion of this invention.
Figure 121:
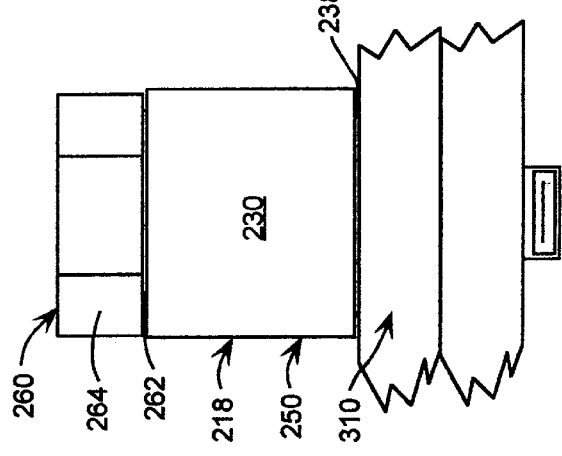
FIG. 121 is a front view of the first alternative embodiment of the special tool portion of this invention being used to install the first alternative embodiment of the special fastener portion of this invention.
Figure 120:
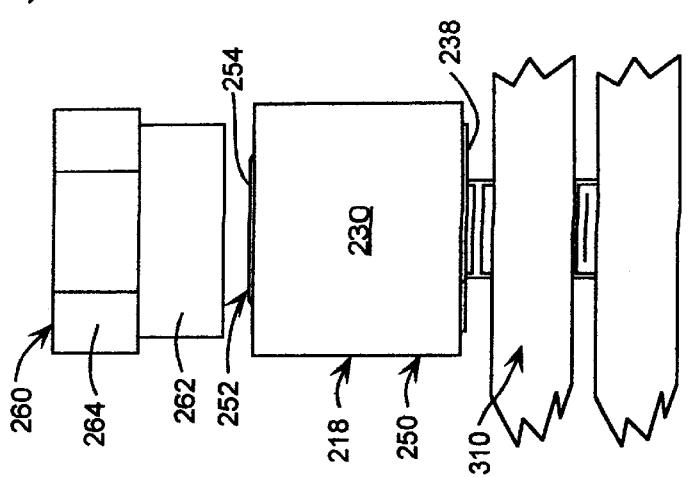
FIG. 120 is an exploded front view of the first alternative embodiment of the special tool portion of this invention being used to install the first alternative embodiment of the special fastener portion of this invention.
Figure 123:
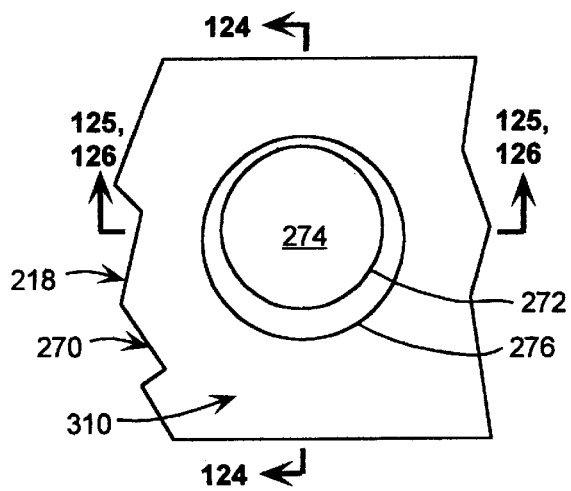
FIG. 123 is a top view of the assembled second alternative embodiment of the special fastener portion of this invention.
Figure 124:
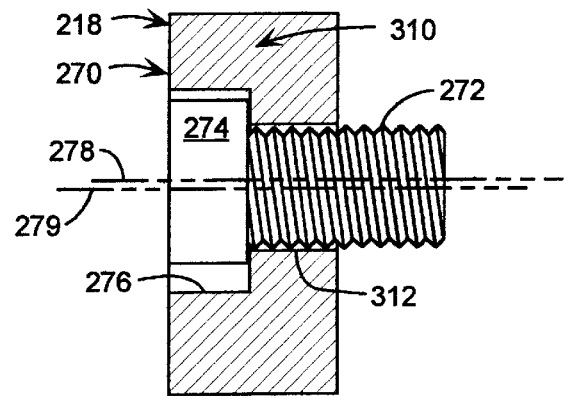
FIG. 124 is a right side partial sectional view of the assembled second alternative embodiment of the special fastener portion of this invention.
Figure 125:
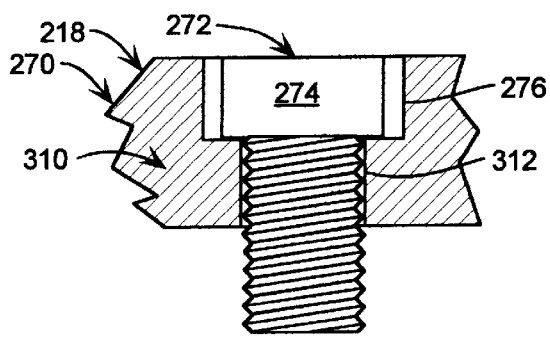
FIG. 125 is a front partial sectional view of the assembled second alternative embodiment of the special fastener portion of this invention.
Figure 126:
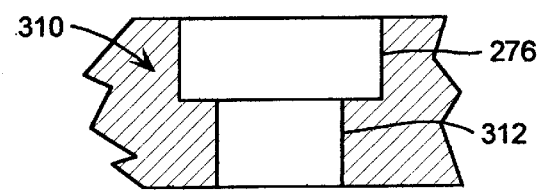
FIG. 126 is a front sectional view of the countersunk aperture portion of the second alternative embodiment of the special fastener portion of this invention.
Figure 127:
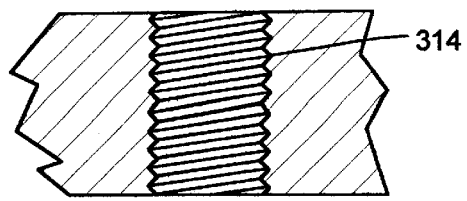
FIG. 127 is a front sectional view of a threaded aperture into which any of the embodiments of the special fastener portion of this invention may be installed.
Figure 132:
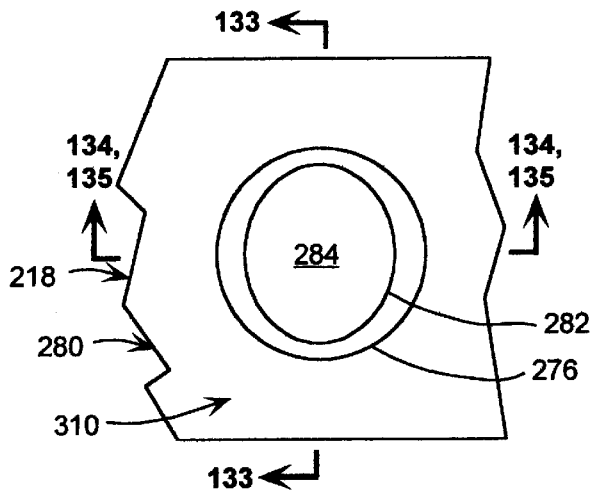
FIG. 132 is a top view of the assembled third alternative embodiment of the special fastener portion of this invention.
Figure 133:
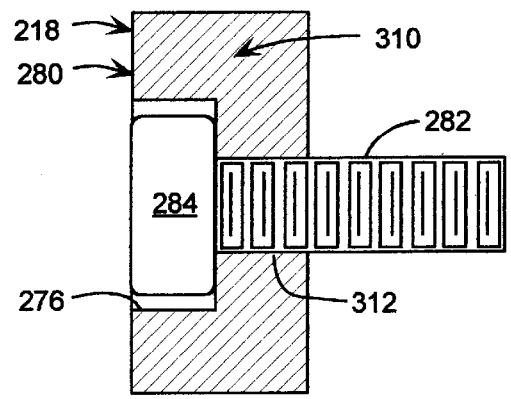
FIG. 133 is a right side partial sectional view of the assembled third alternative embodiment of the special fastener portion of this invention.
Figure 134:
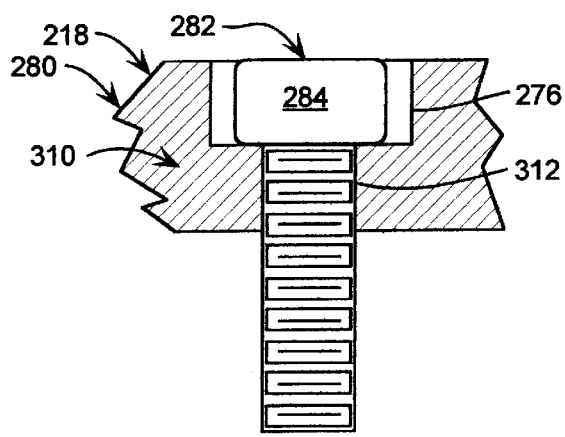
FIG. 134 is a front partial sectional view of the assembled third alternative embodiment of the special fastener portion of this invention.
Figure 135:
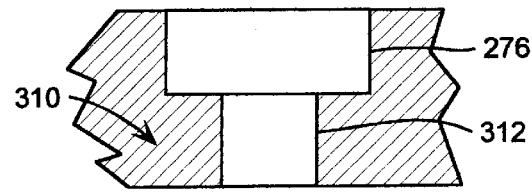
FIG. 135 is a front sectional view of the countersunk aperture portion of the third alternative embodiment of the special fastener portion of this invention.
Figure 136:
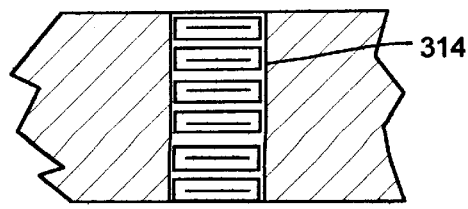
FIG. 136 is a front sectional view of a threaded aperture into which any of the embodiments of the special fastener portion of this invention may be installed.

If this flat right section 205 is used to complete a cable channel 206 as shown in FIGS. 61–3, 75–77, an aperture 219 must be cut into the top section 203 to allow cables to pass from the inside of the shared enclosure 108 into the cable channel 206. Near the middle of the top section 203 and along its right hand longitudinal edge, (when viewed from the rear) a notch or aperture 219 approximately ¼" high and ½" long shall be cut. The 9 conductor cable 118, master power wire 116, and relay input wire 117 will protrude through this aperture 218 as shown in FIGS. 61, 63, and 66, and into cable channel 206 as shown in FIGS. 61, 63, and 75.

While held in place by a jig, the top 203, bottom 201, left 204, right 205, (with or without additional pipe 207 welded to it) sections shall be welded into an integral whole/incomplete enclosure 209. This incomplete enclosure 209 shall approximate the stacked cylindrical shape of the outer surfaces of the stacked cranking motor 34 and solenoid switch 38. This integral whole 209 shall also slide lengthwise over an assembled starter system 2. This integral whole 209 shall also provide a cable channel 206 through which cables may be routed from the inside of the integral whole 209 to outside of its confines. Building a cable channel 206 into the shared enclosure 108, and routing any cables that must protrude from it 108 through this channel, helps to prevent forced access to the interior of the enclosure 108 by tearing these cables. This integral whole 209 shall also provide additional protected space for the circuitry of the master transceiver/disabling entity 114 when the integral whole 209 is installed over a starter system 2.

This integral whole 209 shall then be placed, rear open end down, onto a piece of ¼" thick flat mild steel stock and traced to make a pattern for the rear cover 210 of the shared enclosure 108. Once traced, the rear cover 210 shall then be cut out. Additionally, three locations shall be marked on this rear cover 210. First, after placing the rear of the starter system 2 to be encased against the rear cover 210, the rearmost protrusion 212 of the cranking motor 34 shall be traced onto the rear cover 210. Onto this location, an approximately ½" long section of ¾" diameter schedule 40 pipe 215 shall be welded. This short piece of pipe shall cover the rearmost protrusion 212 of the cranking motor 34 and thereby serve to anchor the completed shared enclosure 108 onto the starting system 2. Alternatively, the length of incomplete enclosure 209 may be decreased by approximately ½", and the pipe 215 replaced with a ¾" diameter hole in the rear cover 210; in which case the rearmost protrusion 212 of the cranking motor 34 will protrude through this hole when the completed shared enclosure 108 is installed onto the starting system 2, thereby holding the starting system 2 in place inside the enclosure 108. Next, with the starting system 2 held against the rear cover, the location of an approximately ¾" aperture 213 should be traced corresponding to the location of the battery positive terminal 60 of the solenoid 38. Once this aperture 213 is drilled through the rear cover 210, the extension 202 of the positive battery terminal 60 of the solenoid 38 will protrude through it 213 once the shroud 108 is assembled. Furthermore, an approximately 1.5" long piece of ¾" inner diameter schedule 40 mild steel pipe shall be welded onto the inner surface of the rear cover 210 and over the ¾" aperture 213 so that this pipe 214 will touch the rear surface of the solenoid 38 and cover the extension 202 of the battery positive terminal 60 when the shroud 108 is completed and installed over the starting system 2. Because this pipe 214 will fit closely against the rear surface of the solenoid, no access to any other electrical connector shall be possible through this pipe 214. Next, with the incomplete housing 209 held against the rear cover 210, the center point of the cable channel should be marked on the rear cover. Upon this point, an aperture 211 approximately ⅜" in diameter shall be drilled through the rear cover 210. Through this aperture 211 any cables routed through the cable channel 206 may protrude through the rear cover 210.

Once the apertures 211 and 213 have been cut through the rear cover and the additional sections of pipe 214 and 215 have been welded to it, the rear cover shall be welded onto the rear of the incomplete housing 209 so that the added sections of pipe 214 and 215 shall protrude into the incomplete shroud 209.

An additional piece of flat ¼" thick mild steel stock shall be cut to a shape approximating the end of the top section 203 of the shroud 108 that covers the solenoid 38. This final piece shall serve as the front cover 216 of the completed shared enclosure 108.

Once the appropriate electrical connections have been made between the master transceiver/disabling entity circuit 114 and starter system 2, and these components have been inserted into the incomplete housing 209 with cables 116, 117, and 118 routed through the cable channel 206 and protruding through the aperture 211 in the rear cover 210, the front cover 216 shall be welded to the front end of the incomplete housing 209 so as to close the front end of the cable channel 206 and prevent the now complete shared enclosure 108 from being slid off of the starter system 2.

Once the shroud 108 is fully assembled and encloses the starter system 2, the extension 202, (constructed as earlier described 202 of preferred embodiment,) of the battery positive terminal 60 of the now enclosed solenoid 38 may be installed. This extension 202 shall be attached the positive battery terminal 60 of the solenoid 38 through the corresponding aperture 213 in and pipe 214 on the rear cover 210 of the shared enclosure 108. When attached to the positive battery terminal 60, the extension 202 shall protrude through the pipe 215 and aperture 213 and beyond the rear cover 210. The heavy gauge positive battery cable 18 may be attached to the extension 202, thereby making electrical contact with the battery positive terminal 60 enclosed within the shared enclosure 108, without danger of short circuiting against the conductive rear cover 210 of the shared enclosure 108.

As an additional safety measure, especially if a non insulated extension 202 is used, the extension 202 shall be insulated from the pipe 214 and aperture 213 through which it protrudes from the rear cover 210 of the shared enclosure 108 with a thin plastic sleeve or by filling the pipe 214 with silicone caulk, hardening epoxy resin, or other non-conductive sealant or potting compound.

The aforementioned variances in the construction of the alternative embodiment of the shared enclosure 108 are necessary to construct a properly fitting shared enclosure 108 for the two different starting systems 2 shown in the two series of drawings FIGS. 55–83 and 84–100. In order to construct a similar example of the alternative embodiment of the shared enclosure 108 portion of this invention for a different type of starting system 2, other subtle changes in the shape and construction of the shared enclosure 108 must be made. Regardless of the final shape of the shared enclosure, if it is made along the lines of the previously described alternative embodiment, it must still armor all electrical connections of the starting system except the battery positive terminal 60, which must remain accessible to electrical connection. Any shared enclosure 108 of this alternative type should also include a cable channel 206 through which cables may be routed to the outside of the shared enclosure 108 in such a manner that removing these cables will not allow easy access to the interior of the shared enclosure 108. Similarly, access to the battery positive terminal 60 should be provided in such a way that removing a part, such as the extension 202, will not afford easy access to the interior of the shared enclosure 108. Finally, various additional slots and apertures 217 may have to be cut into an alternative embodiment of the shared enclosure 108 to provide clearance for additional protuberances of the starter system 2 or surrounding components of the vehicle which would otherwise prevent proper installation of the encased starter system 110. One such slot 217 is shown in the drawings in FIGS. 63 and 65.

Additional pieces of steel may be welded to the external surface of the shroud so that these additional pieces protrude in such a manner as to obstruct access to the heads of the original fasteners 56 or obstruct access to an embodiment of the special fastener portion of this invention 219 or form part of an embodiment of the special fastener 218 portion of this invention which are used to attach the encased starter system 110 to the vehicle's engine 4.

The special fastener 218 portion of this invention which is used to attach the shared enclosure, starter system, or both to the vehicle shall be constructed, assembled, and installed as follows. In order to more easily describe the construction of each embodiment of these special fasteners 218, it will be assumed that each bolt 222, 252, 272, 282, each nut 238, and each threaded aperture 314 will have 5/16" diameter threads.

The preferred embodiment 220 of the special fastener 218 portion of this invention shall be constructed, assembled, and installed as follows and as shown in FIGS. 101–103, 108–111.

The preferred embodiment of the special fastener portion of this invention shall be constructed of three pieces: A preferred modified bolt 222, a spinning collar 230, and an ordinary nut 238.

The preferred modified bolt 222 may be easily made from an ordinary 5/16" thread diameter hexagonal head bolt with a ¼" long unthreaded shoulder 226 also 5/16" in diameter. The head of this bolt shall be ground, turned, or otherwise machined so that the head 224 of the finished preferred modified bolt 222 assumes a right circular cylindrical shape approximately 0.480" in diameter and offset approximately 0.050" away from the central axis 229 of the shaft of the original bolt. In other words, the central axis 228 of the head 224 of the preferred modified bolt 222 shall be parallel to and offset 0.050" away from the central axis 229 of the shaft of the preferred modified bolt 222. Alternatively, the off center round head 224 of this preferred modified bolt 222 may be formed as part of the original bolt.

The spinning collar 230 can be easily turned, drilled, or otherwise machined from a solid right circular cylindrical piece of ¾" diameter bar stock. Three apertures shall be drilled, bored, or otherwise machined parallel to and centered upon the longitudinal axis of a ¾" long section of such bar stock. The first aperture 232 shall be 5/16" in diameter and shall be drilled or bored completely through the piece. The second aperture 234 shall be 0.600" in diameter and bored from the top of the cylinder along the centerline of the bar stock to a depth of ¼". The bottom of this second aperture 234 shall be flat and perpendicular to the longitudinal axis of the bar stock. The remaining wall of the bar stock surrounding this second aperture 234 will be about 0.075" thick. The third aperture 236 shall be 0.600" in diameter and bored from the bottom of the cylinder along the centerline of the bar stock to a depth of ¼". The bottom of this third aperture 236 shall also be flat and perpendicular to the longitudinal axis of the bar stock. The remaining wall of the bar stock surrounding this third aperture 236 will only be about 0.075" thick.

Each preferred special fastener 220 shall be assembled from the previously described preferred modified bolt 222, spinning collar 230 and an ordinary 5/16" thread diameter nut 238 as follows. The preferred modified bolt 222 shall be inserted through the top of the spinning collar 230, through all three concentric apertures 232, 234, and 236, until its head 224 touches the bottom of the second aperture 234 in the collar. Once the bolt 222 is so inserted, the ordinary nut 238 is tightened onto the bolt 222 until the nut 238 reaches the shoulder 226 of the bolt 222. When so tightened, the nut 238 will nearly contact the bottom of the third aperture 236 of the collar 230 and still slightly protrude from the bottom of the collar 230.

When so assembled, the collar 230 will spin freely about the shoulder 236 of the bolt 222. Therefore, no torque may be transmitted from the collar 236 to the bolt 222 or nut 238. Also, the head 224 of the preferred modified bolt 222 is round and therefore may not be effectively turned by an ordinary wrench or socket. Also, because the head 224 of the bolt 222 is recessed into the spinning collar 230, the bolt 222 may not be grasped or turned with pliers, nor served with a saw. Since the nut 238 only protrudes slightly from the bottom of the collar 230, it may not be effectively grasped with a wrench. The only easy way to apply torque to the modified bolt 222 portion of this fastener 220 is to use a special tool 240 which fits into the narrow space between the head 224 of the modified bolt 222 and the inside surface of the second aperture 226 in the spinning collar 230. This special tool 240 shall be constructed as follows as shown in FIGS. 104–107.

This special tool 240 may be most easily machined from a section of hexagonal cross section bar stock at least ½" long over which a 9/16" or larger hex wrench may properly fit and be used to apply torque to the finished tool 240. This stock shall be turned, milled, or otherwise machined about the central axis of the stock down to an outer diameter of 0.600" for slightly more than ¼" or half of the length of the stock. After this process, the turned half 242 of the stock will have a round cross section with an outer diameter which conforms to the inner diameter of the spinning collar 230 of the preferred embodiment of the special fastener 220. A flat bottom aperture 246, 0.480" in diameter, must then be drilled, bored, or otherwise machined through the round half 242 of the stock to a depth of about ¼" and parallel to but offset 0.050" from its central axis. After this process, the turned end 242 of the stock will fit tightly over the offset head 224 of the modified bolt 222 as well as into the spinning collar 230. A ¼" square aperture 248 may be punched, bored, or machined through the unturned hexagonal end 244 of the stock. This square aperture 244 will allow torque to be applied to the completed special tool 240 with a ¼" square drive tool such as a ratchet handle.

To apply torque to the preferred embodiment 220 of the special fastener 218 portion of this invention with the preferred embodiment of the special tool 240 portion of this invention, this tool 240 must be used as follows and as shown in FIGS. 108–111. The tool 240 must be inserted into the second aperture 234 in the spinning collar 230 and over the offset head 224 of the modified bolt 222 such that the head 224 fits into the offset aperture 246 in the turned end 242 of the tool 240. After inserting the tool 240 into the fastener 220 in such a manner, any torque applied to the tool 240 about the central axis of the tool will be transmitted to the modified bolt 222 due the constraint of the spinning collar 230 on the tool 240 and the offset of the circular head 224 of the bolt 222 and corresponding circular aperture 246 in the tool. Since the collar 230 prevents the tool 240 from rotating about the round head 224 of the bolt 222, the bolt 222 must instead rotate with the tool 240. In effect, when the tool 240 is turned, the central axis 228 of the round aperture 246 in the tool and the round head 224 of the bolt 222 will follows a circular arc about the central axis 229 of the tool and the shaft of the bolt. When the assembled special fastener 220 is installed through an aperture 312 in a surface 310 perpendicular to the axes 228,229 of the bolt 222 and tightened with the special tool 240, the nut 238 portion of the special fastener 220 will be tightened against the shoulder 226 of the modified bolt 222 and thereafter supply normal force against this perpendicular surface 310. When the bolt 222 portion of the special fastener 220 is loosened with the special tool 240, the nut 238 will also be loosened, thereby relieving this normal force.

A first alternative 250 embodiment of the special fastener 218 used to attach the shared enclosure 108, starter system 2, or both 110 to the vehicle shall be constructed, assembled, and installed as follows. Each such fastener 250 shall be constructed of three pieces: A first alternative modified bolt 252, a spinning collar 230, and an ordinary nut 238.

The first alternative 250 embodiment of the special fastener 218 portion of this invention shall be constructed, assembled, and installed as shown in FIGS. 112–114, 119–122.

The first alternative modified bolt 252 may be easily made from an ordinary 5/16" thread diameter hexagonal head bolt with a ¼" unthreaded shoulder also 5/16" in diameter. The head 254 of this bolt 252 shall be ground, turned, or otherwise machined so that the head 254 assumes a right elliptical or oval cylindrical shape approximately 0.480"× 0.530" in diameter and centered about the central axis of the shaft of the original bolt. The elliptical head 254 of this first alternative modified bolt 252 may be forged or otherwise formed as part of the original bolt.

The spinning collar 230 of the first alternative 250 embodiment of the special fastener 218 portion of this invention may be constructed exactly as the spinning collar 230 of the preferred embodiment of the special fastener portion of this invention.

Each special fastener of the first alternative 250 embodiment type shall be assembled from the previously described first alternative modified bolt 252, spinning collar 230 and an ordinary ⁵⁄₁₆" thread diameter nut 238 as follows. The first alternative modified bolt 252 shall be inserted through the top of the spinning collar 230 until its head 252 touches the bottom of the second aperture 234 in the collar 230. Once the bolt 252 is so inserted, the ordinary nut 238 is tightened onto the bolt 252 until the nut 238 reaches the shoulder 256 of the bolt 252. When so tightened, the nut 238 will nearly contact the bottom of the third aperture 236 of the collar 230 and still slightly protrude from the bottom of the collar 230.

When so assembled, the collar 230 will spin freely about the shoulder 256 of the bolt. Therefore, no torque may be transmitted from the collar 230 to the bolt 252 or nut 238. Also, because the head 252 of the bolt 252 is recessed into the spinning collar 230, the bolt 252 may not be grasped or turned with pliers, nor severed with a saw. Since the nut 238 only protrudes slightly from the bottom of the collar 230, it 238 may not be effectively grasped with a wrench. The only easy way to apply torque to the bolt 252 is to use a first alternative special tool 260 which fits into the narrow space between the head 252 of the first alternative modified bolt 252 and the inside surface of the second aperture 234 in the collar 230. This first alternative special tool 260 shall be constructed as follows as shown in FIGS. 115–118.

This first alternative special tool 260 shall be constructed in a manner similar to the construction of the preferred embodiment 240 of the special tool portion of this invention. It too may be most easily machined from a section of hexagonal cross section bar stock at least ½" long over which a ⁹⁄₁₆" or larger hex wrench may properly fit and be used to apply torque to the finished tool. This stock must be turned, milled, or otherwise machined about the central axis of the stock down to an outer diameter of 0.600" for slightly more than ¼" or half of the length of the stock. After this process, the turned half 262 of the stock will have a round cross section with an outer diameter which conforms to the inner diameter of the spinning collar 230. A flat bottom elliptical or oval aperture 266 approximately 0.480"×0.530" in diameter must then be drilled, bored, or otherwise machined through the central axis of the rounded half 262 of the stock to a depth of about ¼". After this process, the turned end 262 of the stock will fit tightly over the elliptical/oval head 254 of the first alternative modified bolt 252 as well as into the spinning collar 230. A ¼" square aperture 268 may be punched, bored, or machined through the unturned hexagonal end 264 of the stock. This square aperture 268 will allow torque to be applied to the completed first alternative special tool 260 with a ¼" square drive tool such as a ratchet handle.

To apply torque to the first alternative 250 embodiment of the special fastener 218 portion of this invention with the first alternative embodiment of the special tool 260 portion of this invention, this tool 260 must be used as follows and as shown in FIGS. 119–122. The tool must be inserted into the second aperture 234 in the spinning collar 230 and over the elliptical or oval head 254 of the first alternative modified bolt 252 such that the head 254 fits into the elliptical or oval aperture 266 in the tool 260. After inserting the tool 260 into the fastener 250 in such a manner, any torque applied to the tool 260 about the central axis of the tool will be transmitted to the first alternative modified bolt 252 since the out of round shape of the head 254 of the bolt 252 and corresponding aperture 266 in the tool prevent the tool 260 from rotating about the head 254 of the bolt 252.

When the assembled first alternative special fastener 250 is installed through an aperture 312 in a surface 310 perpendicular to the axis of the bolt 252 and tightened with the first alternative special tool 260, the nut 238 portion of the first alternative special fastener 250 will be tightened against the shoulder 256 of the first alternative modified bolt 252 and thereafter supply normal force against this perpendicular surface 310. When the bolt 252 of the first alternative special fastener 250 is loosened with the first alternative special tool 260, the nut 238 will also be loosened, thereby relieving this normal force.

A second alternative 270 embodiment of the special fastener 218 portion of this invention may be constructed, assembled, and installed as follows. This second alternative special fastener shall comprise a second alternative modified bolt 272, and a circular flat bottomed countersunk aperture 276 concentric with the aperture 312 in the surface 310 through which the bolt 272 shall be installed.

The second alternative embodiment 270 of the special fastener 218 portion of this invention shall be constructed, assembled, and installed as shown in FIGS. 123–131.

The second alternative modified bolt 272 may be constructed exactly as the preferred modified bolt 222 except that the bolt 272 need not have a shoulder.

Rather than protecting the head 274 of the modified bolt 272 from access or application of torque by installing it through the aforementioned spinning collar 230, the second alternative modified bolt 272 shall be installed, with the same special tool 240 used to install the preferred modified bolt 222, such that the head 274 of this second alternative modified bolt 272 shall be recessed into a flat bottom countersunk aperture 276 having the same diameter as the second aperture 234 in the aforementioned spinning collar 230, (0.600"). The countersunk aperture 276 will limit access to the head 274 of the bolt 272 with any traditional tool and necessitate the use of the preferred embodiment of the special tool 240 portion of this invention to facilitate easy removal or complete installation of this second alternative modified bolt 272. When completely tightened, the head 274 of the second alternative modified bolt 272 exerts normal force upon the bottom of the countersunk aperture 276 in the surface 310 through which the bolt 272 is installed.

A third alternative 280 embodiment of the special fastener 218 portion of this invention shall be constructed, assembled, and installed as follows. This third alternative special fastener 280 shall comprise a third alternative modified bolt 282, and a circular flat bottomed countersunk aperture 276 concentric with the aperture 312 in the surface 310 through which the bolt 282 shall be installed.

This third alternative embodiment 280 of the special fastener 218 portion of this invention shall be constructed, assembled, and installed as shown in FIGS. 132–140.

The third alternative modified bolt 282 may be constructed exactly as the first alternative modified bolt 252 except that the bolt 282 need not have a shoulder.

Rather than protecting the head 284 of the third alternative modified bolt 282 from access or application of torque by installing it 282 through the aforementioned spinning collar 230, this third alternative modified bolt 282 shall be installed, with the same special tool 260 used to install the first alternative modified bolt 252, such that the head 284 of this third alternative modified bolt 282 shall be recessed into a flat bottom countersunk aperture 276 having the same diameter as the second aperture 234 in the aforementioned spinning collar 230 (0.600"). The countersunk aperture 276 will limit access to the head 284 of the bolt 282 with any traditional tool and necessitate the use of the first alternative embodiment of the special tool 260 portion of this invention to facilitate easy removal or complete installation of this third alternative modified bolt 282. When completely tightened, the head 284 of this third alternative modified bolt 282 exerts normal force upon the bottom of the countersunk aperture 276 in the surface 310 through which the bolt 282 is installed.

A fourth alternative 290 embodiment of the special fastener 218 portion of this invention shall be constructed, assembled, and installed as follows and as shown in FIGS. 141–149. This special fastener 290 shall comprise the preferred embodiment 220 of the special fastener 218 portion of this invention and a flat bottom countersunk aperture 292 concentric with the aperture 312 in the surface 310 through which the fastener 220 shall be installed. This countersunk aperture 292 shall be drilled, bored, or otherwise machined or formed to a diameter several thousandths of an inch greater than the outer diameter of the spinning collar 230, and to a depth similar to the length of the spinning collar 230, at least ½". The preferred special fastener 220 shall be installed such that when fully tightened with the preferred special tool 240, the spinning collar 230 shall be recessed into this countersunk aperture 292 and will still spin about the shoulder 226 of the modified bolt 222. By recessing the preferred fastener 220 into this countersunk aperture 292, the spinning collar 230 may not be held so that it can be sawed off, nor may the sides of the spinning collar 230 be hit with a solid blow from a striking tool.

A fifth alternative embodiment 300 of the special fastener 218 portion of this invention shall be constructed, assembled, and installed as follows and as shown in FIGS. 150–158. This special fastener 300 shall comprise the first alternative embodiment 250 of the special fastener 218 portion of this invention and a flat bottom countersunk aperture 292 concentric with the aperture 312 in the surface 310 through which the fastener 250 shall be installed. This countersunk aperture 292 shall be drilled, bored, or otherwise machined or formed to a diameter several thousandths of an inch greater than the outer diameter of the spinning collar 230, and to a depth similar to the length of the spinning collar 230, at least ½". The first alternative special fastener 250 shall be installed such that when fully tightened with the first alternative special tool 260, the spinning collar 230 shall be recessed into this countersunk aperture 292 and will still spin about the shoulder 256 of the modified bolt 252. By recessing the first alternative fastener 250 into the countersunk aperture 292, the spinning collar 230 may not be held so that it can be sawed off, nor may the side of the spinning collar 230 be hit with a solid blow from a striking tool.

Any of the components of the preferred 220, first alternative 250, second alternative 270, third alternative 280, fourth alternative 290, or fifth alternative 300 embodiments of the special fastener 218 portion of this invention may be heat tempered or otherwise treated to make these parts harder and more durable. The heads 224, 254, 274, 284 of these special fasteners 218 would especially benefit from this treatment because even a slight deformation of their shape would prevent them from being removed with the special tools 240 or 260 and possibly prevent them from being removed at all. The spinning collar 230 would also benefit from this treatment because its outer walls surrounding both its second 234, and third 236 apertures are extremely thin, (approximately 0.75" as described herein.) If the wall of the second aperture 234, which surrounds the heads 224, 254, 274, and 284 deforms even slightly, the special tools 240 or 260 will not fit properly into the collar 230.

The construction methods used to make any of the aforementioned preferred 220, first alternative 250, second alternative 270, third alternative 280, fourth alternative 290, or fifth alternative 300 special fasteners may be and shall be modified on a small lot basis by slightly altering the dimensions and or offset of the head 224, 254, 274, 284 of their corresponding modified bolt 222, 252, 272, 282. Changing the shape or dimensions or offset of the head 224, 254, 274, 284 of these modified bolts 222, 252, 272, 282 necessitates similar alterations to the construction of their corresponding special tool 240 or 260. In particular, the diameter and offset of the aperture 246 in tool 240, or the dimensions and shape of the aperture 266 in tool 260 must be changed to mimic any changes made respectively to either an off-center headed fastener 220, 270, 290, or an elliptical/oval headed fastener 250, 280, 300. A special tool portion of this invention, either 240 or 260 shall be constructed to fit each variation upon each of the embodiments 220, 250, 270, 280, 290 or 300 of the special fastener 218 portion of this invention. Each embodiment of the special fastener portion of this invention shall be constructed such that a single special tool analogous to either 240 or 260 is only useful for applying torque to the special fasteners used to install only one or several individual vehicle parts. For example, one special tool 240 or 260 shall only be capable of installing a total number of six special fasteners 218, these six fasteners having been used to install a total of three encased starter systems 110 onto three vehicles. Through such controlled manufacturing of these special fasteners 218 and tools 240 and 260, these special fasteners 218 shall severely hinder removal of any component of a vehicle or of this invention that is secured with them.

OPERATION

As illustrated in the flowchart FIG. 159A/FIG. 159B, and in FIGS. 160–64, the preferred embodiments of the master transceiver circuit 114, disabling entity 130, keyhole pad circuit 136, and slave transceiver 126 portions of this invention, the construction and installation of these elements having already been described in detail, shall function together as follows.

The microcontroller 138, on the master transceiver/disabling entity circuit board 132 controls all aspects of the operation of the preferred embodiment of this invention via its EPROM resident program.

Before power is initially applied to the master transceiver/disabling entity circuit 114, or at any time power is disconnected from this circuit 114, the coil of the relay which embodies the disabling entity 130 shall always be open circuited. Since the contacts of the relay 130 shall be normally open, whenever power is removed from the master transceiver/disabling entity circuit 114, the relay 130 shall not, under any circumstances, allow electrical current to be applied to the ignition positive terminal 62 of the solenoid 38. Note that DEACTUATING/DEFEATING/DEACTIVATING the disabling entity 130 implies POWERING the coil of the relay 130, since the contacts of the relay 130 are normally open, (normally disabling the encased starter system 110)

As earlier stated, while power is disconnected from the master transceiver circuit 114, a 3V lithium battery 147 will provide backup power to the EEPROM/time keeping device 146 which allows it to continue to keep accurate time.

Figure 159B:
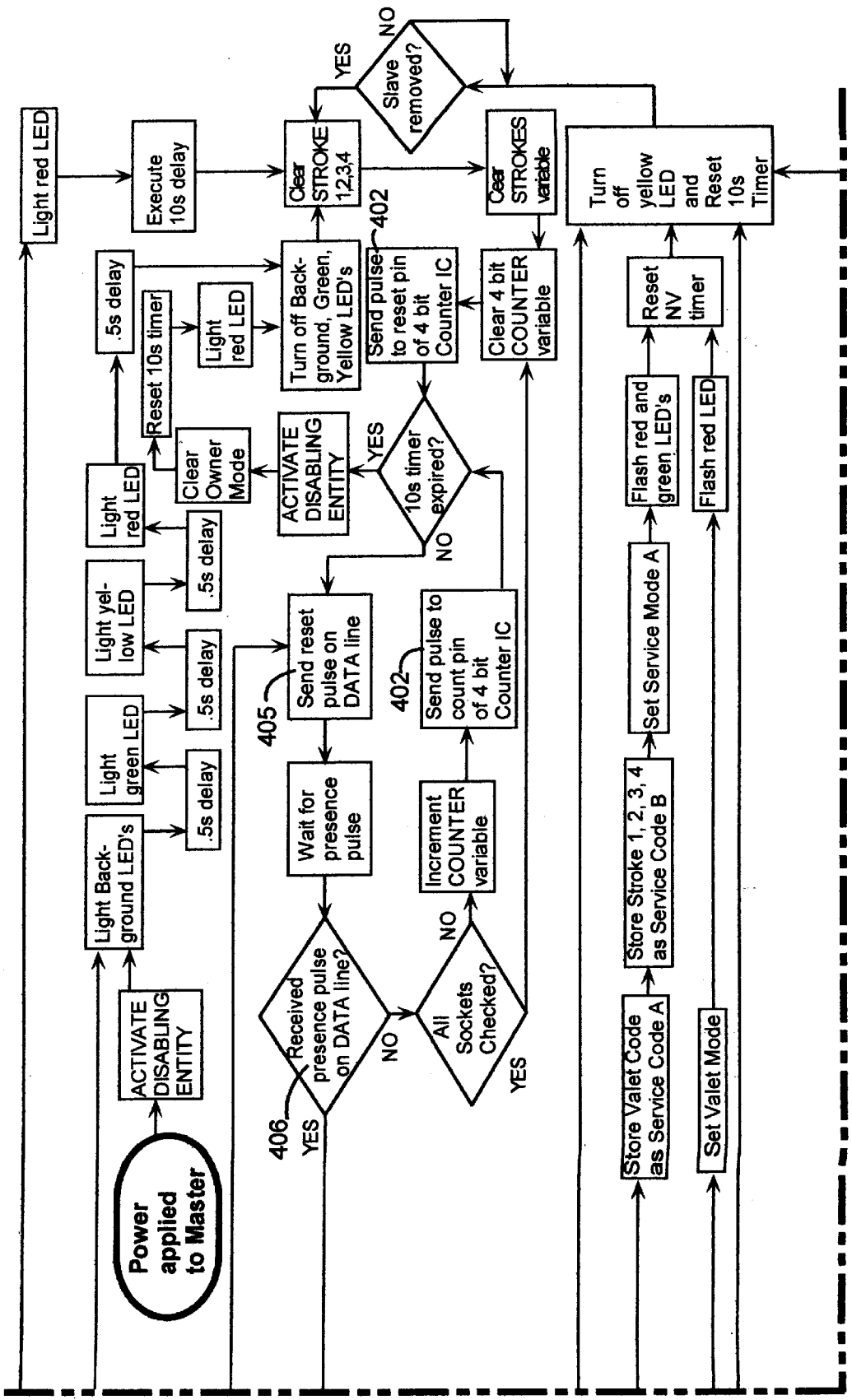
FIG. 159B is the right half of the flow chart shown in FIG. 159A.
Figure 159C:
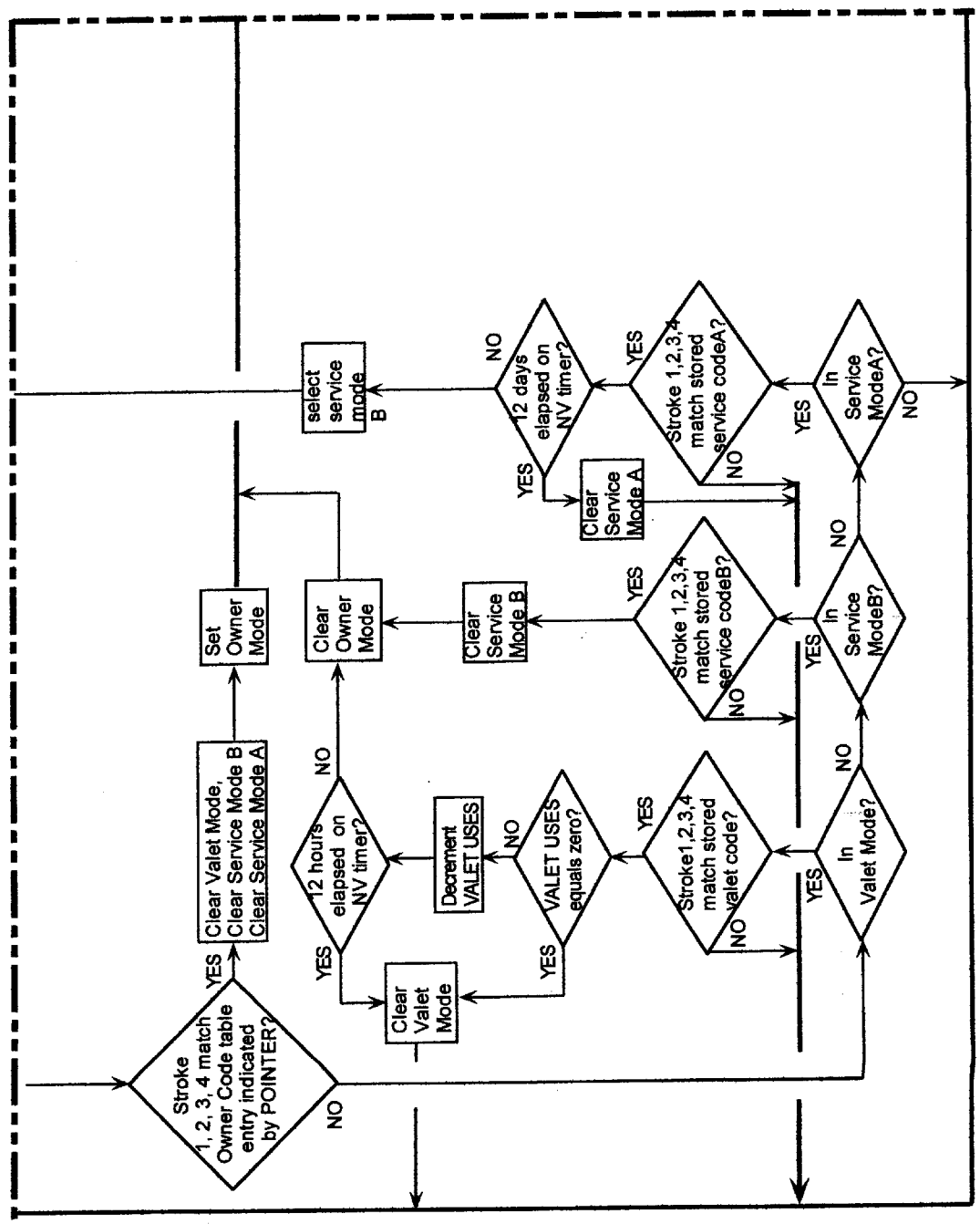
FIG. 159 is divided into FIG. 159A and FIG. 159B.
FIG. 159A is the left side of a flow chart detailing the operation of the master transceiver portion of the preferred embodiment of this invention.
Figure 159D:
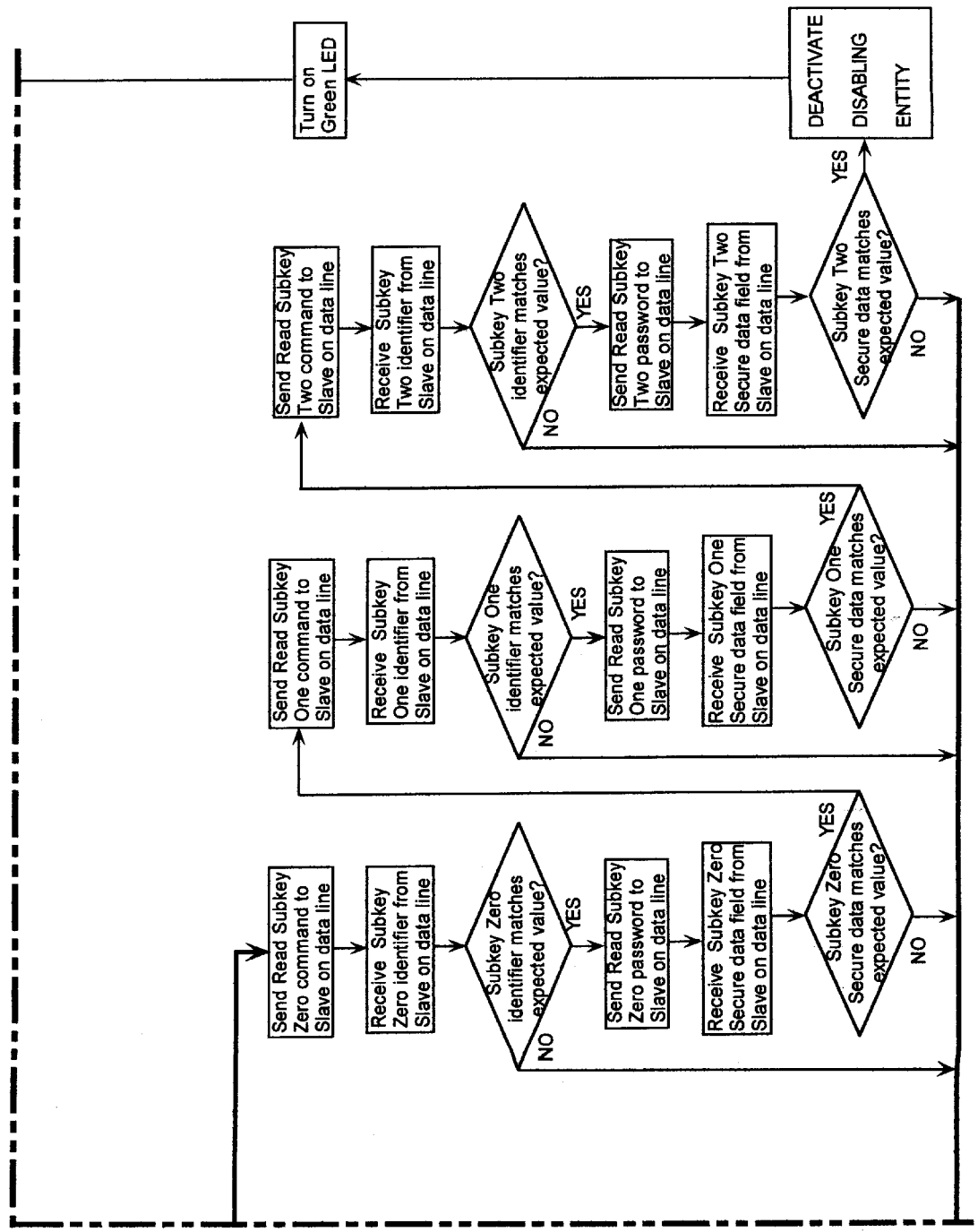
Figure 160:
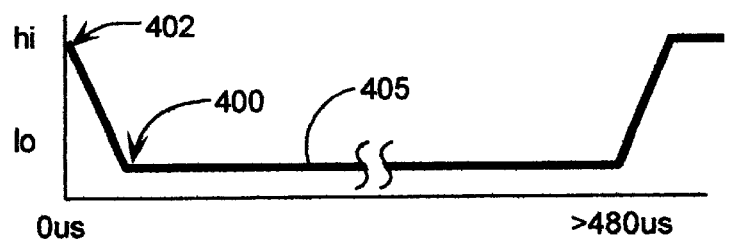
FIG. 160 is a representation of the wave form of a reset pulse generated by the master transceiver portion of this invention.

Upon power being initially applied to the master transceiver circuit 114, the microcontrolller 138 will reset and execute its EPROM resident program which is illustrated in the flowchart beginning at the upper left-hand corner of FIG. 159B.

As per its EPROM resident program, the microcontroller 138 will first light each of the background LED's 152, yellow LED 168, green LED 166, and red LED 164 on the keyhole pad circuit board 120 in sequence in order to test them and to indicate that the program is running properly. During this test sequence, the last LED to light will be the red indicator LED 166 which indicates that the system is "armed," meaning that the disabling entity 130 or relay 130 is still open circuited as it should be. Once lit during the test sequence, this red indicator LED 166 will remain lit while the other LED's background 152, yellow 168, and green 166 are turned off. Except during a data transaction between the master transceiver 114 and slave transceiver 126, or while the disabling entity 130 is deactivated, (relay 130 ON,) this red indicator LED 164 shall always remain lit or flashing.

Next, the microcontroller 138 shall clear to zero a STROKES variable in its RAM which keeps track of the number of times a slave transceiver 126 has been inserted into a socket 124 of the keyhole pad circuit 136.

After resetting this STROKES variable, the microcontroller 138 searches for the presence of a slave transceiver 126 in the sockets 124 of the keyhole pad 136. This searching is executed as follows and is illustrated on the upper half of FIG. 159B. Since only one data line 190 exists between the microcontroller 138 and the keyhole pad circuit 136, this data line 190 is multiplexed by the keyhole pad circuit 136 into electrical connection with each of 10 sockets 124 into which a slave transceiver 126 may be inserted. The microcontroller 138 controls exactly which socket 124 is connected to the data line 190 at any given time by sending logic high 402 pulses over the count line 186 and reset line 188 of the 9 conductor cable 118. The count line 186, and reset line 188 of the 9 conductor cable 118 are electrically connected, respectively, to the count pin 146, and reset pin 148 of the 4 bit binary counter chip 142. By sending a pulse along the reset line 188, the microcontroller 138 resets the 4 bit binary counter circuit 142. When reset, the 4 bit binary counter 142 presents in parallel the 4 bit binary signal 0000 to the 16 to 1 multiplexer/demultiplexer chip 144. When presented with this 0000 signal, the multiplexer/demultiplexer 144 connects whichever socket 124 is connected to the first I/O throw pin of the mux/demux 144 to the data line 190. By sending a pulse along the count line 186, the microcontroller 138 increments the 4 bit binary counter 142. After being reset and so incremented, the 4 bit binary counter 142 presents the binary signal 0001 to the mux/demux 144. When presented with this 0001 signal, the mux/demux 144 connects whichever socket 124 is connected to the second I/O throw pin of the mux/demux 144 to the data line 190. In this manner, each pulse sent by the microcontroller 138 along the count line 186 increments the 4 bit binary signal sent to the mux/demux 144 and therefore connects a different socket 124 to the data line 190.

As described herein, the keyhole pad circuit 136 has 6 fewer sockets than the mux/demux 144 has throw input/output pins. Consequently, not all binary signals presented to the mux/demux 144 will result in a socket 124 being connected to the data line 190. This is of no consequence.

Before the microcontroller 138 begins to search for a slave transceiver 126 in one of the sockets 124, the microcontroller 138 clears to zero a COUNTER variable implemented in RAM of the microcontroller 138. The microcontroller resets this COUNTER variable each time it sends a logic high 402 pulse along the reset line 188, and increments this COUNTER variable each time it sends a logic high 402 pulse along the count line 186. Therefore, this COUNTER variable is always descriptive of which socket 124, if any, is connected to the data line 180, and will serve to indicate which socket 124 a slave 126 has been inserted into.

Also before the microcontroller 138 begins to search for a slave transceiver 126, the microcontroller 138 checks to see if a timer implemented in RAM of the microcontroller 138 has counted 10 seconds since it was last reset. If this 10 second time period has expired, the microcontroller will activate the disabling entity 130, Clear a 1 bit OWNER MODE flag, light the red indicator LED 164, shut off all other LED's, then reset the 10s timer. If the 10s timer has not expired, (10s have not elapsed since the last time this timer was reset,) the microcontroller 138 will finally begin to search for a slave transceiver 126.

After resetting the COUNTER variable and the 4 bit counter circuit 142, and verifying that 10s have not elapsed since the 10s timer was last reset, the microcontroller 138 sends a reset pulse 405 to one socket 124 and waits a short time for a response. This reset pulse 405 is a signal that pulses the data line 190 logic low 400 for a period of about 500 microseconds then releases the data line 190 to the logic high 402 state. Note that the resting 404 state of the data line 180 is the logic high 402 state. This reset pulse 405 is represented diagrammatically in FIG. 160.

After transmitting a reset pulse 405, the master transceiver samples the data line 190 for a period of approximately 100 microseconds during which the microcontroller 138 may detect the presence of a slave transceiver 126.

Figure 161:
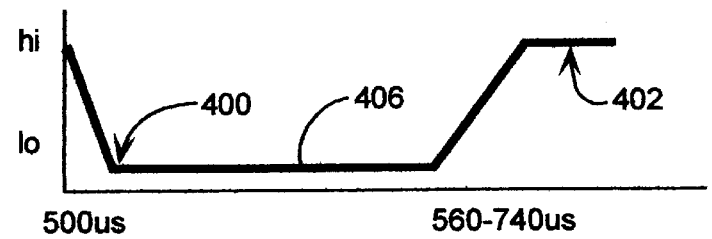
FIG. 161 is a representation of the wave form of a presence pulse generated by the slave transceiver portion of this invention.

If a slave transceiver 126 was already inserted into the socket 124 presently connected to the data line 190 over which a reset pulse 405 was sent, (as described by the COUNTER variable,) the slave 126 will have received this reset pulse 405 and will respond by sending a presence pulse 406 along the data line 190. The microcontroller 138 samples the data line after sending each reset pulse 405, as just stated, in order to detect this presence pulse 406. This presence pulse 406 is a signal that consists of driving the data line 190 logic low 400 for a period between 15 and 60 microseconds, then releasing it to the high 402 state. The presence pulse 406 is represented diagrammatically in FIG. 161.

If the microcontroller 138 does not detect a logic high 402 state during this 100 us sampling window, it will first check the COUNTER variable to see if all of the 16 possible sockets 124 have been checked for the presence of a slave transceiver 126. If COUNTER is equal to 15, all sockets 124 have been checked. If COUNTER is equal to 15, the microcontroller will clear COUNTER to zero, pulse the reset line 188, then begin checking the sockets 124 again in order. If COUNTER is not equal to 15, the microcontroller will increment the COUNTER variable by 1, pulse the count line 186, check the 10s timer again, and if this timer has not yet expired, send a reset pulse 405 to the next socket 124 and wait for a response. This sequence of resetting/incrementing COUNTER and the 4 bit counter IC 142, and checking for a presence pulse 406 from a slave transceiver 126 in each socket 124 continues endlessly until either a presence pulse 406 is received, or power is removed from the master transceiver/disabling entity circuit 114.

Even if a slave transceiver 126 is inserted into a socket 124 which is not presently connected to the data line 190, it will quickly be recognized. If a slave transceiver 126 is left in the same socket 124 for at most 10 milliseconds, (0.010s,) which is approximately the time the required for the microcontroller 138 to check all 16 possible sockets 124, (as earlier stated, only 10 sockets actually are used in this embodiment,) it will eventually be recognized by the master transceiver 114.

Upon first receiving a presence pulse 406 from a slave transceiver 126, after the 10s timer has expired or after power has been reconnected, the microcontroller 138 turns on the background LED's 154 to make the numbers 156 on the keyhole pad circuit board 120 easier to see. The microcontroller 138 also lights the yellow indicator LED 168 upon receipt of this and all subsequent presence pulses 406 to inform the operator that the slave transceiver 126 has been recognized, is being accessed, and should not yet be removed. To make the yellow LED 168 more apparent, the red indicator LED 164 will shut off until the yellow indicator LED 168 goes out. Upon receiving a presence pulse 406, the microcontroller will reset the 10s timer. Also upon receiving a presence pulse 406, the microcontroller 138 increments the STROKES variable then stores the present value of the COUNTER variable in a variable called STROKE1, STROKE2, STROKE3, OR STROKE4, depending upon the present value of STROKES immediately after it has been incremented. STROKE1 is therefore descriptive of the number of the socket 124 into which the slave transceiver 126 was first inserted; STROKE2 of the second socket 124 used; STROKE3 of the third socket 124 used; STROKE4 of the fourth socket 124 used.

Storing COUNTER in STROKE1, 2, or 3 completes the first three of any four consecutive transactions between master transceiver 114 and slave transceiver 126.

A delay loop of approximately 250 milliseconds will be executed by the master transceiver 114 before it turns off the yellow indicator LED 168 and turns back on the red indicator LED 164 after each of these first three transactions. If not for this delay, the yellow LED 168 would flash on, and red LED 164 would flash off so quickly during these three transactions that neither flash would be visible to the operator. Also, because the data transaction between the master transceiver 114, (microcontroller 138) and slave transceiver 126 will take substantially longer upon the fourth insertion of the slave transceiver 126 into a socket 124, this 250ms delay serves as a reference as to how long the user must always hold the slave transceiver 126 into a socket 124. Once the yellow LED 168 goes out, and the red LED 164 lights, the operator may remove the salve transceiver 126 from the socket 124. Due to this delay, in the eyes of the operator, each of these first three data transactions with the slave transceiver 126 will take about ¼ of a second. The fourth data transaction, (upon the fourth insertion,) shall include delays to ensure that it takes approximately 250ms also.

Alternatively, the yellow 168 LED, and therefore the vehicle owner's slave 126 insertion habits may be controlled in the following manner. A real time clock counter, (RTCC,) register onboard the microcontroller 138 may be reset, and the yellow 168 LED lit, each time the microcontroller 138 receives a presence pulse. Regardless of what sort of data transaction ensues between microcontroller 138 and slave transceiver 126 as a result of this insertion, the yellow 168 LED shall remain lit until this RTCC counts 250ms. Note that the RTCC register continues to run without specifically being incremented, so it will accurately keep track of elapsed time no matter what commands are being executed, (except of course if this register is reset.) By using this method of timing the Yellow 168 LED, each data transactions with the slave 126 will appear to take exactly the same time, no matter what this transaction really entails.

After it turns off the yellow LED 168, and relights the red LED 164, the microcontroller will check to see that the slave transceiver 126 has been removed from the socket 124 it was just recognized in. The microcontroller will do so by continually sending reset pulses 405 along the data line 190 and checking for a presence pulse 406 after each reset pulse 405 until it no presence pulse 406 is received from a slave for a period of about ¹/₁₀ of a second or 16 attempts. (16 * 600us=0.0096s.)

Once the slave has been removed for this ¹/₁₀ second, and until the 10s timer runs out, the background LED's 154 will remain lit and the microcontroller will return to searching for a presence pulse 406 indicating a new insertion.

If before the 10 second timer expires after being reset during the first insertion if a slave transceiver 126 into a socket 124, a slave transceiver 126 is inserted into a socket 124 a second time, be it the same socket 124 or a different socket 124, the microcontroller will recognize this as the second insertion (STROKE will be incremented to 2,) and the value of COUNTER will be therefore be stored in STROKE2. Once again, as occurred during the first insertion, the yellow LED 168 will light for 250ms while the red LED will shut off for this same period of time, indicating how long the slave 126 must be held in the socket 124. After the red LED 164 lights, the operator then has a fresh 10 second delay during which to remove the slave transceiver 126 and insert it a third time.

If, within 10 seconds of 10 second timer being reset during the second insertion of a slave transceiver 126 into a socket 124, the operator inserts a slave transceiver 126 into a socket 124 a third time, the microcontroller 138 will recognize this as the third insertion, (STROKE will be incremented to 3. The microcontroller 138 will light and turn off the same sequence of LED's then reset the 10 second timer after storing the present value of the COUNTER variable in STROKE3, descriptive of the third socket 124 used.

If before the 10 second timer expires after being reset during the third insertion if a slave transceiver 126 into a socket 124, the operator removes the salve transceiver 126 and inserts it into a socket 124 a fourth time, a different transaction between master 114 and slave 126 occurs and a different sequence of LED's light and turn off depending upon the result of that transaction. Just as during the first three transactions, the microcontroller lights the yellow LED 168 and turns off the red LED 164 as soon as it recognizes a presence pulse 406. Next, the microcontroller resets the 10s timer then stores the present value of the COUNTER in STROKE4, descriptive of the fourth socket 124 used. The fourth variables STROKE1, STROKE2, STROKE3, and STROKE4 now represent a 4 digit hexadecimal manually entered code stored in 2 bytes of memory, (each hexadecimal digit, or each stroke, being represented by 4 bits, ½ byte, or 1 nibble.) Henceforth, any sequence of four insertions of the slave 126 into sockets 124 of the keyhole pad circuit 136 shall be referred to as a manually entered code.

Only after 4 consecutive insertions of the slave transceiver 126 into the keyhole pad 136 will the microcontroller 138 take any further action to either verify the manually entered code or read the information stored in the slave transceiver 126. By verifying blocks of 4 insertions, or a complete manually entered code, instead of each insertion individually, (analogous to one digit of the manually entered code,) "hacking out" a valid manually entered code will be made more difficult. If a hacker found out immediately after entering each digit of a manually entered code whether this digit was correct or wrong, he or she would have to make a maximum of only 40 inserts to discover a valid 4 digit manually entered code. By verifying the entire manually entered code only after the fourth digit has been entered, a maximum of 10,000 insertions must be made in order to discover a valid 4 digit manually entered code.

Only after four consecutive insertions of the slave transceiver 126 have been made, without the 10s timer running out between insertions, the microcontroller 138 will read the data contained in the ROM of the slave transceiver 126. Reading this ROM data requires a system for transacting data between master transceiver 114 and slave transceiver 126. In order to understand the security benefits of and the actual operation of the higher level functions of the program of the microcontroller 138, it is useful to understand this basic data transactions scheme used in the preferred embodiment of this invention.

Transaction of data between the master 114 and slave 126 transceivers requires a using scheme for encoding digital ones and zeros and sending them serially along the single data line 190. The preferred embodiments of this invention described herein transact data in a manner well known in the art, which is summarized infra for clarity. Note that the master transceiver 114 comprises the microcontroller 138.

Figure 162:
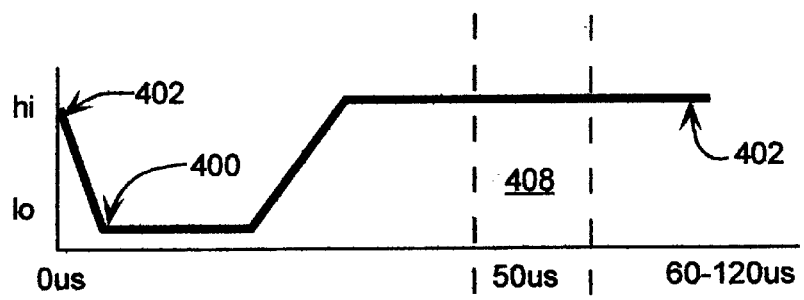
FIG. 162 is a representation of the wave form of a digital one signal being sent by the master transceiver portion of the preferred embodiment of this invention to the slave transceiver portion of the preferred embodiment of this invention.
Figure 163:
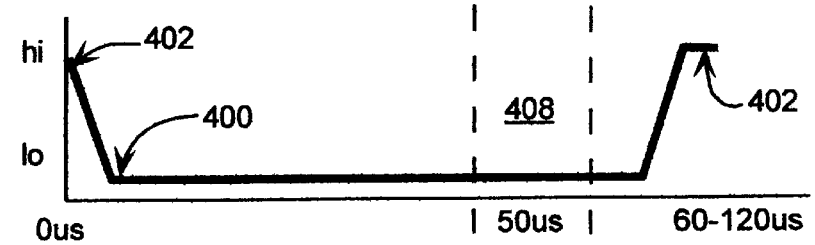
FIG. 163 is a representation of the wave form of a digital zero signal being sent by the master transceiver portion of the preferred embodiment of this invention to the slave transceiver portion of the preferred embodiment of this invention.
Figure 164:
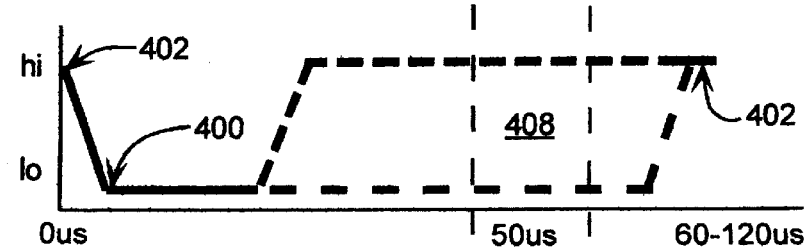
FIG. 164 is a representation of the wave form of the master transceiver portion of the preferred embodiment of this invention reading a bit of digital data from the slave transceiver portion of the preferred embodiment of this invention.
Figure 165:
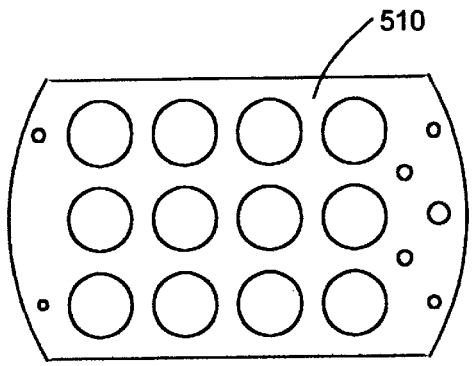
FIG. 165 is a front view of the front cover of the keypad actuated remote transmitter portion of an alternative embodiment of this invention.
Figure 166:
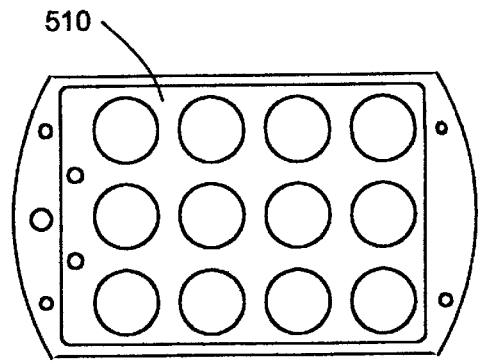
FIG. 166 is a rear view of the apparatus shown in FIG. 165.
Figure 167:
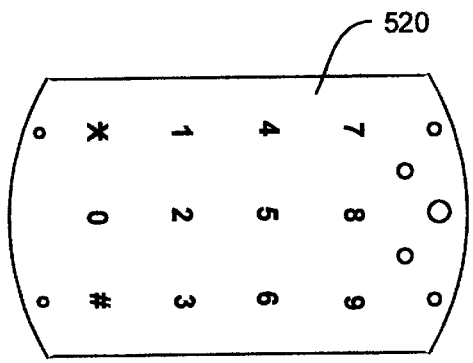
FIG. 167 is a front view of the printed membrane overlay for the keypad actuated remote transmitter portion of an alternative embodiment of this invention.
Figure 168:
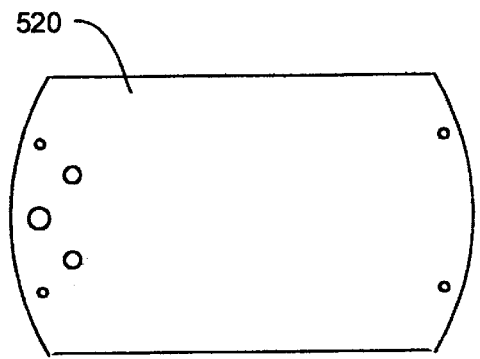
FIG. 168 is a rear view of the apparatus shown in FIG. 167.
Figure 169:
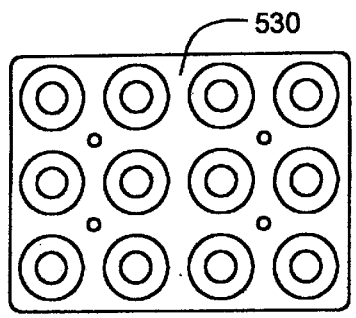
FIG. 169 is a front view of the silicone push-button pad part of the keypad actuated remote transmitter portion of an alternative embodiment of this invention.
Figure 170:
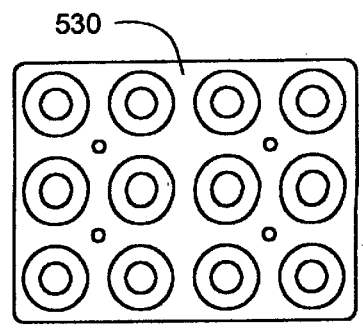
FIG. 170 is a rear view of the apparatus shown in FIG. 169.
Figure 171:
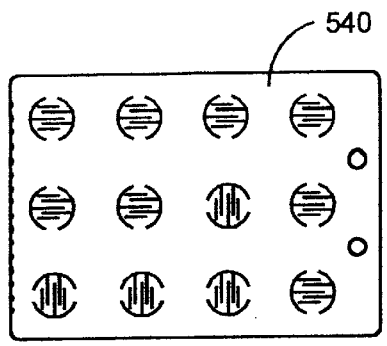
FIG. 171 is a front view of the first circuit board part of the keypad actuated remote transmitter portion of an alternative embodiment of this invention.
Figure 172:
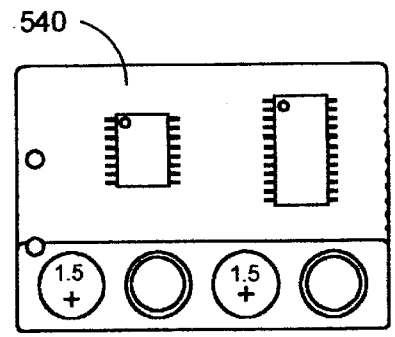
FIG. 172 is a rear view of the apparatus shown in FIG. 171.
Figure 173:
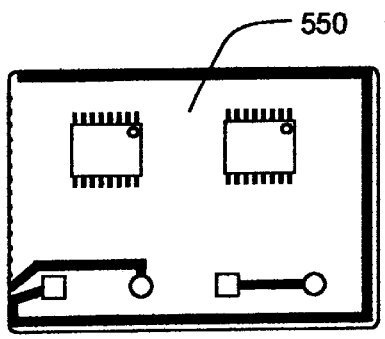
FIG. 173 is a front view of the second circuit board part of the keypad actuated remote transmitter portion of an alternative embodiment of this invention.
Figure 174:
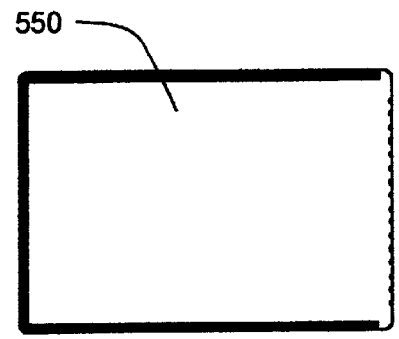
FIG. 174 is a rear view of the apparatus shown in FIG. 173.
Figure 175:
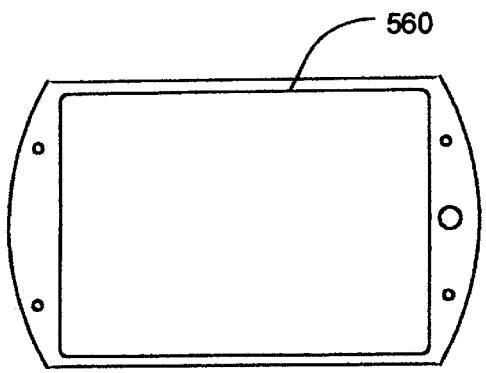
FIG. 175 is a front view of the rear cover for the keypad actuated remote transmitter portion of an alternative embodiment of this invention.
Figure 176:
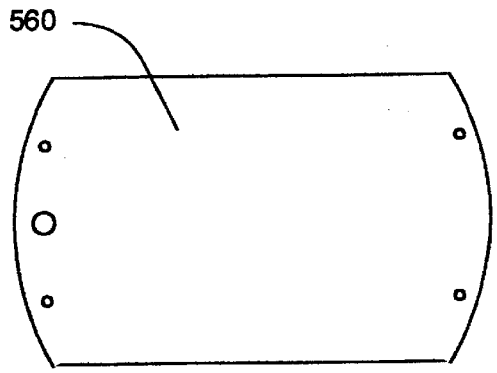
FIG. 176 is a rear view of the apparatus shown in FIG. 175.

For each bit to be read from or written to the slave 126 by the master 114, the master 114 sets the beginning and end of a time slot 410 lasting between 60 and 120 microseconds. The slave 126 always awaits the beginning of a time slot 410 before sending or reading a bit of data. The master 114 begins each time slot 410 by driving the data line 180 from its resting 404 state of logic high 402 to logic low 400 for about 2 microseconds. One time slot 410 ends when the next begins—when the next low pulse begins. The master 114 generates three different time slots 410: a write one time slot, a write zero time slot, and a read time slot. Each of these three time slots has a different wave form. These wave forms are shown in FIGS. 162–164.

If data is to be sent to the slave 126 by the master 114, the master generates a sequence of write zero and write one time slots corresponding to the this data. If the slave 126 has previously been conditioned to accept data, during each write zero or write one time slot 410, the slave 126 samples the sate of the data line 190 during a sampling window 408, and appropriately registers either a digital zero or one. The slave is conditioned to receive data under several circumstances. For example, immediately after the salve 126 transmits its presence pulse 406, the slave 126 waits to receive a command from the master 114, and therefore is conditioned to receive data. Therefore, if after receiving a presence pulse 406, the master 114 sends a digitally encoded command, the slave 126 will read it.

If data is to be read from the slave 126, by the master 114, the master 114 generates a series of read time slots, and samples the state of the data line 190 during a sampling window 408 in each time slot 410. If the slave 126 has been conditioned to send data, the slave will drive the data line high 402 or low 400 during this sampling window to send either a digital zero or digital one. The slave 126 is conditioned to send data in response to receiving, from the master 114, a command to do so.

By sending one of several different serially digitally encoded commands to the slave 126, such as READ ROM, READ SUBKEY 0, READ SUBKEY 1, and READ SUBKEY 2, the master 114 signals the slave 126 to perform one of several different sequences of tasks. To complete these tasks, the slave 126 may send and/or receive data, and/or transfer data from one partition of its memory to another; therefore requiring the master 114 to generate read time slots 410, and/or write zero time slots 410 and/or write one/time slots 410 to allow the slave 126 to complete these tasks.

All data and commands are transacted by both the master 114 and slave 126 in the form of a sequence of digital bits sent and received serially along the single data line 190. 8-bit bytes are constructed from these digital bits by both the master 114 and slave 126.

In the case of the master 114 writing a digital one bit to the slave 126, the master 114 returns the data line 180 to the logic high 402 state immediately after the 2 microsecond pulse and leaves it high 402 for the reset of the time slot 410. Between 15 and 60 microseconds after the beginning of the time slot 410, during a sampling window 408, the slave 126 samples the data line 180—if it is logic high 402, the slave 126 registers a digital one.

In the case of the master 114 writing a digital zero bit to the slave 126, the master 114 drives the data line 180 low 400 for all but the last several microseconds of the time slot 410. For a period 854 of between 15 and 60 microseconds after the beginning of the time slot 410, during a sampling window 308, the slave 126 samples the data line 180—if it is logic low 400, the slave 126 registers a digital zero.

In the case of the master 114 reading a digital data bit from the slave 126, the master 114 releases the data line 180 to its resting 404 high 402 state after beginning the time slot 410 with a low 400 pulse. The master 114 then samples the data line 180 between 15–60 microseconds after the beginning of the time slot 410, during a sampling window 408. If during this sampling window 408, the slave 126 drives the data line 180 low 400, the master 114 registers a digital zero. If during this sampling window the slave 126 does not drive the data line 180 low 400, the master 114 registers a digital one.

Data is read from the ROM of the slave transceiver 126 as follows. By sending a READ ROM command to the slave 126, the master transceiver 114 prepares the slave 126 to send a 64 bit, (8 byte,) ROM code to the master 114, this ROM code being unique to that particular slave device 178 and unalterable. The ROM code of each slave 126 contains data descriptive of that device's serial number. After sending this READ ROM command, the master 114 then generates 64 read time slots 410, each of which induces the slave 126 to send one bit of its ROM code. During the sampling window 408 of each of these 64 read time slots 410, the master 114 reads one bit of the ROM code.

After reading all 64 bits of ROM data, the microcontroller compares the two least significant hexadecimal digits, (the least significant 8 bits, the least significant byte or LSB—as hereafter referred to,) of the serial number of this slave transceiver 126 with a particular entry in a table of 64 LSB's, this table being called SNTABLE. The particular entry in SNTABLE to be compared with the LSB read from the slave transceiver 126 shall be chosen by a variable called POINTER. POINTER shall contain the equivalent of a decimal number from 0 to 63 to corresponding to one of 64 different entries in the SNTABLE. POINTER shall be stored in non-volatile memory of the master transceiver circuit 114.

If the LSB of the serial number of the slave transceiver 126 used upon the fourth insertion does not match the SNTABLE entry referenced by the current value of POINTER, the microcontroller will search the rest of the SNTABLE for an entry that matches the LSB of that slave's serial number.

If no matching entry is found in SNTABLE, the microcontroller 138 will turn off all LED's, light the red LED 164, then execute a 10s delay during which no data may be transacted, after which the microcontroller 138 will resume its program.

If an entry in the SNTABLE is found which matches the LSB of the slave's serial number, the microcontroller 138 will store the number of this SNTABLE entry (0–63) in a temporary variable. Next, the microcontroller 138 will compare the manually entered code composed of STROKE1, STROKE2, STROKE3, and STROKE4, with the particular entry in a 64 member SELECT CODE TABLE referenced by the temporary variable, (the temporary variable now representative of the number of the matching SNTABLE entry.) Thus, for each particular entry in the SNTABLE, (numbered 0–63,) there is a corresponding entry in the SELECT CODE TABLE, (also numbered 0–63.) Each entry in the SELECT CODE TABLE represents a 4 digit hexadecimal code, and is 2 bytes long, (each hexadecimal digit being represented by 4 binary bits or ½ byte or 1 nibble.) If and only if the manually entered code matches this SELECT CODE TABLE entry indicated by the temporary variable, the microcontroller will store the temporary variable in POINTER, then the microcontroller will restart its program and allow this new slave transceiver 126 to be used in further data transactions.

If the manually entered code does not match the SELECT CODE TABLE entry referenced by the temporary variable, the microcontroller 138 will turn off all LED's, turn on the red LED 164, then executes a 10s delay before resuming its normal operation. Therefore, if the LSB of the serial number of a slave transceiver 126 is not identical to the SNTABLE entry currently referenced by POINTER, even if these digits are found as another entry in the SNTABLE, their presence as an entry in the SNTABLE does not in an of itself allow that device to be used in further data transactions. This new device must also be used to enter a proper 4 digit manually entered code which exactly matches the particular SELECT CODE TABLE entry referenced by the number of the entry in the SNTABLE that matches the LSB of the serial number of that slave device 126. To use a new slave device 126, (one with a different serial number LSB,) that new slave device 126 must first be used to enter a manually entered code which matches the proper SELECT CODE TABLE entry, hereafter referred to as a select code.

If and only if the two least significant digits of the serial number of the slave 126 used to enter a manually entered code match the SNTABLE entry currently referenced by POINTER, the master transceiver 126 will perform the following operations.

If the disabling entity 130 is currently on, (relay 130 is off, vehicle may not be started,) the microcontroller will compare the manually entered code against a the particular entry, also referenced by POINTER, in the Owner Code table. The Owner Code table is a table of 64 different four digit hexadecimal Owner Codes, each code being 2 bytes long, (each hexadecimal digit being represented by 4 binary bits, ½ byte, or 1 nibble.) If the manually entered code does not match the particular entry in the Owner Code table referenced by POINTER, the microcontroller will check the status of several 1 bit flags, Valet Mode, Service Mode A, and Service Mode B, these flags indicating whether or not Valet Mode or Service Mode A or Service Mode B have been previously invoked. If none of these flags is set to one, (all equal zero,) the microcontroller 138 turns off all LED's, lights the red LED 164, then executes a 10 second delay during which no data may be transacted, then the microcontroller 138 resumes its program.

If the manually entered code does match the entry in the Owner Code table referenced by POINTER, the microcontroller 138 will clear to zero the Valet Mode, Service Mode A, and Service Mode B flags, and will set to one the Owner Mode flag thereby indicating that the Owner Code has been used to reach this point in the program. Because the microcontroller clears to zero the Valet Mode, Service Mode A, B flags upon entry of a valid Owner Code, each time the vehicle owner enters his or her Owner Code, he or she disables the Valet Mode and Service Mode functions of this invention. This feature allows the owner to revoke, as soon as the vehicle is returned, the timed temporary driving privileges that Valet and Service mode allow. After resetting and setting the appropriate flags as just stated, the master transceiver 114 will then attempt to read the data from the three password secured memory partitions of the slave transceiver 126 as described infra.

If the manually entered code does not match the Owner Code table entry referenced by POINTER, and Valet Mode is set to one, the microcontroller 138 will check to see if the manually entered code matches the selected Valet Code by performing the following operations.

First, the microcontroller 138 shall compare the manually entered code with a Valet Code that is stored in non-volatile memory of the master transceiver 114. If the manually entered code does not match the Valet Code, the microcontroller 138 shall turn off all LED's, light the red LED 164, then execute a 10 second delay during which no data may be transacted, then the microcontroller 138 shall resume its normal program. If the manually entered code matches the stored Valet Code, the microcontroller 138 checks the value of a VALET USES variable which represents the number of times a Valet Code has been entered, and checks the value of a non-volatile timer, (hereafter referred to as NV timer.)

VALET USES is set to three each time a new Valet Code is selected, and is decremented by one each time a manually entered code is entered that matches the stored Valet Code. The NV timer is reset each time a new Valet Code is selected, and Each time a new Service Code is selected.

If VALET USES is not equal to zero, the microcontroller 138 decrements VALET USES. If VALET USES is equal to zero or if 12 hours have elapsed since the Valet Code was selected, (since the NV timer was reset,) the microcontroller 138 shall turn off all LED's, light the red LED 164, then execute a 10 second delay during which no data may be transacted, then the microcontroller 138 resumes its program.

If the Valet Code has not yet been used 3 times, and if 12 hours have not elapsed since the Valet Code was selected, the microcontroller 138 clears to zero the Owner Mode flag thereby indicating that the Owner Code was not entered in order to progress to this stage of the program. After clearing the Owner Mode flag, the microcontroller 138 will attempt to read the data contained in the three password secured partitions of the memory of the slave transceiver 126 as described infra.

If the manually entered code not match the Owner Code table entry referenced by POINTER, Valet Mode equals zero, Service Mode B equals zero, and Service Mode A equals one, the microcontroller 138 will perform the following operations.

First, the microcontroller 138 shall compare the manually entered code with a Service Code A that is stored in non-volatile memory of the master transceiver 114. If the manually entered code does not match Service Code A, the microcontroller 138 turns off all LED's, lights the red LED 164, then executes a 10 second delay during which no data may be transacted, then the microcontroller 138 resumes its program.

If the manually entered code matches the stored Service Code A, the microcontroller 138 checks that the Service Code A was not selected more than 12 days prior to this entry, by checking the value of the NV timer, (which is reset each time a new Service Code is selected.) If 12 days, have elapsed since the Service Code was selected, the microcontroller 138 shall turn off all LED's, light the red LED 164, then execute a 10 second delay during which no data may be transacted, then the microcontroller 138 will resume execution of its program.

If the Service Code A has not expired, the microcontroller shall set to one the Service Mode B flag which conditions the microcontroller to verify the next manually entered code it receives against Service Code B. After setting Service Code B, the microcontroller 138 turns off the yellow led 168, resets the 10s timer, clears to zero the STROKES variable, then awaits additional insertions of the slave 126 into the keyhole pad circuit 136 as described above.

If a second manually entered code is entered, with the same slave transceiver 126, (bearing the same serial number LSB in its ROM,) this second manually entered code shall be verified by the microcontroller 138 as described in the immediately following paragraph.

If the manually entered code does not match the Owner Code table entry referenced by POINTER, Valet Mode equals zero, and Service Mode B equals one, the microcontroller 138 will perform the following operations. First, the microcontroller 138 shall check the manually entered code against a Service Code B variable that is stored in nonvolatile memory of the master transceiver 114.

If the manually entered code does not match the stored Service Code B, the microcontroller 138 will turn off all LED's, light the red LED 164, then execute a 10 second delay during which no data may be transacted, then the microcontroller 138 will resume execution of its program.

If the manually entered code matches Service Code B, the microcontroller will clear the Service Mode B flag to zero, and also clear to zero the Owner Mode flag to indicate that the Owner Code was not entered in order to progress to this stage of the program. After clearing these flags, the microcontroller 138 will attempt to read the data contained in the three password secured partitions of the memory of the slave transceiver 126 as described infra.

In order to attempt to read the data contained in the three password secured memory partitions of the slave transceiver 126, the master transceiver 114 must perform the following operations.

First, the master transceiver 114 will attempt to read the contents of the password secured data partition called Subkey0. To accomplish this, the master 114 must first send a Read Subkey0 command to the slave 126. Upon receiving a Read Subkey0 command, the slave 126 responds by sending to the master 114 the 8 byte long Identifier, (ID,) of Subkey0. If the ID of Subkey0 received from the slave 126 matches the ID of Subkey0 stored in nonvolatile memory of the master transceiver 114, the master transceiver 114 will then send to the slave 126 the 8 byte long password for Subkey0. Upon receiving this password from the master 114, the slave 126 verifies it's validity against the Password field of Subkey0. If correct, the slave 126 will send to the master 114 the 48 secured bytes of data stored in Subkey0. If incorrect, the slave 126 will send to the master 114 48 random bytes of data.

Upon receiving either the actual 48 bytes of data stored in Subkey 0 or 48 bytes of bogus random data from the slave 126, the microcontroller 138 shall compare this data with a 48 byte Enable0 password stored in nonvolatile memory of the microcontroller 138. If the 48 bytes received from the slave 126 do not exactly match this Enable0 password, the microcontroller 138 shall turn off all LED's, light the red LED 164, then execute a 10 second delay during which no data may be transacted, then the microcontroller 138 will resume execution of its program.

If the 48 bytes received from the slave 126 exactly match this Enable0 password, the microcontroller 138 will attempt to read the data stored in the second password secured partition of the memory of the slave transceiver 126 as follows, this partition being designated Subkey1.

After successfully reading Subkey 0, and receiving data matching Enable0, the master transceiver 114 will attempt to read the contents of the password secured data partition called Subkey1. To accomplish this, the master 114 must first send a Read Subkey1 command to the slave 126. Upon receiving a Read Subkey1 command, the slave 126 responds by sending to the master 114 the 8 byte long Identifier, (ID,) of Subkey1. If the ID of Subkey1 received from the slave 126 matches the ID of Subkey 1 stored in nonvolatile memory of the master transceiver 114, the master transceiver 114 will then send to the slave 126 the 8 byte long password for Subkey1. Upon receiving this password from the master 114, the slave 126 verifies its validity against the Password field of Subkey0. If correct, the slave 126 will send to the master 114 the 48 secured bytes of data stored in Subkey1. If incorrect, the slave 126 will send to the master 114 48 random bytes of data.

Upon receiving either the actual 48 bytes of data stored in Subkey 1 or 48 bytes of bogus random data from the slave 126, the microcontroller 138 shall compare this data with a 48 byte Enable1 password stored in nonvolatile memory of the microcontroller 138. If the 48 bytes received from the slave 126 do not exactly match this Enable1 password, the microcontroller 138 shall turn off all LED's, light the red LED 164, then execute a 10 second delay during which no data may be transacted, then the microcontroller 138 will resume execution of its program.

If the 48 bytes received from the slave 126 exactly match this Enable1 password, the microcontroller 138 will attempt to read the data stored in the third password secured partition of the memory of the slave transceiver 126 as follows, this partition being designated Subkey2.

After successfully reading Subkey 1 and receiving data matching Enable1, the master transceiver 114 will attempt to read the contents of the password secured data partition called Subkey2. To accomplish this, the master 114 must first send a Read Subkey2 command to the slave 126. Upon receiving a Read Subkey2 command, the slave 126 responds by sending to the master 114 the 8 byte long Identifier, (ID,) of Subkey2. If the ID of Subkey2 received from the slave 126 matches the ID of Subkey2 stored in nonvolatile memory of the master transceiver 114, the master transceiver 114 will then send to the slave 126 the 8 byte long password for Subkey2. Upon receiving this password from the master 114, the slave 126 verifies it's validity against the Password field of Subkey2. If correct, the slave 126 will send to the master 114 the 48 secured bytes of data stored in Subkey2. If incorrect, the slave 126 will send to the master 114 48 random bytes of data.

Upon receiving either the actual 48 bytes of data stored in Subkey2 or 48 bytes of bogus random data from the slave 126, the microcontroller 138 shall compare this data with a 48 byte Enable2 password stored in nonvolatile memory of the microcontroller 138. If the 48 bytes received from the slave 126 do not exactly match this Enable2 password, the microcontroller 138 shall turn off all LED's, light the red LED 164, then execute a 10 second delay during which no data may be transacted, then the microcontroller 138 will resume execution of its program.

If the 48 bytes received from the slave 126 exactly match this Enable1 password, the microcontroller 138 will turn off the yellow LED 168, light the green LED 166, then deactivate the disabling entity 130, (turn on the relay 130), thereby allowing the vehicle to be started.

Once the microcontroller 138 deactivates the disabling entity 130, it 138 will again wait for the slave 126 to be removed, as earlier described, then resume its normal program by clearing STROKES to zero, and searching for a new insertion of the slave 126 into a socket 124 of the keyhole pad circuit 136.

After the disabling entity 130 has been defeated, just as during any other phase of the execution of the microcontroller's program, if 10 seconds elapse without the slave transceiver 126 being inserted into a socket 124, (which resets the 10s timer,) the microcontroller 138 will turn off all LED's except the red LED 164, reactivate the disabling entity 130, (turn off the relay 130,) clear the Owner Mode flag to zero, and clear any manually entered code in memory by clearing the STROKES variable to zero. Under no circumstances may the disabling entity 130 remain deactivated for more than 10 seconds after a slave device 126 was last removed from a socket 124 the keyhole pad 136.

Each time the slave 126 is inserted into a socket 124 after the microcontroller 138 initially deactivates the disabling entity 130, a fresh 10 second delay begins during which the vehicle may still be started, (the 10s timer is reset.)

As long as the disabling entity 130 remains deactivated, (indicated by the green LED 164 and background LED's 154 remaining lit,) inserting the slave 126 into each four additional sockets 124 completes a new manually entered code. After each new manually entered code is entered, the microcontroller 138 shall, as described above, verify that the two least significant digits of the slave 126 match the SN TABLE entry currently referenced by POINTER. If the LSB of the serial number of the slave 126 is okay, the microcontroller 138 shall determine if an Owner Code was used to deactivate the disabling entity 130. If the aforementioned Owner Mode flag is equal to 1, an Owner Code was used. A new Valet Code or new Service Code B may not be selected after using a Valet Code or Service Code B to deactivate the disabling entity 130. If Owner Mode is not equal to 1, the microcontroller 138 will turn off the yellow 166 LED, reset the 10 second timer, wait for the slave 126 to be removed, then resume its program by clearing the STROKES variable.

If Owner Mode is equal to 1, the microcontroller 138 will perform the following operations.

If Service Mode A is equal to 1, the microcontroller 138 will turn off the yellow 166 LED, reset the 10 second timer, wait for the slave to be removed, then resume its program by clearing the STROKES variable.

If Service Mode A is equal to zero and Valet Mode is equal to zero, the microcontroller 138 will store the new manually entered code in non-volatile memory of the master transceiver 114 as the selected Valet Code. The microcontroller 138 will also set to one the Valet Mode flag, and set to 3 the VALET USES variable, and reset a non-volatile timer which will record the time elapsed since the Valet Code was selected. Once the microcontroller completes these operations, it will light both the red 166 and green 164 LED's, turn off the yellow 168 LED, reset the 10s timer, wait for the slave 126 to be removed, then continue its program by clearing to zero the STROKES variable.

If Service Mode A is equal to zero and Valet Mode is equal to one, the microcontroller 138 will store the just selected Valet Code as Service Code A, then store the new manually entered code as Service Code B, both in non-volatile memory. The microcontroller 138 will also set Service Mode A to one and reset a non-volatile timer which will record the time elapsed since the Service Code was selected. Once the microcontroller completes these operations, it will turn off the yellow 168 LED, reset the 10s timer, flash both the red 166 and green 164 LED's simultaneously and continuously, wait for the slave 126 to be removed, then continue its program by clearing to zero the STROKES variable.

After selecting a Service Code as just described, any further insertions of the slave 126 into a socket 124 of the keyhole pad 138 will only service to reset the 10 second timer—to extend the time during which the vehicle may be started.

Selecting a Valet Code has no bearing upon the validity of any Owner Code.

Selecting a Service Code invalidates a previously selected Valet Code.

Entering a valid Owner Code always invalidates any previously selected Valet Code or Service Code.

Because the preferred embodiment of this invention always requires that a slave device 126 bearing a particular, unalterable serial number LSB be used to enter an Owner, Valet, or Service Code, and because these slave devices 126 can not be purchased with a requested serial number, the preferred embodiment of this invention offers a higher level of security than either anti-theft systems using transmitters which may be hard wired by a thief to transmit a particular code, or mechanical locks for which properly fitting blank keys may be readily obtained.

Because the preferred embodiment of this invention allows the microcontroller to be conditioned, by the vehicle owner, not to accept a lost or stolen slave device 126 or inadvertently revealed Owner Code, and to accept only a new slave device 126 and Owner Code, without physically changing any component of the master transceiver/disabling entity circuit 114, the preferred embodiment of this invention is superior to the following prior art: anti-theft systems that can not be conditioned to reject the signal of a lost or stolen transmitter, those that can not be conditioned to accept the signal of a new transmitter, those that can only be conditioned to accept the signal of a new transmitter by physical modification of or replacement of a component of that system, and mechanical locks which must be re-keyed in order to accept a new key and reject an old key, and any anti-theft device which must be conditioned by a professional to accept a new code, key, or transmitter, as opposed to being conditioned to do so by the vehicle owner.

Because the preferred embodiment of this invention limits the length of time during which a Service Code may be entered in order to enable starting a vehicle, a vehicle owner has the capability of loaning his or her vehicle for an extended period of time, or having a lengthy service procedure performed upon this vehicle, without revealing a code which may always be used to enable starting the vehicle. Furthermore, since entering a valid Owner Code immediately invalidates any selected Service Code, as soon as the vehicle is returned to its owner, the party the vehicle has been loaned to or service by may no longer use the Service Code revealed to them. Furthermore, since a different Service Code may be selected by the owner each time this feature is invoked, the vehicle owner has the choice of making life easier or more difficult for his or her mechanic or frequent borrowers of their vehicle.

Because the preferred embodiment of this invention limits both the number of times and the length of time during which any selected Valet Code may be entered in order to enable starting of a vehicle, a vehicle owner has the capability of enforcing short term authorization to drive their vehicle, such as is necessary during valet parking.

Because the preferred embodiment of this invention always requires that a code by entered to start the vehicle, even while the system is in Valet or Service Mode, it is superior to prior art vehicle anti-theft systems which must be disabled if the vehicle is to be driven by someone other than the vehicle owner or if the vehicle is to be serviced. Always requiring that a code by entered in order to start the vehicle protects the vehicle from being stolen while it is in the custody of someone other than the owner, as long as the persons authorized by the owner keep their Valet or Service code in confidence.

Because the preferred embodiment of this invention allows only one slave transceiver 126 to be used with the master transceiver 114 at a time, and because it requires that a Select Code be entered to configure the master transceiver 114 to accept a new slave transceiver 126, in the event that the owner of a vehicle loses his or her original slave transceiver 126, he or she may configure the system to recognize only a new slave transceiver. With the preferred embodiment of this invention, even if a thief possesses the original slave transceiver 126 and knows its corresponding Owner Code, entering the original Owner Code with the original slave device 126 will no longer allow the thief to start the vehicle. In order to use the original slave 126 and original Owner Code again, the thief would have to know the Select Code corresponding to that original slave 126, which even the vehicle owner will not know. This feature makes the preferred embodiment of this invention superior to prior art vehicle anti-theft devices which may be easily defeated with a lost or stolen transmitter or key.

An first alternative embodiment of this invention may be constructed, and installed, and shall operate as follows. This first alternative embodiment shall comprise the preferred embodiment of the shared enclosure 108 portion of this invention, made of non-conductive, non-ferrous composite material, which shall armor the starter system 2 of a vehicle, a disabling entity 130 which disables the starter system 2, as well as a receiver circuit which deactivates this disabling entity 130 in response to receiving a signal transmitted by a transmitter remote to the shared enclosure 108.

The disabling entity 130 of this first alternative embodiment of this invention shall be deactivated by a receiver circuit located within the shared enclosure 108. This receiver circuit shall comprise a microcontroller similar to that used in the master transceiver 114 portion of the preferred embodiment of this invention. This receiver circuit shall receive radio frequency signals via an antenna which shall be located within the shared enclosure 108. Locating the antenna for the receiver circuit inside the shared enclosure 108 will prevent it from being tampered with or removed. This receiver circuit shall receive a modulated signal comprising a complex digital code component, this signal being sent by wireless means from a keypad 530 actuated remote transmitter 500. When the receiver circuit receives such a signal it shall separate and verify the complex digital code component of that signal. If this received signal contains the proper variation of said complex digital code, the receiver circuit shall, just as the master transceiver 114 of the preferred embodiment of this invention does upon receipt of the proper data, deactivate the disabling entity 130 for a period of 10 seconds. If the received signal does not comprise the proper variation of said complex digital code, the receiver circuit shall, just as the master transceiver 114 does in response to any impropriety, execute a 10 second delay during which no data transaction may occur.

The keypad 530 actuated remote transmitter 500 shall comprise a front cover 510, keypad overlay 520, keypad 530, first circuit board 540, second circuit board 550, and rear cover 560. These components as well as the completed keypad 530 actuated remote transmitter 500 are shown in FIGS. 165–180. This keypad actuated remote transmitter shall be battery powered, portable, and about the size of an ordinary keychain fob. This keypad 530 actuated remote transmitter 500 shall further comprise a microcontroller such as that used in the preferred master transceiver 114 portion of this invention. This microcontroller shall control all aspects of the operation of this transmitter 500, as well as generate the digital code with which the radio frequency signal it 500 transmits is modulated. This keypad actuated remote transmitter 500 shall further comprise two LED's which shall indicate its status.

This keypad actuated remote transmitter 500 shall, only in response to a proper 4 digit manual code being entered on its keypad 530, transmit a radio frequency signal modulated with the proper variation of said complex digital code that the receiver requires in order to deactivate the disabling entity 130. This keypad actuated remote transmitter 500 shall, in response to an improper 4 digit manual code being entered on its keypad 530, transmit a radio frequency signal modulated with an improper variation of said complex digital code.

The special fastener 218 portion of this invention shall be used to install the immediately aforementioned first alternative embodiment of this invention as well as the second and third alternative embodiments described infra.

The first alternative embodiment of this invention, as compared to the preferred embodiment of this invention, offers the following benefits, and suffers from the following detriments.

BENEFITS:

Because the transmitter portion of this first alternative embodiment of this invention transmits a signal comprising the proper variation of said complex digital code only in response to the proper manual code being entered, an unauthorized user can not activate the transmitter for the purpose of either recording its signal for later transmission, or for the purpose of immediately using it to deactivate the disabling entity in order to enable starting the vehicle.

Furthermore, since the transmitter transmits a decoy signal containing an improper variation of the complex digital code in response to an improper manual code being entered, "hacking out" the proper manual code is made impossible if this process is attempted while not in the presence of the receiver.

Also, just as with the preferred embodiment of this invention, "hacking out" the proper manual code is made painfully slow by verifying each attempt only after it has been completely entered, and imposing a 10 second delay after each unsuccessful attempt.

Installation of such a wireless system into a vehicle would not require passing any wires into the passenger compartment of the vehicle.

DETRIMENTS:

Since this first alternative embodiment relies upon wireless means to deactivate the disabling entity 130, it compromises a degree of security when compared to the preferred embodiment of this invention—When the vehicle owner uses this radio frequency transmitter, a thief may use another receiver to capture and record the proper signal, then play this signal back later.

Furthermore, entering a manual code on a traditional keypad is a physical skill that is easier to master than using the slave transceiver 126 of the preferred embodiment of this invention to enter a code upon an array of sockets 124.

All differences aside, the disabling entity 130 and starter system 2 of this first alternative embodiment are still protected within the shared enclosure 108, and thus can not be tampered with.

A second alternative embodiment of this invention shall be identical to the immediately aforementioned first alternative embodiment of this invention except for the following differences, which can be easily implemented by changing the program of the microcontroller which control the transmitter 500 and receiver.

The keypad 530 actuated transmitter 500 portion of the second alternative embodiment shall modulate said signal with a different digital code, and transmit this modulated signal, response to each different key of its keypad 530 being depressed.

The receiver portion of the second alternative embodiment shall receive all variations of said signal transmitted by said decoder, and shall demodulate said different digital codes from each signal received, and shall store, in memory, the digital code component of each signal received. The receiver portion of the second alternative embodiment shall erase these digital code components from memory responsive to ten seconds elapsing between receipt of a signal and before receiving a subsequent signal. Upon storage of four digital codes, each code having been received within 10 seconds of the previous code, the receiver shall verify that these digital code components combine to match a code stored in non-volatile memory of the receiver.

If the four digital code components do not combine, in the order received, to exactly match the code stored in non-volatile memory, the receiver shall not receive any further signals for a period of ten seconds.

If and only if the four digital code components combine, in the order received, to exactly match the code stored in non-volatile memory, the receiver circuit shall, just as the master transceiver 114 of the preferred embodiment of this invention does upon receipt of the proper data, deactivate the disabling entity 130 for a period of 10 seconds.

A third alternative embodiment of this invention shall be identical to the immediately aforementioned second alternative embodiment of this invention except for the following differences.

The keypad 530 actuated remote transmitter 500 portion of the first and second alternative embodiments shall be replaced with a typical digitally encoded radio frequency transmitter made in a manner well known in the art. This prior art type transmitter shall transmit a radio frequency signal modulated with the proper digital code expected by the receiver in response to only a single button being depressed by the operator.

This simple prior art transmitter, which is similar to transmitters used in most prior art electronic anti-theft systems for vehicles, would be incredibly easy to use. But, using such a prior art transmitter eliminates the need to know any code in order to deactivate the disabling entity 130. This third alternative compromises a degree of security when compared to both the preferred and aforementioned first and second alternative embodiments of this invention. Nonetheless, although this alternative embodiment utilizes primitive prior art electronics, the primary benefit of this invention is retained in this third alternative embodiment: The disabling entity and starter system are both enclosed within a durable physical enclosure which prevents either from being tampered with or activated without receipt of a proper signal. This primary benefit of this invention can be utilized by the disabling entity and vehicle operation enabling means being both enclosed within a durable physical entity which prevents either from being tampered with or activated without receipt of a proper signal, can be applied, by the teachings of this invention to a worker having average skills in the automotive art, to a variety of enabling means comprising:

an electric motor, an electric cranking motor, an engine starter system including an electric cranking motor and an electrically actuated switch powering said electric cranking motor, an electrically actuated switch controlling a starter motor, an electrically powered fuel pump, an electrically powered switch controlling a fuel pump, an electrically controlled fuel injector, an electrically controlled valve controlling the flow of fuel, an electrically controlled valve controlling the flow of air, an electrically controlled fuel pressure regulator, an electrically controlled component of a carburetor, an electrically controlled valve controlling the flow of hydraulic fluid in the transition of a motor vehicle, an electrically controlled valve controlling the flow of hydraulic fluid in the torque converter of a motor vehicle, an electrically controlled valve controlling the flow of hydraulic fluid in the clutch system of a motor vehicle, an electrically controlled valve controlling the flow of hydraulic fluid in the braking system of a motor vehicle, an electrical circuit providing control signals to other electrical components of a motor vehicle, an electrical circuit receiving control signals from other electrical components of a motor vehicle, an ignition distributor, an electronic ignition control circuit, an electronic engine control computer, a computer within a vehicle, an air flow sensor, an atmospheric pressure sensor, a manifold pressure sensor, a temperature sensor, a tachometer, a crankshaft position sensor, a camshaft position sensor, an oxygen sensor, an electrically controlled valve controlling the exit of exhaust gasses from the engine of a motor vehicle, an electrically controlled valve controlling the flow of hydraulic fluid in the valve train of an internal combustion engine, an electrically controlled valve controlling the entry of an air and fuel mixture into the engine of a motor vehicle, an electrically controlled mechanical member which inhibits normal steering of a motor vehicle, an electrically controlled mechanical member controlling normal engagement of the transmission of a motor vehicle into a driving gear, an electrically controlled device within a vehicle, an electrically controlled system within a vehicle, an electrically actuated device within a vehicle, and an electrically deactuated device within a vehicle. This primary benefit of this invention can also be utilized by: the disabling entity and vehicle operation enabling means being both enclosed within a durable physical entity which prevents either from being tampered with or activated without receipt of a proper signal, can be applied, by the teachings of this invention to a worker having average skills in the automotive art, to a variety of housings of vehicle operation enabling means comprising:

an electric motor housing, an electric cranking motor housing, an engine starter system housing, the housing of an electrically actuated switch controlling a starter motor, the housing of an electrically powered fuel pump, the housing of an electrically actuated switch controlling a fuel pump, the housing of an electrically controlled fuel injector, the housing of an electrically controlled valve controlling the flow of fuel, a fuel tank, an air duct, an intake manifold passage, an exhaust manifold passage, the housing of an electrically controlled fuel pressure regulator, a float bowl of a carburetor, an internal cavity in a cast component of a vehicle, an internal cavity in a forged component of a vehicle, an internal cavity in a molded component of a vehicle, an internal cavity in a machined component of a vehicle, an internal cavity in an extruded component of a vehicle, an internal cavity in a laminated component of a vehicle, the casting of a carburetor, the case of a motor vehicle transmission, the housing of a motor vehicle torque converter; the outer walls of a cavity within a structural member of a vehicle, a brake fluid reservoir, a transmission oil pan, an engine oil pan, an engine block an engine crank case, the outer walls of a cavity within an engine block casting, the outer walls of a cavity within the casting of a head of an internal combustion engine, the outer walls of a cavity within an hydraulic brake system master cylinder assembly, the outer walls of a cavity within an hydraulic brake system wheel cylinder assembly, the outer walls of a cavity within an ignition distributor, the housing of an electronic ignition control circuit, the housing of an air flow sensor, the housing of an atmospheric pressure sensor, the housing of a manifold pressure sensor, the housing of a temperature sensor, the housing of a tachometer, the housing of a crankshaft position sensor, the housing of a camshaft position sensor, the housing of an oxygen sensor, the valve cover of an engine, a cavity within the steering column assembly of a vehicle, the housing of an electronic engine control computer, the housing of an electronic circuit within a vehicle, the housing of a computer within a vehicle, the outer walls of a cavity within plastic, the outer walls of a cavity within metal, a plastic mass containing abrasive particles, and an epoxy mass containing abrasive particles.

I claim:

1. In a motor vehicle, an apparatus having the improvements comprising:

means operable to enable normal operation of said vehicle;

said vehicle being disabled from operation responsive to said enabling means being inoperable;

an interlock deactuable to condition said enabling means for operation;

said enabling means being inoperable responsive to said interlock being actuated;

a decoder conditionable to function to deactuate said interlock;

a transmitter activatable to condition said decoder to function by transmitting thereto a pre-selected variation of a complex coded signal;

said decoder being dysfunctional responsive to said transmitter being deactivated from transmitting said pre-selected variation of said complex coded signal to said decoder;

an enclosure simultaneously enclosing said enabling means and said interlock and said decoder;

said transmitter being external to said enclosure said enclosure being substantially more resistant to removal from the vehicle, tampering, penetration, and destruction than the ordinary housing of corresponding vehicle normal operation enabling means.

2. In the apparatus of claim 1, said decoder being dysfunctional responsive to receiving a variation of said complex coded signal different from said pre-selected variation of said complex coded signal; said enabling means being physically, both electrically and mechanically, isolated by said enclosure in such a manner as to prevent said enabling means from being operable by any means without said interlock being deactuated; said interlock being physically isolated, both electrically and mechanically, by said enclosure in such a manner as to prevent said interlock from being deactuated by any means other than by said decoder being conditioned to deactuate said interlock; said decoder being physically, both electrically and mechanically, isolated by said enclosure in such a manner as to prevent said decoder form being conditioned to deactuate said interlock by any means other than by receiving said pre-selected variation of said complex coded signal.

3. In the apparatus of claim 1, said transmitter being at a distance from said enclosure; said vehicle having conductors external to said enclosure and communicating electricity with portions internal to said enclosure; said enabling means being inoperable responsive any of said conductors being cut; said enabling means not being conditioned for operation responsive alone to any of said conductors being spliced to any other of said conductors; said enabling means not being conditioned for operation responsive alone to any of said conductors being in electrical communication with a source of electrical current; said enabling means not being conditioned for operation responsive alone to any of said conductors being in electrical communication with a drain of electrical current.

4. In the apparatus of claim 1, said decoder being in electrical communication with primary electrical conductor; said primary electrical conductors being in electrical communication with said interlock; said enclosure enclosing all of said primary electrical conductors; said interlock being in electrical communication with a secondary electrical conductor and a tertiary electrical communication with said enabling means; said enclosure enclosing said secondary electrical conductor; said tertiary electrical conductor being in electrical communication with an electrical circuit normally controlling operation of said enabling means; said tertiary electrical conductor protruding from said enclosure.

5. In the apparatus of claim 1, said enclosure being made of a hardened material and being resistant to tampering, and being resistant to penetration to the interior thereof, and being resistant to cutting, and being resistant to smashing; said enclosure being resistant to removal, and being resistant to other means of destruction.

6. In the apparatus of claim 1, said enclosure being the housing of a component of said vehicle where the component is said enabling means.

7. In the apparatus of claim 1, said enclosure being a housing integral with a component of said vehicle where the component is said enabling means.

8. In the apparatus of claim 1, said enabling means being secured to said vehicle by fastening means; said fastening means being resistant to removal by ordinary tools designed specifically to engage ordinary threaded fasteners; said fastening means being easily removable only by extraordinary tools.

9. In the apparatus of claim 1, said enclosure being secured to said vehicle by fastening means; said fastening means being resistant to removal by ordinary tools designed specifically to remove ordinary threaded fasteners; said fastening means being easily removable only by extraordinary tools.

10. In the apparatus of claim 1, said enabling means being located within said vehicle but in a location normally inaccessible to the operation of said vehicle while said operator is seated in a position which allows said operator to operate said vehicle.

11. In the apparatus of claim 1, said transmitter limited to being activatable to transmit said complex coded signal to said decoder only by wireless transmittal.

12. In the apparatus of claim 1, said enabling means being an electric cranking motor; said interlock allowing, only when deactuated by said decoder, adequate electricity to be supplied to said electric cranking motor such that said electric cranking motor may crank an engine; said interlock preventing, unless deactuated by said decoder, adequate electricity from being supplied to said electric cranking motor such that said electric cranking motor may not crank an engine.

13. In the apparatus of claim 1, said vehicle being powered by an engine; said enabling means being an engine starter system including an electric cranking motor, and a solenoid actuated switch; said enclosure being at least partially constructed from sections of metal pipe; said enclosure covering said electric cranking motor and said solenoid actuated switch.

14. In the apparatus of claim 1, said complex coded signal being a primary complex coded signal comprising an array of simultaneous transmissions on a corresponding array of different carriers; said transmitter being activatable to transmit said pre-selected variation of said primary complex coded signal to said decoder responsive to being manually selectively activated by a pre-selected variation of a secondary complex coded signal.

15. In the apparatus of claim 1, said transmitter comprising a manually actuated keypad; said manually actuated keypad having dimensions of the order of magnitude no greater than that of an ordinary key chain fob.

16. In the apparatus of claim 1, said complex coded signal being a primary complex coded signal restricted to transmittal on carrier frequencies having an order of magnitude of at least 100 megahertz and less than 40 gigahertz; said transmitter being activatable to transmit said pre-selected variation of said primary complex coded signal to said decoding means responsive to being manually selectively activated by a pre-selected variation of a secondary complex coded signal; said transmitter comprising a manually actuatable keypad and at least one electronic integrated circuit.

17. In the apparatus of claim 1, said complex coded signal being a primary complex coded signal; said pre-selected variation of said primary complex coded signal having been selected from a group of at least scores of thousands of different variations of said primary complex coded signal; said transmitter being activatable to transmit said pre-selected variation of said primary complex coded signal to said decoder responsive to being manually selectively activated by a pre-selected variation of a secondary complex coded signal, said pre-selected variation of said secondary complex coded signal having been selected from a group of at least several thousands of different variations of said secondary complex coded signal.

18. In the apparatus of claim 1, said enclosure being made of material that is electrically non-conductive; an antenna being in electrical communication with said decoder and being completely enclosed within said enclosure.

19. In the apparatus of claim 1, said transmitter transmitting said complex coded signal to said decoder via wires in electrical communication with said transmitter and with said decoder; said decoder and said transmitter transmitting, receiving, and otherwise communicating without any wireless communication between said transmitter and said decoder; said wires being at least partially shielded from receiving and from emitting radio frequency interference.

20. In the apparatus of claim 1, fiber optic communication between said decoder and said transmitter; said complex coded signal being transmitted by said transmitter to said decoder via said fiber optic communication.

21. In the apparatus of claim 1, said complex coded signal being a primary complex coded signal comprising an array of simultaneous transmissions on a corresponding array of different carriers; said transmitter being activatable to transmit said pre-selected variation of said primary complex coded signal to said decoder responsive to being manually selectively activated by a preselected variation of a secondary complex coded signal; said pre-selected variation of said primary complex coded signal having been selected from a group of at least scores of thousands of different variations of said primary complex coded signal; said pre-selected variation of said secondary complex coded signal having been selected from a group of at least several thousands of different variations of said secondary complex coded signal; said decoder having a receiver; said receiver operable to receive said simultaneous transmissions on said corresponding array of different carriers simultaneously on a corresponding array of channels; said decoder having means comparing said transmissions on said array of channels with said primary pre-selected complex coded signal; said transmitter comprising a manually actuated keypad; said keypad having an array of keys; said keypad having dimensions of the order of magnitude no greater than that of an ordinary key chain fob; said decoder being coated so as to be heat and moisture resistant; said transmitter being coated so as to be heat and moisture resistant; a component selected from the group consisting of said enabling means and said enclosure, being secured to said vehicle by fastening means; said fastening means being resistant to removal by ordinary tools designed to engage ordinary threaded fasteners; and fastening means being easily removable only by extraordinary tools; said fastening means comprising a bolt having a head; said head being shaped such that a polygonal concavity of the driving end of any ordinary tool designed to engage the head of an ordinary threaded fastener may not fit over said head; said head being shaped such that a polygonal aperture of the driving end of any tool designed to engage the head of an ordinary threaded fastener may not fit over said head; said head being shaped such that a polygonal convexity of the driving end of any tool designed to engage the head of an ordinary threaded fastener may not fit into said head; said head being free of any aperture, and free of any slot, and free of any groove; said head being free of any upstanding boss, and free of any convexity; said bolt engaging a mounting member integral with or fixed to a component selected from the group consisting of: said enabling means and said enclosure; a collar closely surrounding said head of said bolt; said collar being journaled on said bolt and, and being rotable with respect to said bolt, and being rotatable with respect to said mounting member; said head of said bolt being countersunk into said collar when said fastening means is fully tightened; said collar being limited in axial translation with respect to said bolt by said head of said bolt; said collar being limited in axial translation with respect to said bolt by a fastening member threaded onto said bolt; said fastening member being countersunk into a second aperture in said collar; said fastening member being at least partially protuberant from said second aperture in said collar when said fastening member is fully threaded onto said bolt; said second aperture closely surrounding said fastening member; said collar being countersunk into said integral or fixed mounting member to a depth such that when said fastening means are fully tightened, the top of said collar is substantially flush with the top surface of said integral or fixed mounting member; said head having face; said face having a predetermined shape, chosen from a group of shapes consisting of: all non-polygonal shapes having a geometric center being non-coincident with the geometric central axis of said bolt and all shapes being both non-polygonal and non-circular; a tool having at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head; said head of said bolt being made of titanium; said face of said head of said bolt appearing to the unaided human observer to be both circular and coincident with said central axis of said shaft of said bolt; said collar being made of titanium; said head of said bolt and said collar resisting being welded to each other; means fixing said enclosure to said enabling means in such a manner as to resist removal therefrom, after installation thereupon, by hitting and by cutting and by prying and by other destructive means; said fixing means comprising a joining technique selected from the group of joining techniques consisting of: fusion welding, bracing, soldering, any joining technique making use of any substance having any adhesive properties, filling any gaps between said enclosure and said enabling means with hardening epoxy resin, filling any gaps between said enclosure and said enabling means with hardening polyester resin, filling any gaps between said enclosure and said enabling means with hardening acrylic resin, filling any gaps between said enclosure and said enabling means with hardening polycarbonate resin, filling any gaps between said enclosure and said enabling means with hardening polyethylene resin, filling any gaps between said enclosure and said enabling means with hardening polypropylene resin, filling any gaps between said enclosure and said enabling means with hardening ABS plastic resin, filling any gaps between said enclosure and said enabling means with hardening polyurethane resin, filling any gaps between said enclosure and said enabling means with any hardening plastic resin, filling gaps between said enclosure with any hardening resin comprising a carbon containing polymer, filling any gaps between said enclosure and said enabling means with hardening cement, filling any gaps between said enclosure and said enabling means with hardening concrete affixing to said enclosure and additional piece of material which obstructs removal of said enclosure; said enabling means being located within said vehicle but in a location normally inaccessible to the operator of said vehicle while said operator is seated in a position which allows said operator to operate said vehicle.

22. In the apparatus of claim 1, said enclosure comprising a composite material reinforced with fibers comprising at least one material selected from the group consisting of: carbon, glass, aramid, Spectra, boron, carbon containing polymer, ceramic, metal, metal alloy, metal with at least one non-metallic compound, metal with at least one non-metallic element, carbon and at least one carbon containing polymer, carbon and at least one metal, carbon and glass, glass and at least one metal, glass and at least one non-metallic compound, glass and at least one non-metallic compound, glass and at least one non-metallic element, boron and metal; said fibers being wrapped around the said elements to be enclosed; said fibers being arranged in a form selected from the group consisting of: fiber, tow, yarn, roving, tape, and cloth; said fibers being wrapped around the aforementioned elements to be enclosed and being set in a matrix comprising at least one material chosen from the group consisting of: epoxy, polyester, polyurethane, polycarbonate, polyethylene, polypropylene, carbon containing polymer, ceramic, metal, metal alloy, metal combined with at least one non-metallic compound, metal combined with at least one non-metallic element, combination of carbon and at least one carbon containing polymer, combination of carbon and at least one metal, carbon containing polymer, carbon containing polymer combined with at least one non-metallic element, carbon containing polymer combined with at least one non-metallic compound; said enclosure being substantially electrically non-conductive; an antenna being within the outer boundary of said wrapped fibers and being electrically communicative with said decoder.

23. In a motor vehicle, apparatus having the improvements comprising:

means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said decoder being dysfunctional for a primary predetermined period of time responsive to said decoder receiving a predetermined number of incorrect variations of said complex coded signal; during said primary predetermined period of time, said decoder being unable to deactuate said interlock; said decoder being operable to deactuate said interlock for a secondary predetermined period of time, responsive to said decoder receiving said predetermined variation of said complex coded signal; said decoder reactuating said interlock after expiration of the said secondary predetermined period of time.

24. In the apparatus of claim 23, said decoder being operable to maintain said interlock in a deactuated state for a teritary predetermined period of time in response to said decoder receiving, prior to expiration of said secondary pre-selected period of time, a portion of a secondary variation of said complex coded signal; said decoder being operable to reactuate said interlock after expiration of the said secondary predetermined period of time; said decoder being operable to reactuate said interlock after expiration of the said tertiary predetermined period of time; said decoder reactuating said interlock after expiration of said secondary predetermined period of time responsive to said decoder not receiving, prior to expiration of said secondary pre-selected period of time, said portion of said secondary variation of said complex coded signal.

25. In the apparatus of claim 23, said vehicle being powered by an internal combustion engine having a starter system including a cranking motor and a solenoid operable to engage a pinion gear with the flywheel of the engine of said vehicle and operable to close an electrical circuit supplying electrical current to said cranking motor; sad enabling means being said solenoid; said cranking motor being enclosed within said enclosure; said solenoid being enclosed within said enclosure; said vehicle haivng a battery external to said enclosure; said decoder being in electrical communication with primary electrical conductors; said primary electrical conductors being in electrical communication with said interlock; said enclosure enclosing all of said primary electrical conductors; said interlock being in electrical communication with a secondary electrical conductor and a tertiary electrical conductor; said secondary electrical conductor being in electrical communication with said enabling means; said enclosure enclosing said secondary electrical conductor; said tertiary electrical conductor being in electrical communication with an electrical circuit normally controlling operation of said enabling means; said tertiary electrical conductor protruding from said enclosure; said complex coded signal being a primary complex coded signal; said transmitter activatable to transmit said pre-selected variation of said primary complex coded signal to said decoder responsive to being manually selectively activated by a pre-selected variation of a secondary complex coded signal; said pre-selected variation of said primary complex coded signal having been selected from a group of at least scores of thousands of different variations of said primary complex coded signal; said pre-selected variation of said secondary complex coded signal having been selected from a group of at least several thousands of different variations of said secondary complex coded signal; said transmitter comprising a communication interface and memory; said pre-selected variation of said primary complex coded signal being sorted in memory of said transmitter; said decoder having a receiver; said decoder haivng means of comparing signals received from said transmitter with said pre-selected variation of said primary coded signal; said transmitter having dimensions of the order of magnitude no greater than a stack of several coins; said transmitter being fixed to a key chain fob; said transmitter transacting data through at least two electrical contacts; said decoder being in electrical communication with a plurality of sockets; each one of said sockets haivng an aperture to receive said transmitter in a female-male engagement, whereby each of at least two conductors in said station are in an electrically conductive relationship with one of said at least two electrical contacts of said transmitter when said transmitter is selectively inserted into one of said sockets; said decoder and said transmitter and said sockets cooperating in such a manner that the decoder acts as a master controller and said transmitter acts as a slave controller with bidirectional transaction of data between said decoder and said transmitter; said decoder being coated with a hardened heat and moisture resistant plastic; said decoder being operable to maintain said interlock in a deactuated state for a teritary predetermined period of time in response to said decoder receiving, prior to expiration of said secondary pre-selected period of time, a portion of a secondary variation of said complex coded signal; said decoder being operable to reactuate said interlock after expiration of the said secondary predetermined period of time; said decoder being operable to reactuate said interlock after expiration of the said tertiary predetermined period of time; said decoder reactuating said interlock after expiration of the said secondary predetermined period of time responsive to said decoder not receiving, prior to expiration of said secondary pre-selected period of time, said portion of said secondary variation of said complex coded signal; said enclosure being made of a hardened material resistant to tampering, and being resistant to penetration to the interior thereof, and being resistant to cutting, and being resistant to smashing, and being resistant to movement, and being resistant to removal, and being resistant to other means of destruction; a component, selected from the group consisting of said enabling means and said enclosure, being secured to said vehicle by fastening means; said fastening means being resistant to removal by ordinary tools designed to engage ordinary threaded fasteners; said fastening means being easily removable only by extraordinary tools; said fastening means comprising a bolt having a head; said head being shaped such that a polygonal concavity of the driving end of any ordinary tool designed to engage the head of an ordinary threaded fastener may not fit over said head; said head being shaped such that a polygonal aperture of the driving end of any tool designed to engage the head of an ordinary threaded fastener may not fit over said head; said head being shaped such that a polygonal convexity of the driving end of any tool designed to engage the head of an ordinary threaded fastener may not fit into said head; said head being free of any aperture, and free of any slot, and free of any groove; said head being free of any upstanding boss, and free of any convexity; said bolt engaging a mounting member integral with or fixed to a component selected from the group consisting of: said enabling means and said enclosure; a collar closely surrounding said head of said bolt; said collar being journaled on said bolt and, and being rotatable with respect to said bolt, and being rotatable with respect to said mounting member; said head of said bolt being countersunk into said collar when said fastening means is fully tightened; said collar being limited in axial translation with respect to said bolt by said head of said bolt; said collar being limited in axial translation with respect to said bolt by a fastening member threaded onto said bolt; said fastening member being countersunk into a second aperture in said collar; said fastening member being at least partially protuberant from said second aperture in said collar when said fastening member is fully threaded onto said bolt; said second aperture closely surrounding said fastening member; said collar being countersunk into said integral or fixed mounting member to a depth such that when said fastening means are fully tightened, the top of said collar is substantially flush with the top surface of said integral or fixed mounting member; said head having face; said face having a predetermined shape, chosen from a group of shapes consisting of: all non-polygonal shapes having a geometric center being non-coincident with the geometric central axis of said bolt and all shapes being both non-polygonal and non-circular; a tool having at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head; means fixing said enclosure to said enabling means in such a manner as to resist removal therefrom, after installation thereupon, by hitting and by cutting and by prying and by other destructive means; said fixing means comprising a joining technique selected from the group of joining techniques consisting of: fusion welding, brazing, soldering, any joining technique making use of any substance having any adhesive properties, filling any gaps between said enclosure and said enabling means with hardening epoxy resin, filling any gaps between said enclosure and said enabling means with hardening polyester resin, filling any gaps between said enclosure and said enabling means with hardening acrylic resin, filling any gaps between said enclosure and said enabling means with hardening polycarbonate resin, filling any gaps between said enclosure and said enabling means with hardening polyethylene resin, filling any gaps between said enclosure and said enabling means with hardening polypropylene resin, filling any gaps between said enclosure and said enabling means with hardening ABS plastic resin, filling any gaps between said enclosure and said enabling means with hardening polyurethane resin, filling any gaps between said enclosure and said enabling means with any hardening plastic resin, filling gaps between said enclosure with any hardening resin comprising a carbon containing polymer, filling any gaps between said enclosure and said enabling means with hardening cement, filling any gaps between said enclusre and said enabling means with hardening concrete, affixing to said enclosure and addition piece of material which obstructs removal of said enclusre; said enabling means being located within said vehicle but in a location normally inaccessible to the operator of said vehicle while said operator is seated in a position which allows said operator to operate said vehicle.

26. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said complex coded signal comprising digital data; said transmitter comprising a memory device; said digital data being stored in said memory device; said decoder communicating electrically with an array of sockets; said transmitter communicating with said decoder responsive to said transmitter being in electrical communication with any individual socket of said array of sockets; said decoder receiving said signal comprising said digital data stored in said memory device from said transmitter only responsive to said transmitter being manually selectively placed in electrical communication, for a minimum threshold period of time, with each of a pre-selected sequence of several of said individual sockets of said array of sockets.

27. In the apparatus of claim 26, said array of sockets being at a distance from and remote from said enclosure; said array of sockets connected by wire to said decoder; said wire penetrating said enclosure; said wire passing through an aperture; said aperture being in said vehicle when said vehicle was originally manufactured; said wire terminating proximate to the dashboard within the cabin of said vehicle.

28. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said complex coded signal comprising a component of digital data; said transmitter comprising a pre-selected memory device comprising memory secured by a password; said digital data component of said complex coded signal being stored in said memory secured by said password within said memory device; said pre-selected memory device being chosen from a group of similar memory devices each comprising a different set of unalterable identification data; said decoder communicating data bidirectionally with an array of sockets; said pre-selected memory device communicating data bidirectionally with said decoder responsive to said pre-selected memory device being in electrical communication with any individual socket of said array of sockets; said unalterable identification data being readable by said decoder responsive to said pre-selected memory device being in electrical communication with any individual socket of said array of sockets; said decoder being able to discern said pre-selected memory device from said group of similar memory devices by reading and verifying said unalterable identification data; said decoder being conditionable to transmit said password to said pre-selected memory device only responsive to said pre-selected memory device being manually selectively placed in electrical communication, for a minimum threshold period of time, with each of a pre-selected sequence of several of said individual sockets of said array of sockets; said pre-selected memory device being capable of transmitting said signal comprising said component of digital data to said decoder only upon receiving said password; upon receiving said password, said pre-selected memory device transmitting to said decoder said signal comprising said component of digital data stored in said memory protected by said password of said pre-selected memory device.

29. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said transmitter comprising a memory device; said decoder communicating electrically with an array of sockets; a fob comprising a rigid sheet bent into a loop to which said transmitter is fixed such that an operator can wear said loop upon a finger like a ring in order to insert said transmitter, like the head of a ring, into a socket of said array of sockets, thereby establishing electrical communication between said transmitter and said decoder.

30. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said decoder communicating data with an array of sockets; a printed circuit board comprising said array of sockets, said array of sockets being illuminated, parallel to the plane of said printed circuit board, by light emitting diodes; said light emitting diodes being mounted to said circuit board, so as to project light parallel to said plane of said circuit board.

31. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; said enclosure comprising a composite material reinforced with fibers; said fibers comprising at least one material selected from the group of materials consisting of: carbon glass, aramid, Spectra, boron, carbon containing polymer, ceramic, metal, metal alloy, metal combined with at least one non-metallic compound, metal combined with at least one non-metallic element, combination of carbon and at least one carbon containing polymer, combination of carbon and at least one metal, combination of carbon and glass, combination of glass and at least one metal, combination of glass and at least one non-metallic compound, combination of glass and at least one non-metallic compound, combination of glass and at least one non-metallic element, combination of boron and metal; said fibers being wrapped around the said elements to be enclosed; said fibers being arranged in a form selected from the group consisting of: fiber, tow, yarn, roving, tape, and cloth.

32. In the apparatus of claim 31, said fibers being wrapped around the aforementioned elements to be enclosed and being set in a matrix comprising at least one material chosen from the group consisting of: epoxy, polyester, polyurethane, polycarbonate, polyethylene, polypropylene, carbon containing polymer, ceramic, metal, metal alloy, metal combined with at least one non-metallic compound, metal combined with at least one non-metallic element, combination of carbon and at least one carbon containing polymer, combination of carbon and at least one metal, carbon containing polymer, carbon containing polymer combined with at least one non-metallic element, carbon containing polymer combined with at least one non-metallic compound.

33. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; a component selected from the group consisting of said enabling means and said enclosure, being secured to said vehicle by fastening means; said fastening means being resistant to removal by ordinary tools designed to engage ordinary threaded fasteners; said fastening means being easily removable only by extraordinary tools; said fastening means comprising a bolt having a head; said head being shaped such that a polygonal concavity of the driving end of any ordinary tool designed to engage the head of an ordinary threaded fastener is prohibited from fitting over said head; said head being shaped such that a polygonal aperture of the driving end of any tool designed to engage the head of an ordinary threaded fastener is prohibited from fitting over said head; said head being shaped such that a polygonal convexity of the driving end of any tool designed to engage the head of an ordinary threaded fastener is prohibited from fitting into said head; said head being free of any aperture, and free of any slot, and free of any groove; said head being free of any upstanding boss, and free of any convexity; said bolt engaging a mounting member integral with or fixed to a component selected from the group consisting of: said enabling means and said enclosure; a collar closely surrounding said head of said bold; said collar being journaled on said bolt and, and being rotatable with respect to said bolt, and being rotatable with respect to said mounting member; said head of said bolt being countersunk into said collar when said fastening means is fully tightened; said collar being limited in axial translation with respect to said bolt by said head of said bolt; said collar being limited in axial translation with respect to said bolt by a fastening member threaded onto said bolt; said fastening member being countersunk into a second aperture in said collar; said fastening member being at least partially protuberant from said second aperture in said collar when said fastening member is fully threaded onto said bolt; said second aperture closely surrounding said fastening member; said head having face; said face having a predetermined shape chosen from a group of shapes consisting of: all non-polygonal shapes having a geometric center being non-coincident with the geometric central axis of said bolt, and each shape being both non-polygonal and non-circular; a tool having, at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head.

34. In a motor vehicle, apparatus having the improvements comprising: means operable to enable normal operation of said vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable to condition said decoder to function by transmitting thereto a pre-selected variation of a complex coded signal; said decoder being dysfunctional responsive to said transmitter being deactivated from transmitting said pre-selected variation of said complex coded signal to said decoder; an enclosure simultaneously enclosing said enabling means and said interlock and said decoder; said transmitter being external to said enclosure; a component selected from the group consisting of said enabling means and said enclosure, being secured to said vehicle by fastening means; said fastening means being resistant to removal by ordinary tools designed to engage ordinary threaded fasteners; said fastening means being easily removable only by extraordinary tools; said fastening means comprising a bolt having a head; said head being shaped such that a polygonal concavity of the driving end of any ordinary tool designed to engage the head of an ordinary threaded fastener may not fit over said head; said head being shaped such that a polygonal aperture of the driving end of any tool designed to engage the head of an ordinary threaded fastener may not fit over said head; said head being shaped such that a polygonal convexity of the driving end of any tool designed to engage the head of an ordinary threaded fastener may not fit into said head; said head being free of any aperture, and free of any slot, and free of any groove; said head being free of any upstanding boss, and free of any convexity; said bolt engaging a mounting member integral with or fixed to a component selected from the group consisting of: said enabling means and said enclosure; a collar closely surrounding said head of said bold; said collar being journaled on said bolt and, and being rotatable with respect to said bolt, and being rotatable with respect to said mounting member; said head of said bolt being countersunk into said collar when said fastening means is fully tightened; said collar being limited in axial translation with respect to said bolt by said head of said bolt; said collar being limited in axial translation with respect to said bolt by a fastening member threaded onto said bolt; said fastening member being countersunk into a second aperture in said collar; said fastening member being at least partially protuberant from said second aperture in said collar when said fastening member is fully threaded onto said bolt; said second aperture closely surrounding said fastening member; said collar being countersunk into said integral or fixed mounting member to a depth such that when said fastening means are fully tightened, the top of said collar is substantially flush with the top surface of said integral or fixed mounting member; said head having face; said face having a predetermined shape, chosen from a group of shapes consisting of: all non-polygonal shapes having a geometric center being non-coincident with the geometric central axis of said bolt and all shapes being both non-polygonal and non-circular; a tool having at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head.

35. A method of enclosing a system necessary to properly operate a motor vehicle; said method including the step of isolating all direct physical electrical contact between said system and electrical power source; said method including the step of disabling said system with a normally actuated interlock; said method including the step of isolating all direct physical contact and all direct electrical contact between said system and said interlock; said method including the step of defeating said interlock with a decoder operable to do so; said method including the step of isolating all direct electrical contact between said decoder and said interlock; said method comprising wrapping said system, said interlock, said decoder, said direct physical contacts, and said direct electrical contacts as a composite work piece with one or more of the materials included in the group of materials consisting of: a composite of fibers embedded in a hardening matrix material, a composite of carbon and aramid fabrics embedded in a hardening epoxy resin, a composite of fabric composed of both carbon and aramid fibers and embedded in a hardening epoxy resin, a composite of carbon fibers in a hardening epoxy resin, a composite of fibers embedded in a hardening resinous matrix material containing abrasive particles, a composite of a hardening resinous matrix material and abrasive particles, a composite of fiberglass embedded in a hardening polyester resin matrix, a composite of Spectra in a hardening resinous matrix material, a hardening resin, a hardening thermoplastic resin.

36. An enclosure enclosing at least one component of a vehicle anti-theft system; said component being operable to enable normal operation of said vehicle, and not being a mere wire said enclosure comprising a composite material reinforced with fibers; said fibers comprising at least one material selected from the group of materials consisting of: carbon, glass, aramid, Spectra, boron, carbon containing polymer, ceramic, metal, metal alloy, metal combined with at least one non-metallic compound, metal combined with at least one non-metallic element, combination of carbon and at least one carbon containing polymer, combination of carbon and at least one metal, combination of carbon and glass, combination of glass and at least one metal, combination of glass and at least one non-metallic compound, combination of glass and at least one non-metallic compound, combination of glass and at least one non-metallic element, combination of boron and metal; said fibers being wrapped around the said elements to be enclosed; said fibers being arranged in a form selected from the group consisting of: fiber, tow, yarn, roving, tape, and cloth; said fibers being wrapped around said at least one component of a vehicle anti-theft system and being set in a matrix comprising at least one material chosen from the group consisting of: epoxy, polyester, polyurethane, polycarbonate, polyethylene, polypropylene, carbon containing polymer, ceramic, metal, metal alloy, metal combined with at least one non-metallic compound, metal combined with at least one non-metallic element, combination of carbon and at least one carbon containing polymer, combination of carbon and at least one metal, carbon containing polymer, carbon containing polymer combined with at least one non-metallic element, carbon containing polymer combined with at least one non-metallic compound.

37. A shared enclosure enclosing a device allowing, when functional, normal operation of a vehicle; said device, when disabled, preventing normal operation of said vehicle; said shared enclosure enclosing an interlock normally disabling said device; said shared enclosure enclosing a decoder that defeats said interlock responsive to said decoder receiving a predetermined variation of a complex coded signal; said shared enclosure resisting destruction, unauthorized penetration, and unauthorized removal from the vehicle and tampering to a substantially greater extend than the ordinary housing of a corresponding vehicle operation enabling device.

38. A method of preventing unauthorized driving of a vehicle; said method comprising the step of deactuating means necessary to operate the vehicle; said method comprising the added step of enclosing said deactuated means, in a shared enclosure, in a manner inhibiting, mechanically and electrically, access to said means for the purpose of actuating said means; said method comprising the further step of enclosing, within said shared enclosure enclosing said deactuated means, a decoder, said decoder allowing, temporarily, said deactuated means to be activated, responsive to said decoder receiving a pre-selected variation of a coded signal; the aforesaid step of enclosing of decoder being executed in such a manner as to resist circumventing said decoder either mechanically or electrically to actuate said means; said method further comprising the step of providing a transmitter capable of transmitting, from a location remote from said deactuated means and said decoder and said enclosing, said pre-selected variation of said coded signal, armoring said enclosure in a manner to (prevent) provide substantially more resistance to removal from the vehicle, tampering, penetration, or destruction than the ordinary housing of corresponding vehicle operation enabling means.

39. In the method of claim 38, said method comprising the further step of normally disabling said transmitter from transmitting said pre-selected variation of said coded signal; said method comprising the additional step of temporarily enabling said transmitter to transmit said pre-selected variation of said coded signal, responsive to a transaction selected from the group of conditions consisting of: said decoder receiving a pre-selected variation of a secondary coded signal, and said transmitter receiving a pre-selected variation of a secondary coded signal; said secondary coded signal being generated and being transmitted by manually manipulating said transmitter.

40. In the method of claim 38, the step of normally disabling said transmitter from transmitting said pre-selected variation of said coded signal; the step of temporarily enabling said transmitter to transmit said pre-selected variation of said coded signal responsive to said transmitter receiving a pre-selected variation of a secondary coded signal; the step of said decoder being temporarily conditionable to transmit said pre-selected variation of said secondary coded signal to said transmitter responsive to said decoder receiving a manually encoded tertiary signal.

41. In the method of claim 38, the step of temporarily preventing transaction of signals between said transmitter and said decoder, thereby temporarily preventing said deactuated means form being actuated by said decoder, responsive to a component receiving an improper variation of a signal, said component belonging to the group of components consisting of: said decoder and said transmitter.

42. In the method of claim 38, wherein said means necessary to operate said vehicle comprises components of an engine starter system, the further steps of: removing from a vehicle its starter system and any fasteners used to install its starter system, and install a replacement starter system, using alternate fastening means being resistant to removal, said replacement starter system having been previously enclosed within said shared enclosure along with said decoder deactuating said replacement starter system.

43. In the method of claim 42, the further steps of: removing said means necessary to operate said vehicle from said vehicle, and installing in its place similar replacement means, using alternate fastening means being resistant to removal said replacement means having been previously enclosed within said shared enclosure along with said decoder deactuating said replacement means.

44. A method of preventing unauthorized driving of a vehicle; said method comprising the step of deactuating means necessary to operate the vehicle; said method comprising the added step of enclosing said deactuated means in a shared enclosure, in a manner inhibiting, mechanically and electrically, access to said means for the purpose of actuating said means; said method comprising the further step of enclosing, within said shared enclosure enclosing said deactuated means, a decoder, said decoder allowing, temporarily, said deactuated means to be activated, responsive to said decoder receiving a pre-selected variation of a coded signal; the aforesaid step of enclosing of decoder being executed in such a manner as to resist circumventing said decoder either mechanically or electrically to actuate said means; said method further comprising the step of providing a transmitter capable of transmitting, from a location remote from said deactuated means and said decoder and said enclosing, said pre-selected variation of said coded signal; said method comprising the step of normally disabling said transmitter from transmitting said pre-selected variation of said coded signal; said method comprising the step of temporarily enabling said transmitter to transmit said pre-selected variation of said coded signal, responsive to at least one transaction selected from the group of transactions consisting of: said decoder receiving a pre-selected variation of a secondary coded signal, said decoder receiving a pre-selected variation of a tertiary coded signal, said decoder receiving a pre-selected variation of a quaternary coded signal, said transmitter receiving a pre-selected variation of a secondary coded signal, said transmitter receiving a pre-selected variation of a tertiary coded signal, said transmitter receiving a pre-selected variation of a quaternary coded signal; said secondary, tertiary, and quaternary coded signals each comprising a series portions, each portion comprising manual manipulation of said transmitter; said method comprising the step of selecting said pre-selected variation of said secondary coded signal from a table comprising data description of multiple variations of said secondary coded signal, said table of data being stored in memory of a device chosen from the group of devices consisting of: said decoder and said transmitter; the step of selecting said pre-selected variation of said tertiary coded signal by manually manipulating said transmitter so as to generate each portion of an arbitrary variation of said tertiary coded signal, each portion being generated within a primary predetermined period of time, said primary predetermined period of time initially commencing responsive to said pre-selected variation of said primary coded signal being received by said decoder, said primary predetermined period of time recommencing responsive to each portion of said arbitrary variation of said tertiary coded signal being generated prior to initial expiration of said primary predetermined period of time; the step of selecting said pre-selected variation of said quaternary coded signal by manually manipulating said transmitter so as to generate each portion of an arbitrary variation of said quaternary coded signal prior to expiration of said primary predetermined period of time; said primary predetermined period of time recommencing responsive to each portion of said arbitrary variation of said tertiary coded signal being generated prior to expiration of said primary predetermined period of time; said primary predetermined period of time recommencing responsive to further manipulation of said transmitter prior to expiration of said primary predetermined period of time; said decoder preventing actuation of said deactuated means after expiration of said primary predetermined period of time, until such time as said decoder again receives said pre-selected variation of said coded signal.

45. A method of preventing unauthorized driving of a vehicle; said method comprising the step of deactuating means necessary to operate the vehicle; said method comprising the added step of enclosing said deactuated means in a shared enclosure, in a manner inhibiting, mechanically and electrically, access to said means for the purpose of actuating said means; said method comprising the further step of enclosing, within said shared enclosure enclosing said deactuated means, a decoder, said decoder allowing, temporarily, said deactuated means to be activated, responsive to said decoder receiving a pre-selected variation of a coded signal; the aforesaid step of enclosing of decoder being executed in such a manner as to resist circumventing said decoder either mechanically or electrically to actuate said means; said method further comprising the step of providing a transmitter capable of transmitting, from a location remote from said deactuated means and said decoder and said enclosing, said pre-selected variation of said coded signal; the step of normally inhibiting said transmitter from transmitting said pre-selected variation of said coded signal; the step of temporarily enabling said transmitter to transmit said pre-selected variation of said coded signal responsive to said transmitter receiving a pre-selected variation of a secondary manually coded signal; the step of temporarily enabling said transmitter to transmit said pre-selected variation of said coded signal, responsive to said transmitter receiving, within a primary predetermined period of time, a pre-selected variation of a tertiary manually coded signal. the step of temporarily enabling said transmitter to transmit said pre-selected variation of said coded signal, a predetermined number of times, within a secondary predetermined period of time, responsive to said transmitter receiving a pre-selected variation of a quaternary manually coded signal.

46. A method of preventing unauthorized driving of a vehicle; said method comprising the step of deactuating means necessary to operate the vehicle; said method comprising the added step of enclosing said deactuated means in a shared enclosure, in a manner inhibiting, mechanically and electrically, access to said means for the purpose of actuating said means; said method comprising the further step of enclosing, within said shared enclosure enclosing said deactuated means, a decoder, said decoder allowing, temporarily, said deactuated means to be activated, responsive to said decoder receiving a pre-selected variation of a coded signal; the aforesaid step of enclosing of decoder being executed in such a manner as to resist circumventing said decoder either mechanically or electrically to actuate said means; said method further comprising the step of providing a transmitter capable of transmitting, from a location remote from said deactuated means and said decoder and said enclosing, said pre-selected variation of said coded signal; the step of electrically connecting said decoder to an array of sockets into which said transmitter may be inserted and thereby placed into electrical communication with said decoder; the step of electrically connecting said decoder to a multi-conductor cable, said cable protruding from said shared enclosure and penetrating a preexisting aperture in the firewall of said vehicle, said cable terminating within the cabin of said vehicle where this cable shall be electrically connected to said array of sockets; the step of transmitting manually coded signals to said decoder, through said array of sockets and said cable, by inserting said transmitter into sequences of individual sockets of said array of sockets.

47. An article of manufacture comprising a circuit board having a substantially planar surface; said surface of said circuit board having substantially planar electrical conductors having the shape of alphanumeric characters; said conductors being coated with an electrically conductive material such that said electrically conductive material forms an upstanding convex curved surface boss thereon; said electrically conductive material being reflective of visible light; visible light emitting diodes being mounted to said circuit board such that said light emitting diodes illuminate said coated conductors substantially perpendicular to said planar surface; said reflective coating of said conductors reflecting light emitted by said light emitting diodes away from said planar surface.

48. A fastener as an article of manufacture comprising a bolt and an annular ring journaled onto said bolt; said annular ring forming a collar closely surrounding a portion of the shaft of said bolt and closely surrounding the head of said bolt and closely surrounding a portion of a fastening member threaded onto said bolt; said collar being rotatable with respect to said bolt, said head of said bolt, and said fastening member threaded onto said bolt; said head of said bolt being countersunk into a first aperture in said collar; said first aperture closely surrounding said head of said bolt; said collar being limited in axial translation with respect to said bolt by said head of said bolt; said collar being limited in axial translation with respect to said bolt by said fastening member threaded onto said bolt; said fastening member threaded onto said bolt being countersunk into a second aperture in said collar; said fastening member threaded onto said bolt being at least partially protuberant from said second aperture in said collar when said fastening member is fully threaded onto said bolt; said second aperture closely surrounding said fastening member; the face of said head of said bolt having a predetermined shape chosen from the group of shapes consisting of: each shape having a geometric center that is non-coincident with the central axis of the shape of said bolt and each shape that is not circular and not a regular polygon; said fastening means being resistant to removal by ordinary tools designed to engage ordinary threaded fasteners; said fastening means being easily removable only by extraordinary tools; said head being shaped such that a polygonal concavity of the driving end of any ordinary tool designed to engage the head of an ordinary threaded fastener may not fit over said head; said head being shaped such that a polygonal aperture of the driving end of any tool designed to engage the head of an ordinary threaded fastener may not fit over said head; said head being shaped such that a polygonal convexity of the driving end of any tool designed to engage the head of an ordinary threaded fastener may not fit into said head; said head being free of any aperture, and free of any slot, and free of any groove; said head being free of any upstanding boss, and free of any convexity; said fastener engaging a tool having, at its driving end, a concavity; said concavity having a predetermined cross sectional shape; said cross sectional shape of said concavity being chosen from a group of two dimensional shapes, each having a geometric center; said concavity corresponding exactly in shape and in size to said head of said bolt; said geometric center of said cross sectional shape of said concavity being non-coincident with the geometric central axis of said tool to a degree exactly corresponding to the degree to which said geometric center of said face of said head of said bolt is non-coincident with said geometric central axis of said bolt, such that said concavity is operable to engage said head in a female-male fitting relationship; said driving end of said tool fitting into said closely fitting collar surrounding said head of said bolt; said tool being capable of being used to apply torque to said head.

49. The article of claim 48 and means operable to enable operating a motor vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable for conditioning said decoder for functioning by transmitting thereto a pre-selected variation of a complex coded signal; said decoder being dysfunctional responsive to said transmitter being deactivated from transmitting said pre-selected variation of said complex coded signal to said decoder; a shared enclosure simultaneously enclosing said enabling means and said interlock and said decoder; said transmitter being external to said enclosure; said fastener securing, to said vehicle, a component selected from the group of components consisting of: said enabling means and said shared enclosure.

50. The article of claim 48 and means operable to enable operating a motor vehicle; said vehicle being disabled from operation responsive to said enabling means being inoperable; an interlock deactuable to condition said enabling means for operation; said enabling means being inoperable responsive to said interlock being actuated; a decoder conditionable to function to deactuate said interlock; a transmitter activatable for conditioning said decoder for functioning by transmitting thereto a pre-selected variation of a complex coded signal; said decoder being dysfunctional responsive to said transmitter being deactivated from transmitting said pre-selected variation of said complex coded signal to said decoder; a shared enclosure simultaneously enclosing said enabling means and said interlock and said decoder; said transmitter being external to said enclosure; said fastener securing, to said vehicle, a component selected from the group of components consisting of: said enabling means and said shared enclosure; said bolt component of said fastener engaging a mounting member integral with or fixed to a component selected from the group of components consisting of: said enabling means and said shared enclosure; said collar being countersunk into said integral or fixed mounting member to a depth such that when said fastening means are fully tightened, the top of said collar is substantially flush with the top surface of said integral or fixed mounting member.

51. The article of claim 48 and said bolt engaging a mounting member integral with or fixed to a work piece; said collar being countersunk into said integral or fixed mounting member to a depth such that when said fastening means are fully tightened, the top of said collar is substantially flush with the top surface of said integral or fixed mounting member.

52. In a motor vehicle, an apparatus having the improvements comprising:
   means operable to enable normal operation of said vehicle;
   said vehicle being disabled from operation responsive to said enabling means being inoperable;
   an interlock deactuable to condition said enabling means for operation;
   said enabling means being inoperable responsive to said interlock being actuated;
   a decoder conditionable to function to deactuate said interlock;
   a transmitter activatable to condition said decoder to function by transmitting thereto a pre-selected variation of a complex coded signal;
   said decoder being dysfunctional responsive to said transmitter being deactivated from transmitting said pre-selected variation of said complex coded signal to said decoder;
   an enclosure simultaneously enclosing said enabling means and said interlock and said decoder;
   said transmitter being external to said enclosure, said enclosure being substantially more resistant to removal from the vehicle, tampering, penetration, and destruction than the ordinary housing of corresponding vehicle normal operation enabling means, said enclosure selected from the group consisting of a covering made of a composite material reinforced with fibers and a housing at least partially constructed from cylindrical channel shaped sections of metal pipe.

* * * * *